(12) United States Patent
Lerea et al.

(10) Patent No.: US 10,981,259 B2
(45) Date of Patent: Apr. 20, 2021

(54) WATERJET SYSTEMS AND METHODS

(71) Applicant: WAZER Inc., Bronx, NY (US)

(72) Inventors: Nisan Lerea, Bronx, NY (US);
Matthew Nowicki, Maywood, NJ (US);
Daniel Meana, Demarest, NJ (US);
Christian Moore, Philadelphia, PA (US)

(73) Assignee: WAZER INC., Bronx, NY (US)

( * ) Notice: Subject to any disclaimer, the term of this patent is extended or adjusted under 35 U.S.C. 154(b) by 0 days.

(21) Appl. No.: 16/097,161

(22) PCT Filed: May 5, 2017

(86) PCT No.: PCT/US2017/031347
§ 371 (c)(1),
(2) Date: Oct. 26, 2018

(87) PCT Pub. No.: WO2017/193026
PCT Pub. Date: Nov. 9, 2017

(65) Prior Publication Data
US 2020/0122295 A1 Apr. 23, 2020

Related U.S. Application Data

(60) Provisional application No. 62/332,196, filed on May 5, 2016.

(51) Int. Cl.
*B24C 1/04* (2006.01)
*B24C 3/06* (2006.01)
(Continued)

(52) U.S. Cl.
CPC .............. *B24C 1/045* (2013.01); *B24C 3/065* (2013.01); *B24C 5/04* (2013.01); *B24C 7/0023* (2013.01); *B24C 9/006* (2013.01)

(58) Field of Classification Search
CPC .......... B24C 1/045; B24C 3/065; B24C 5/04; B24C 7/0023; B24C 9/006; B24C 7/0053; B24C 7/0061; B24C 7/0015; B24C 7/00
(Continued)

(56) References Cited

U.S. PATENT DOCUMENTS 2,317,837 A * 4/1943 Webster ................... B24C 3/32
451/2
5,166,885 A * 11/1992 Thompson ................ B24C 1/10
451/2
(Continued)

FOREIGN PATENT DOCUMENTS

| CN | 204053825 | 12/2014 | |
| CN | 105196184 | 12/2015 | |
| WO | WO-9421426 A1 * | 9/1994 | ........... B24C 7/0084 |

OTHER PUBLICATIONS

WIPO, ISR/WO for PCT/US2017/031347, Jul. 21, 2017.

*Primary Examiner* — George B Nguyen
(74) *Attorney, Agent, or Firm* — Hodgson Russ LLP

(57) ABSTRACT

A waterjet system is provided, including a pump configured to pump fluid, an electric motor configured to drive the pump; a hopper configured to store abrasive, a mixing chamber configured to mix abrasive from the hopper and the fluid from the pump to produce a slurry, where the fluid entering the mixing chamber is at a pressure between 2000 psi and 8000 psi, a cutting bed configured to receive a workpiece to be cut, and a cutting head, including an outlet nozzle, in downstream fluid communication from the mixing chamber, the cutting head configured to expel the slurry through the outlet nozzle as a high-velocity jet into the cutting bed.

22 Claims, 42 Drawing Sheets

(51) Int. Cl.
  *B24C 5/04* (2006.01)
  *B24C 7/00* (2006.01)
  *B24C 9/00* (2006.01)
(58) Field of Classification Search
  USPC .................................................. 451/87, 88
  See application file for complete search history.

(56) References Cited

U.S. PATENT DOCUMENTS

| | | | | |
|---|---|---|---|---|
| 5,407,379 | A * | 4/1995 | Shank | B24C 7/0053 |
| | | | | 451/101 |
| 5,556,325 | A * | 9/1996 | Shank, Jr. | B24C 1/003 |
| | | | | 451/100 |
| 5,799,688 | A * | 9/1998 | Yie | B05B 1/3046 |
| | | | | 137/505.13 |
| 7,544,112 | B1 * | 6/2009 | Miller | B24C 1/086 |
| | | | | 451/10 |
| 8,342,912 | B2 * | 1/2013 | Funatsu | B24C 1/00 |
| | | | | 451/100 |
| 8,622,784 | B2 * | 1/2014 | Miller | B24C 1/04 |
| | | | | 451/29 |
| 2002/0151250 | A1 * | 10/2002 | Ulrich | B24C 5/04 |
| | | | | 451/2 |
| 2003/0124955 | A1 * | 7/2003 | Hanson | B24C 9/00 |
| | | | | 451/2 |
| 2004/0005849 | A1 * | 1/2004 | Linde | B24C 1/045 |
| | | | | 451/99 |
| 2004/0043704 | A1 * | 3/2004 | Saberton | B26F 3/004 |
| | | | | 451/38 |
| 2005/0145166 | A1 | 7/2005 | Seo et al. | |
| 2005/0202764 | A1 | 9/2005 | Tateiwa et al. | |
| 2007/0037495 | A1 | 2/2007 | Matsubara et al. | |
| 2011/0250361 | A1 * | 10/2011 | Vijay | B05B 1/083 |
| | | | | 427/446 |
| 2012/0077423 | A1 * | 3/2012 | Pei | B24C 1/045 |
| | | | | 451/89 |
| 2012/0252326 | A1 | 10/2012 | Schubert et al. | |
| 2012/0276818 | A1 | 11/2012 | Cramer et al. | |
| 2013/0025422 | A1 * | 1/2013 | Chillman | B24C 5/00 |
| | | | | 83/53 |
| 2014/0045409 | A1 * | 2/2014 | Zhang | B65G 53/66 |
| | | | | 451/2 |
| 2014/0051334 | A1 | 2/2014 | Raghavan et al. | |
| 2014/0087635 | A1 | 3/2014 | Ogawa et al. | |
| 2014/0193582 | A1 * | 7/2014 | Quentin De Gromard | B24C 3/32 |
| | | | | 427/289 |
| 2014/0235140 | A1 * | 8/2014 | Maurer | B26F 3/004 |
| | | | | 451/5 |
| 2015/0038055 | A1 * | 2/2015 | Raghavan | B24C 7/0007 |
| | | | | 451/40 |
| 2015/0174732 | A1 * | 6/2015 | Raghavan | B24C 1/045 |
| | | | | 451/2 |
| 2015/0233361 | A1 | 8/2015 | Raghavan et al. | |
| 2015/0283662 | A1 | 10/2015 | Bossoni et al. | |
| 2017/0151650 | A1 * | 6/2017 | Miller | B24C 11/005 |
| 2017/0334036 | A1 * | 11/2017 | Turner | B24C 7/0015 |
| 2018/0361538 | A1 * | 12/2018 | Ward | B24C 9/003 |
| 2019/0084125 | A1 * | 3/2019 | Nambiath | B24C 1/045 |
| 2019/0201828 | A1 * | 7/2019 | Storer | B01D 45/12 |

* cited by examiner

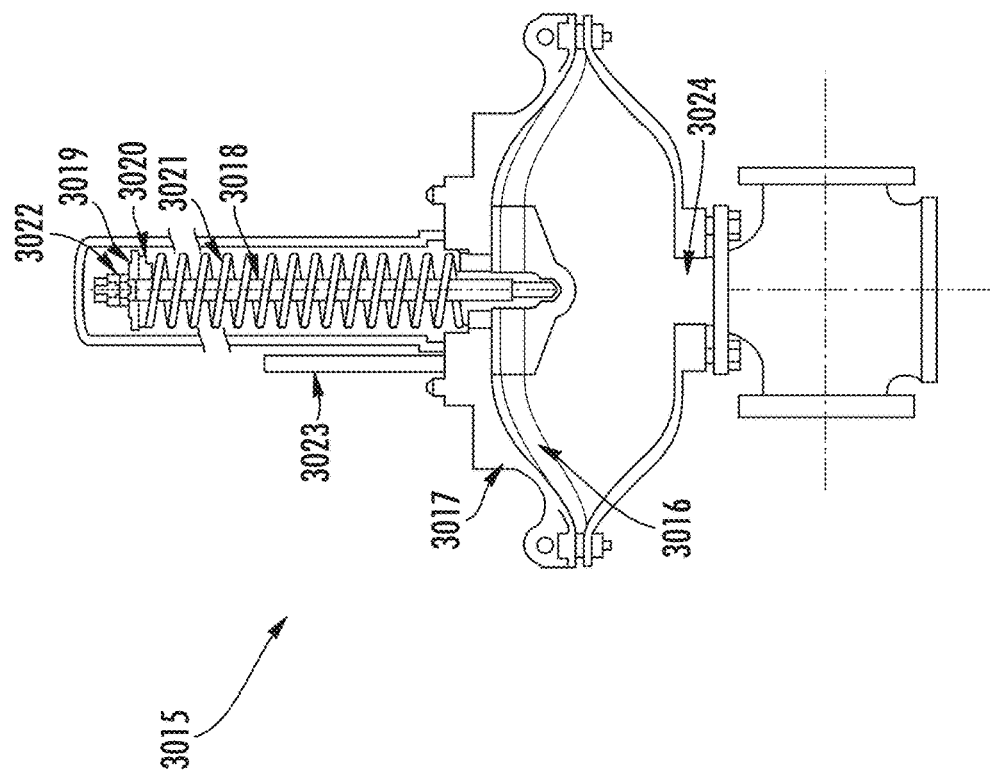
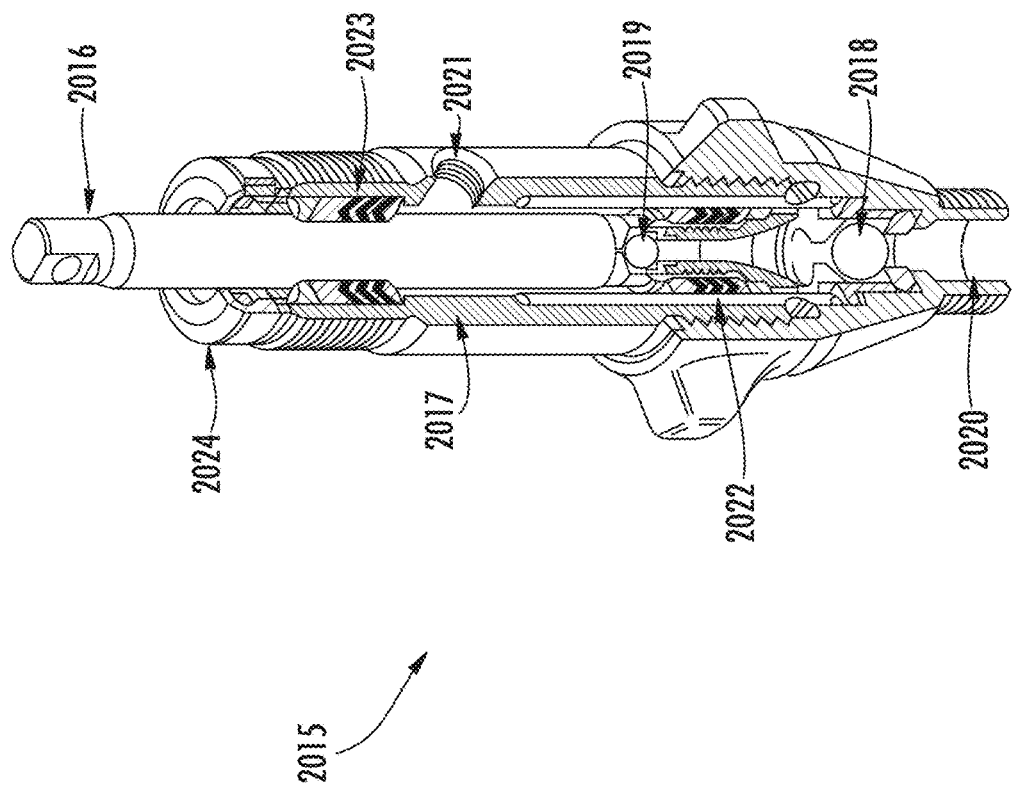
FIG. 5B
FIG. 5A

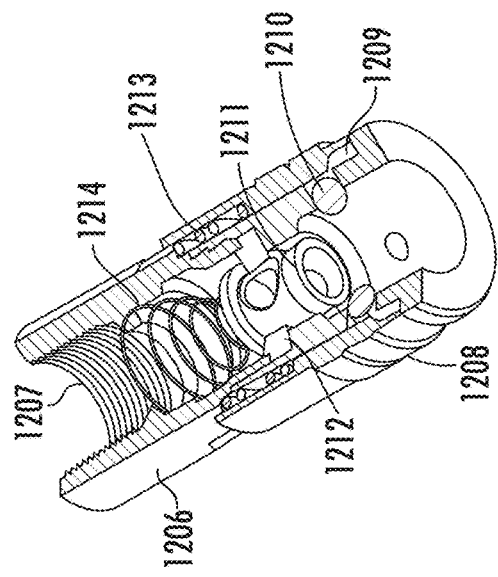
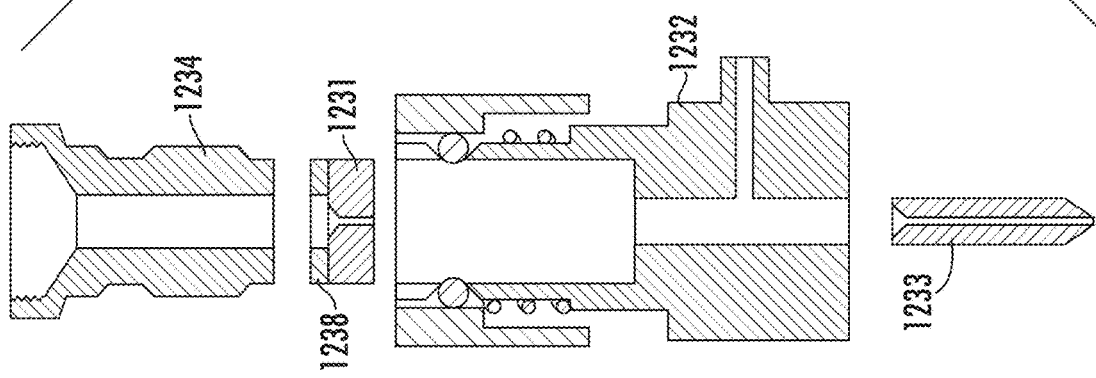
FIG. 12A
FIG. 12B

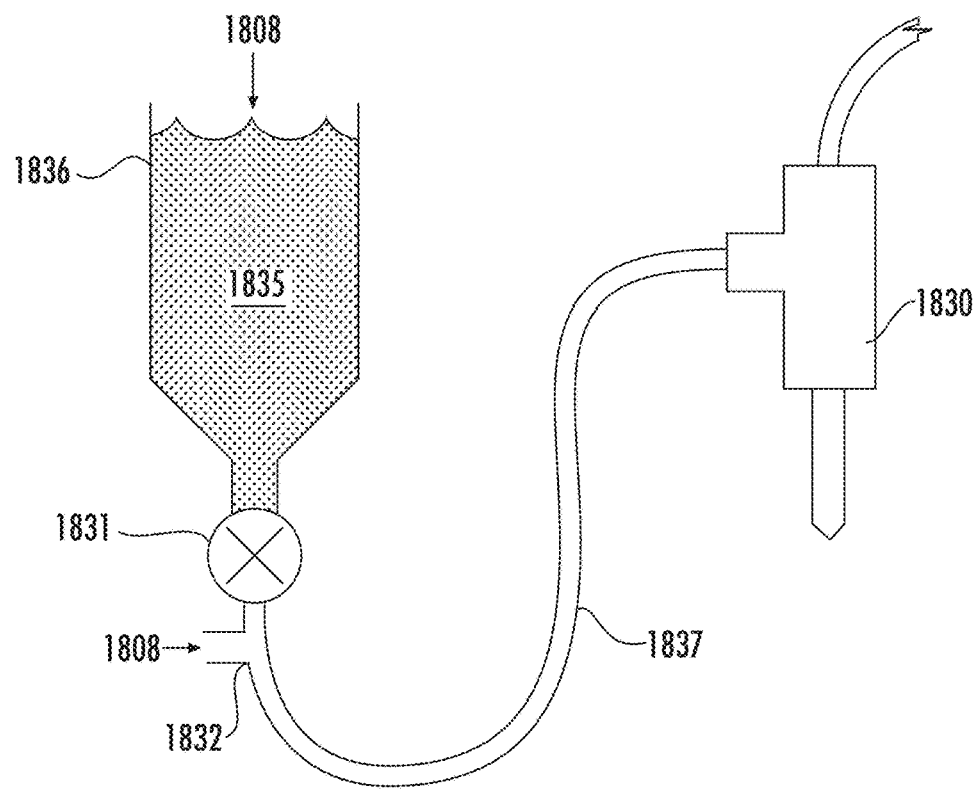
FIG. 18C
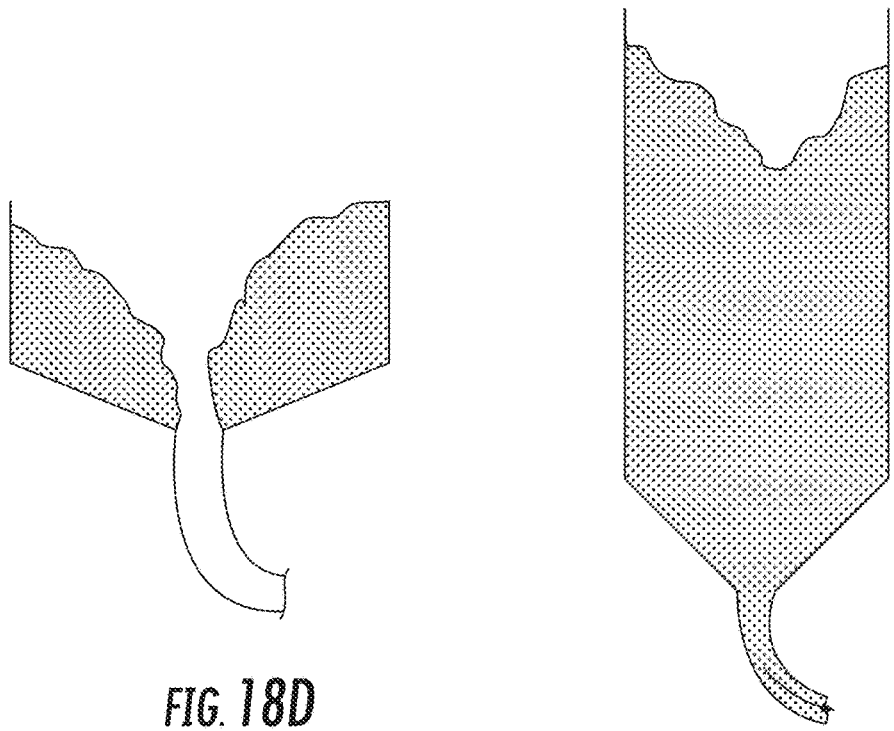
FIG. 18D
FIG. 18E

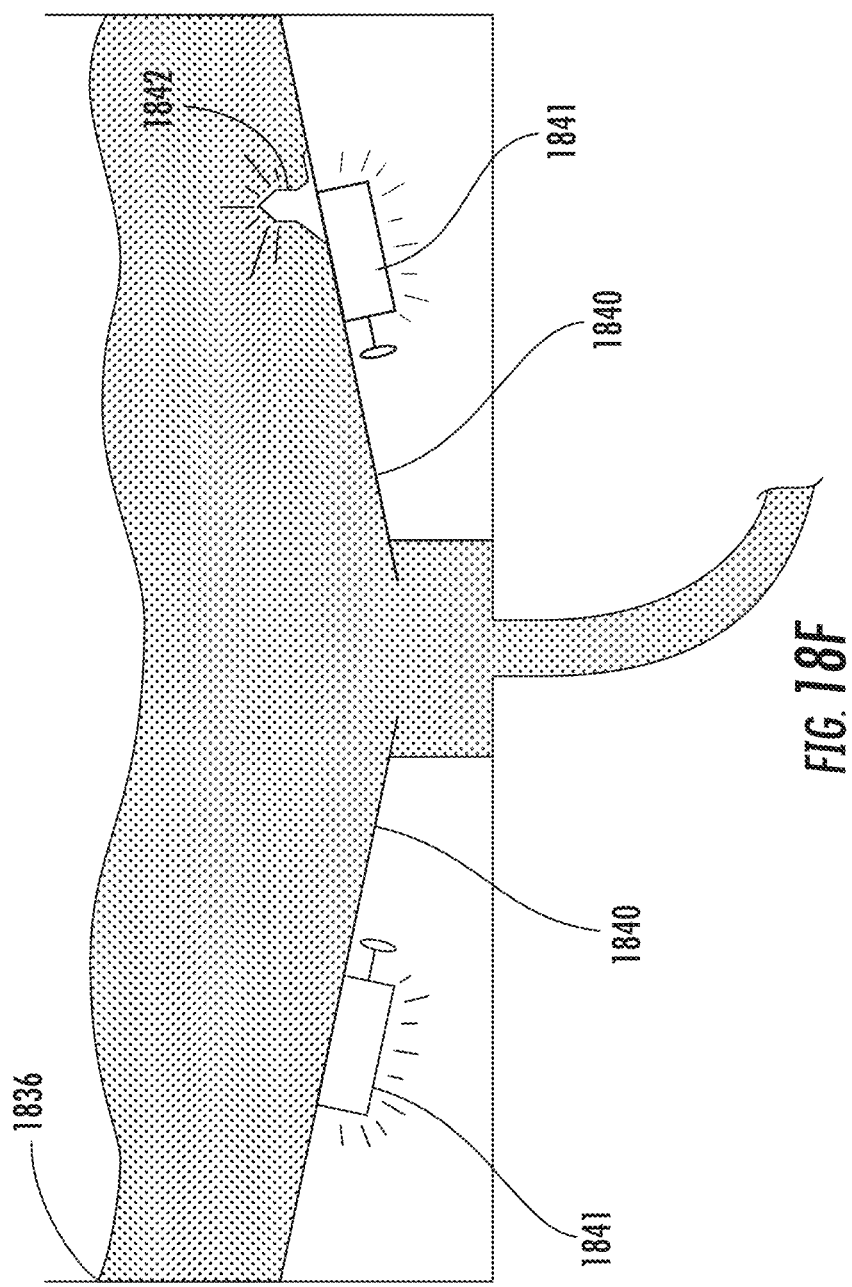

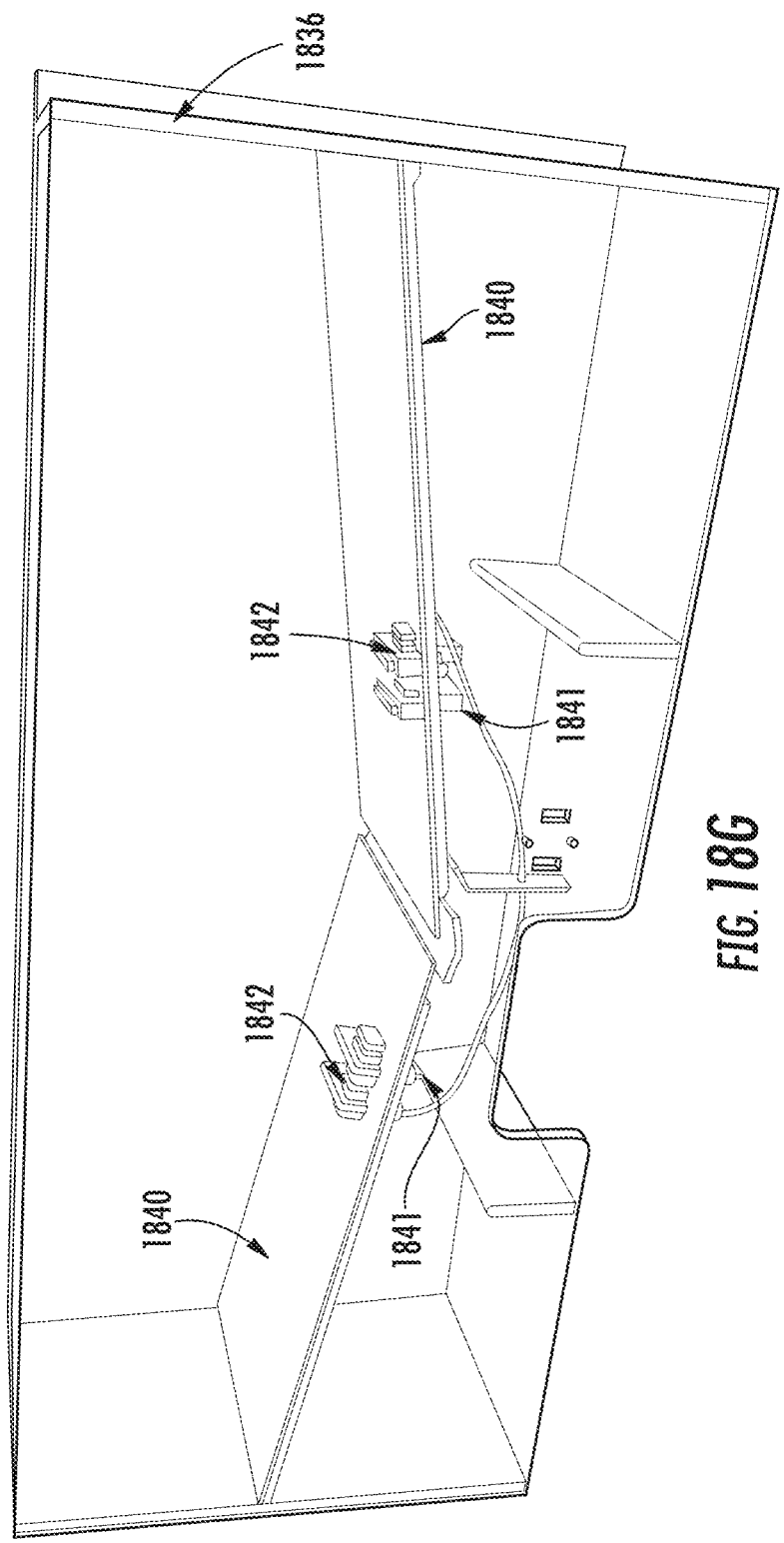

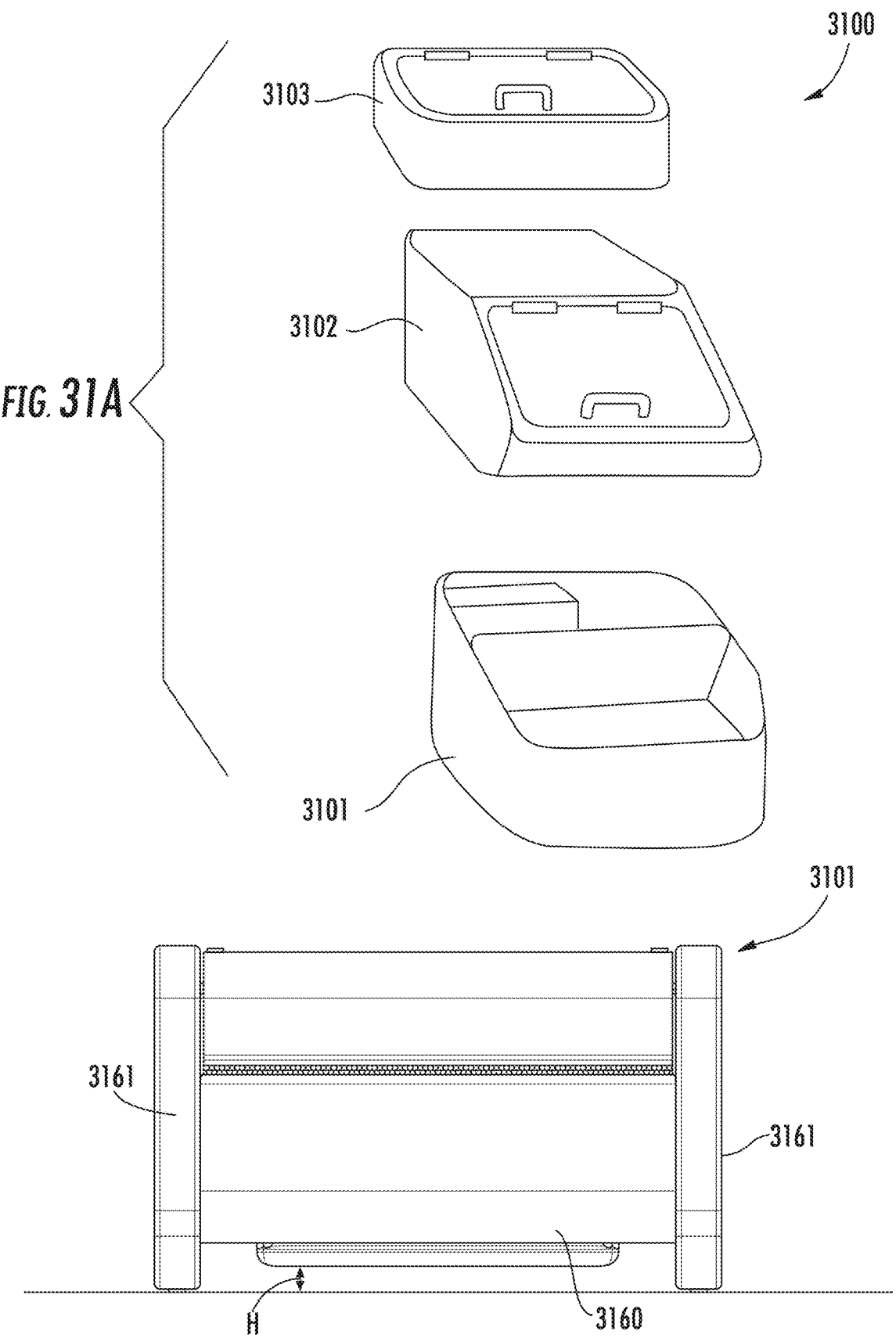

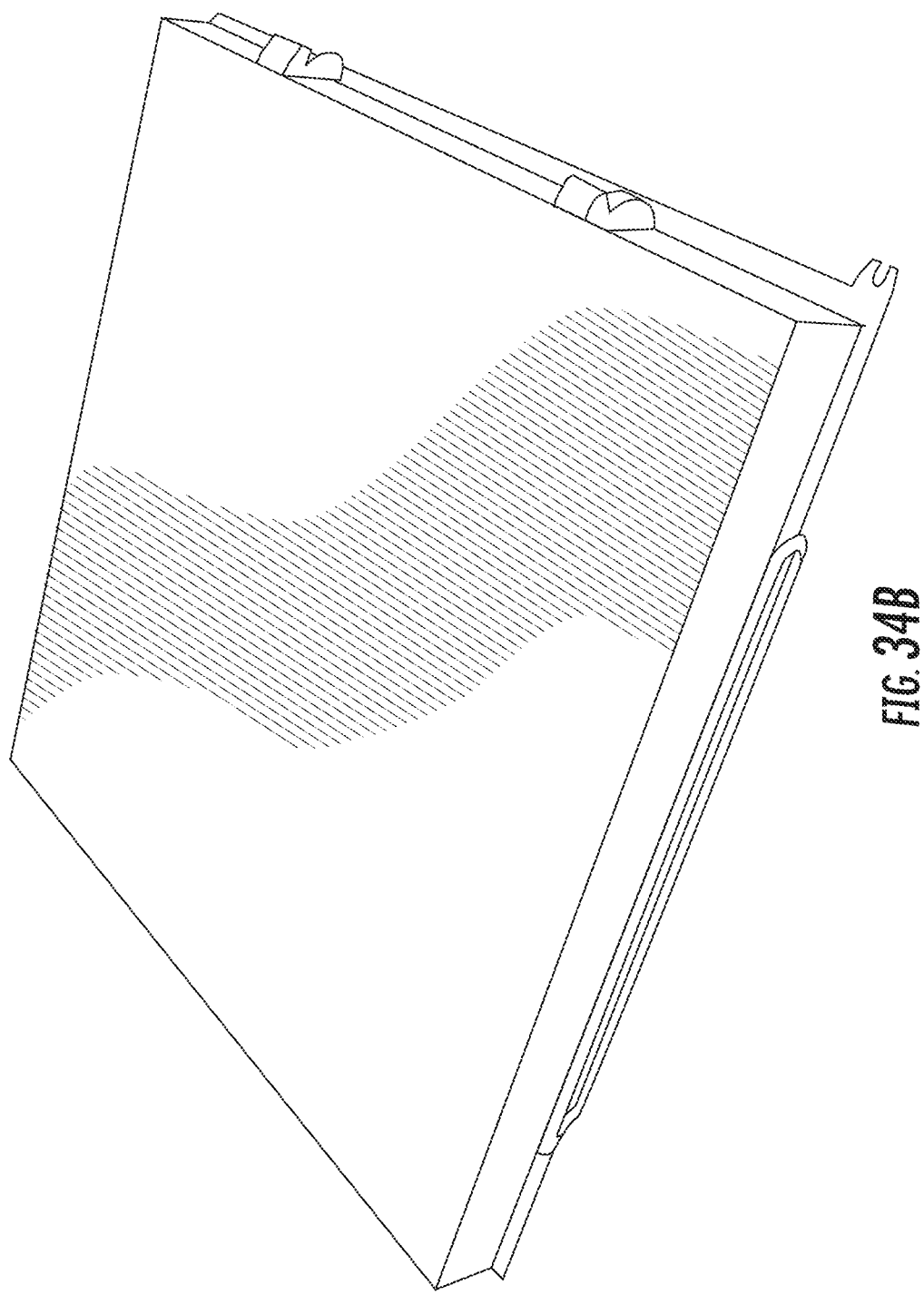

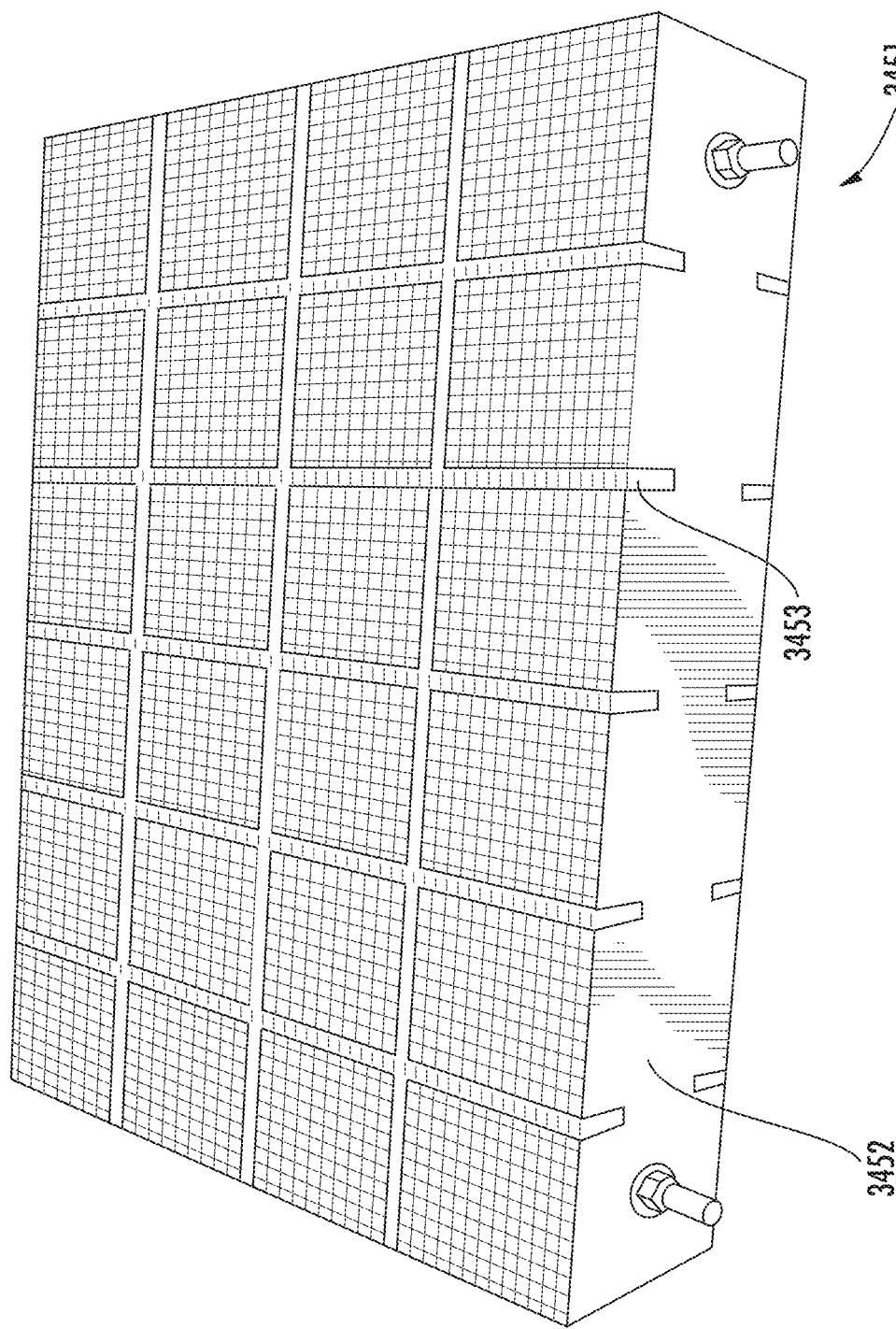

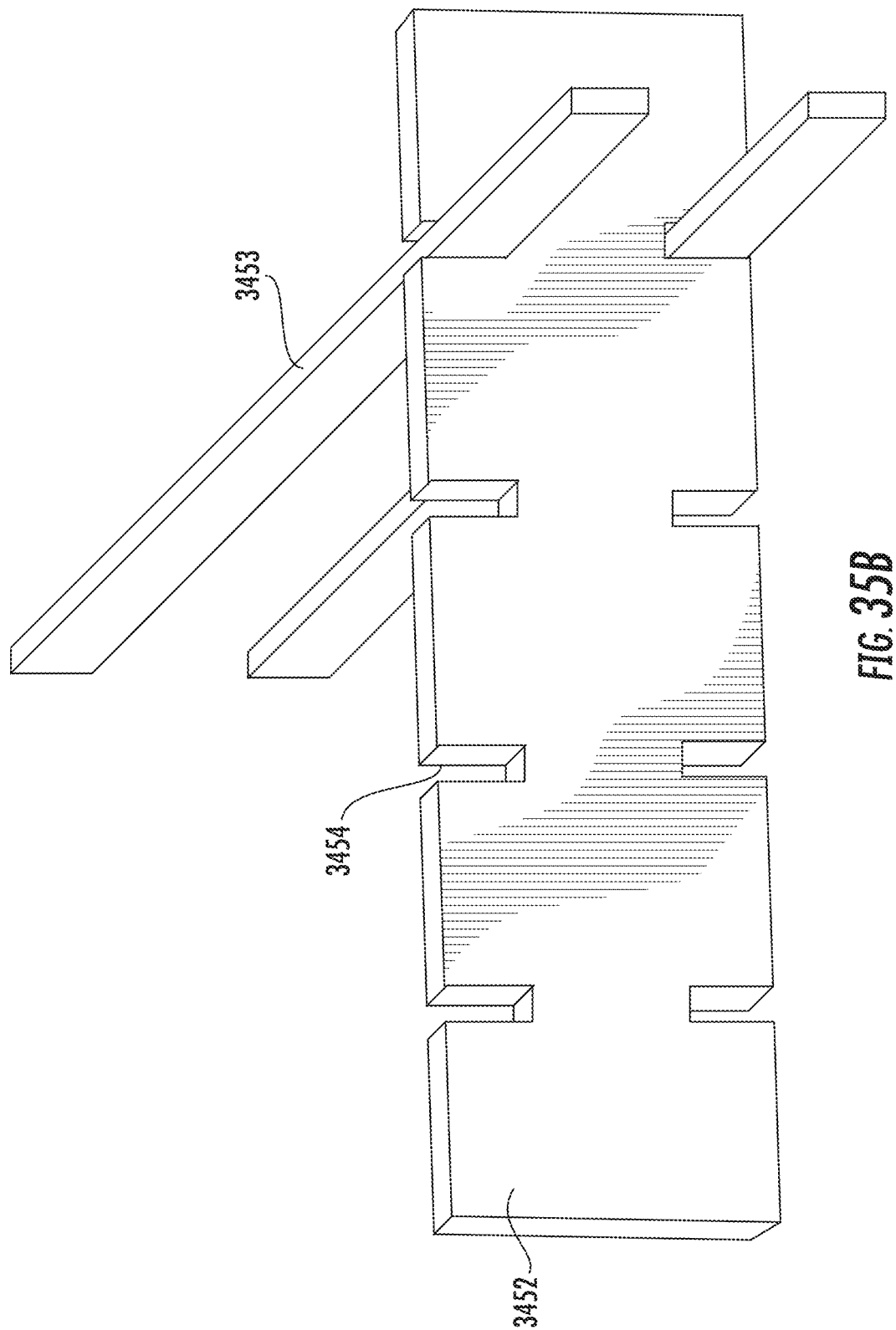

WATERJET SYSTEMS AND METHODS

CROSS-REFERENCE TO RELATED APPLICATIONS

This application is a U.S. national phase application of International Patent Application No. PCT/US2017/031347, filed May 5, 2017, which claims priority to U.S. Provisional Application No. 62/332,196, filed May 5, 2017, the entire disclosures of which are incorporated herein by reference.

FIELD OF THE DISCLOSURE

The disclosure relates to waterjet systems and methods, including waterjets that expel a high velocity stream of fluid for cutting a workpiece.

BACKGROUND OF THE DISCLOSURE

Waterjet systems convert high pressure water into a high velocity water stream in an effort to erode the material that it is directed at. An abrasive may be present in this high velocity water stream. Such an abrasive may improve the cutting speed or expand the range of materials that can be cut. Waterjet technology is well known in the manufacturing industry due to its advantages over other cutting systems, such as its ability to cut a diverse range of workpiece materials and lack of induced thermal stress on a workpiece.

A waterjet may be defined by its configuration of fluid stream and abrasive with regards to the cutting head nozzle. One configuration, a pure waterjet, is fundamentally shown in FIG. 1A. A pure waterjet does not contain any abrasive in the fluid stream. A pure waterjet utilizes a high pressure fluid stream 100 that is fed into a cutting head 110, which accelerates the flow through a small orifice into a high velocity fluid stream 120. Pure waterjets are often limited in the materials that may be cut.

Another configuration, an Abrasive Suspension Waterjet (ASWJ), is fundamentally shown in FIG. 1B. An ASWJ utilizes a high pressure water-abrasive mixture or slurry 200 that is fed into a cutting head 210, which accelerates the flow through a small orifice into a high velocity fluid stream 220. Since the abrasive is suspended in the pressurized fluid (e.g. water), it causes significant wear on the small orifice as it flows through it. The abrasive may be added to the water upstream of the pump (before the water is pressurized) or downstream of the pump (after the water is pressurized). The abrasive may cause internal wear to the pump of the ASWJ if it is added to the water before the water is pressurized.

A third configuration, an Abrasive Injection Waterjet (AIWJ), is fundamentally shown in FIG. 1C. An AIWJ is similar to a pure waterjet, but includes an abrasive 300 that is injected into the cutting head 310 after the high pressure fluid stream 100 is accelerated to a high velocity. This provides a high velocity fluid and abrasive stream 320. An AIWJ may be advantageous compared to a pure waterjet due to its improved cutting capabilities, and does not experience the internal wear to the orifice and possibly the pump as in an ASWJ. For these reasons, and AIWJ may be preferred in the manufacturing industry.

A waterjet may be further defined by the construction of its hydraulic pump subsystem. One construction, a specialty direct drive crank pump, is illustrated in FIG. 1D and schematically shown in FIG. 1E. In this type of construction, line voltages 400 of 230-460V are provided to a variable frequency drive 490, which controls a motor 410 of 20-100 hp. The motor 410 is coupled 420 to the hydraulic pump 430 via a crankshaft 421 which drives a number of plungers 431 in respective cylinders 432 to an ultra-high pressure 470, typically in the range of 10,000-60,000 psi, which is fed into the cutting head of a water jet. Ordinary tap water 440 at least 30+ psi is fed through a 0.4-1 µm filtration system 450, resulting in purified water that is appropriate for the sensitive pump 430. These pumps are not capable of storing and holding their pressure, therefore, they also require a release valve circuit 480 to be present when the supply to the cutting head is shut.

Another construction, a hydraulic intensifier pump, is illustrated in FIG. 1F and schematically shown in FIG. 1G. In this type of construction, line voltages 400 of 230-460V are provided to a motor 410 of up to 200 hp. The motor 410 is coupled 420 to the hydraulic pump 500 which pressurizes hydraulic fluid 510 to around 3000 psi. A set of valves 540 comprising a pilot valve 541 and shifter valve 542 controlled by electronics 550 is used to appropriately manage the hydraulic fluid supply and return lines 560 to the reciprocating intensifier pump 570. The set of valves 540 is connected to the main hydraulic cylinder 571 of the intensifier pump 570 via a sub plate 543. The intensifier pump is symmetrical on either side of the main hydraulic cylinder 571 with an end bell assembly 572, high pressure cylinder 573, and end cap 574 on either side. Each end cap includes a check valve assembly 575. The hydraulic fluid 520 to the hydraulic pump 500 often needs to be cooled through a subsystem 530. With a 3000 psi hydraulic fluid supply line 560, the intensifier pump 570 applies ultra-high pressure to the fluid 580, typically in the range of 60,000-90,000 psi, which is fed into a hydraulic attenuator 590 to smooth out the pressure before it is fed to the cutting head 511. Ordinary tap water 440 at least 30+ psi is fed through a 0.4-1 µm filtration system 450, resulting in purified water that is appropriate for the sensitive intensifier 570.

A third construction, an electric servo pump, is schematically shown in FIG. 1H. In this type of construction, line voltages 400 of 230-460V are provided to a servo motor 600 of 15-50 hp. The motor 600 envelops a high load, precision ball screw, reciprocating plungers in the pump 620. The pump 620 creates an ultra-high pressure 630, typically in the range of 10,000-66,000 psi, that can be fed into a hydraulic attenuator 590 to smooth out the pressure before it is fed to the cutting head 640. Ordinary tap water 440 at least 30+ psi is fed through a 0.4-1 µm filtration system 450, resulting in purified water that is appropriate for the sensitive pump 620.

Current waterjet systems of the above constructions share numerous deficiencies, including high machine costs, high maintenance, costly material usage, and large spatial requirements. These systems also typically require specialized infrastructure to be present within the facility in order to support the operations. Many of the deficiencies are due to the high working pressures (e.g. in the range of 10,000-90,000 psi) and power requirements (up to 200 hp) of these systems. As a consequence, waterjet cutting systems are typically limited to sophisticated entities that have the resources to support such complex and expensive systems.

Significant effort has been devoted to increasing the efficiency of waterjet systems through research and multi parameter optimizations. The optimization efforts are typically focused on minimizing the direct cutting costs while minimizing the abrasive, electrical power consumption, or water flowrates to achieve a desired cut, and also minimizing indirect maintenance costs of the machines, such as rebuild costs. The ultra-high pressures and high horse-powers of typical hydraulic constructions are utilized for this research and optimization, as the industry has attributed that cutting costs will increase as pressure and/or horsepower are decreased. This ignores the costs that these systems command due to the high pressure and horsepower requirements.

SUMMARY OF THE DISCLOSURE

The present disclosure may provide a waterjet system comprising a pump configured to pump fluid at a pressure between 2000 psi and 8000 psi, an electric motor configured to drive the pump, a hopper configured to store abrasive, a mixing chamber configured to mix abrasive from the hopper and the fluid from the pump to produce a slurry, a cutting bed configured to receive a workpiece to be cut, and a cutting head, including an outlet nozzle, in downstream fluid communication from the mixing chamber. The cutting head may be configured to expel the slurry through the outlet nozzle as a high-velocity jet into the cutting bed.

The waterjet system of the present disclosure may further comprise an abrasive collection system. The abrasive collection system may include a tank locating downstream of the cutting bed. The tank may have one or more suction ports configured to suction the slurry from the tank. The abrasive collection system may include a support frame for supporting the waterjet system. The tank may be arranged on the support frame above a ground surface.

The waterjet system of the present disclosure may further comprise one or more venturi fittings to generate the suction force for suctioning the slurry through the one or more suction ports in the tank. The waterjet system of the present disclosure may further comprise a collection pump configured to pump fluid through an outlet in the tank such that the slurry is urged toward the one or more suction ports in the tank. The waterjet system of the present disclosure may further comprise a collection pump configured to pump tank fluid from an inlet in the tank through the one or more venturi fittings for creating the suction force to suction the slurry from the tank.

The waterjet system of the present disclosure may further comprise one or more baffles positioned adjacent the inlet. The one or more baffles may be configured to reduce debris from entering the collection pump. The waterjet system of the present disclosure may further comprise a collection pump configured to generate a suction force for suctioning the slurry through the one or more suction ports in the tank.

The abrasive collection system of the present disclosure may further comprise a fluid discharge outlet for discharging fluid from the tank, and a holding container for collecting abrasive that is separated from the fluid. The slurry of the present disclosure may be suctioned through the one or more suction ports into a holding container disposed within the tank. The tank of the present disclosure may have an angled bottom for urging the slurry toward the one or more suction ports.

The waterjet system of the present disclosure may further comprise an abrasive collection system including a tank located downstream of the cutting bed. The tank may include a replaceable bottom plate, and a moisture sensor located below the replaceable bottom plate. The moisture sensor may be configured to detect the presence of moisture. The moisture sensor may be configured to perform one or more of the following if moisture is detected: trigger an alarm and stop the high-velocity jet.

The waterjet system of the present disclosure may further comprise a motion system configured to move the cutting head relative to the cutting bed and a jet sensor configured to detect a parameter of the high-velocity jet. The waterjet system of the present disclosure may be configured to adjust an operating condition based upon the detected parameter of the jet sensor. The operating condition may be one or more of the following: a feed-rate, a dwell time, a pressure, a fluid flowrate, and an abrasive flowrate. The waterjet system of the present disclosure may further comprise a motion system configured to move the cutting head relative to the cutting bed. The motion system may be a linear motion system controlled by one or more controllers. The motion system may be configured to move the cutting head relative to the high-pressure valve.

The waterjet system of the present disclosure may further comprise a high-pressure valve located along a flow path of the fluid, between the pump and the cutting head to start and stop fluid flow to the cutting head. The high-pressure valve may be controlled by one or more controllers. There may be no additional valve located along the flow path of the fluid between the high-pressure valve and the cutting head.

The pump of the present disclosure may be one or more of the following: a diaphragm pump and a piston pump. The pump of the present disclosure may be a crank pump. The crank pump may be a triplex plunger pump, without a variable frequency drive. The pump of the present disclosure may operate at a single speed. The pump may be configured to pump fluid between 0.1-1 gpm. The pump may have an operating hydraulic power between 1-5 hp. The pump may have an operating hydraulic power between 1-2.4 hp. The abrasive from the hopper to the cutting head of the present disclosure may have a flowrate of between 0.1 to 0.5 lb/min. The electric motor of the present disclosure may have a power source, the power source being either single-phase 120V or 240V alternating current. The outlet nozzle of the present disclosure may have an inside diameter between 0.010 in and 0.065 in. The outlet nozzle may be fixedly attached to the mixing chamber. The pump and the mixing chamber of the present disclosure may be connected with a fluid line. The fluid line may be detachably connectable to the mixing chamber with a quick-connect fitting.

The hopper and the mixing chamber of the present disclosure may be connected with an abrasive line. The abrasive line may be in direct connection with the mixing chamber. The hopper may be open to ambient. A metering valve may be provided, configured to meter the abrasive in the hopper. The motion system may be configured to move the cutting head relative to one or more of the following: the metering valve and the hopper. The abrasive line may be open to ambient such that there is no pressure differential between the abrasive at an upper portion of the hopper and an output of the metering valve. The hopper may be positioned at or below the mixing chamber. A negative pressure from the mixing chamber may draw abrasive toward the mixing chamber. The hopper may be mounted in a fixed location at or below the cutting head. The hopper may be mounted in a fixed location at or below the mixing chamber.

The hopper of the present disclosure may include a housing and a translatable drawer configured to receive the abrasive. The translatable drawer may be surrounded by the housing and configured to translate relative to the housing for accessing the drawer. The housing may surround one or more of the following: the pump, the electric motor, the mixing chamber, the cutting bed, and the cutting head. The housing may surround all of the following: the pump, the electric motor, the mixing chamber, the cutting bed, and the cutting head. The housing may be located below the cutting bed.

The waterjet system of the present disclosure may further comprise vibration device configured to vibrate the hopper, and an audible device configured to produce an audible noise under a vibration range to warn a user of a low abrasive level in the hopper. The cutting bed of the present disclosure may include a plurality of apertures arranged in a grid. The cutting bed may include a visual grid formed by interlocking sheets. The cutting bed may made of one or more of the following: a honeycomb metal, an extruded plastic, and a corrugated plastic.

DESCRIPTION OF THE DRAWINGS

For a fuller understanding of the nature and objects of the disclosure, reference should be made to the following detailed description taken in conjunction with the accompanying drawings, in which:

FIG. 5A is an illustration of a piston pump.

FIG. 5B is an illustration of a diaphragm pump.

FIG. 12A is a cross-sectional view of a cutting head according to another embodiment of the present disclosure.

FIG. 12B is an illustration of an exemplary quick connect.

FIG. 18A-18C are illustrations of abrasive feeding subsystems according to embodiments of the present disclosure.

FIG. 18D-18E are illustrations of prior art hopper designs.

FIG. 18F is an illustration of a hopper design according to an embodiment of the present disclosure.

FIG. 18G depicts an embodiment of a hopper design according to an embodiment of the present disclosure.

FIGS. 31A-31B are illustrations of AIWJ machines according to further embodiments of the present disclosure.

FIGS. 34A-34B depict exemplary cutting beds.

FIGS. 35A-35B illustrate cutting beds according to embodiments of the present disclosure.

DETAILED DESCRIPTION OF THE DISCLOSURE

Figure 1A:
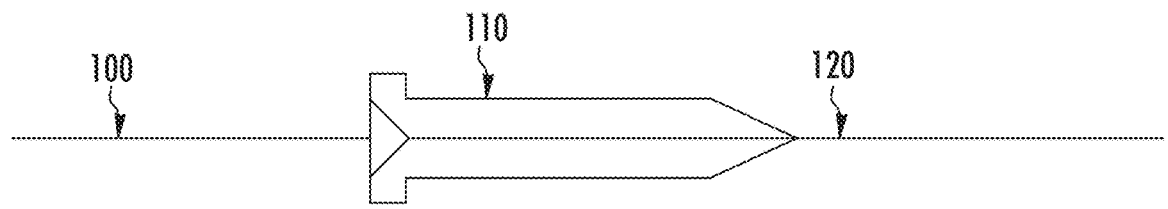
FIG. 1A is a schematic of a prior art pure waterjet.
Figure 1B:
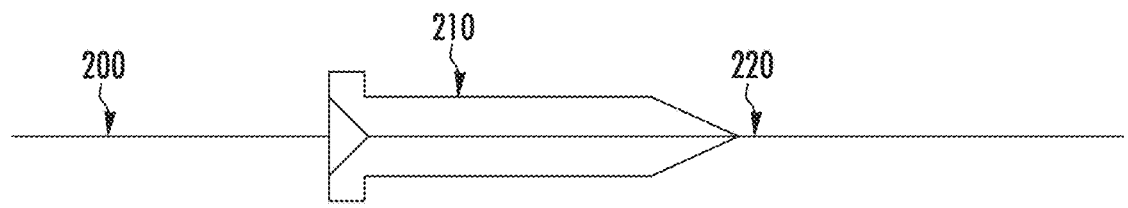
FIG. 1B is a schematic of a prior art abrasive suspension waterjet (ASWJ).
Figure 1C:
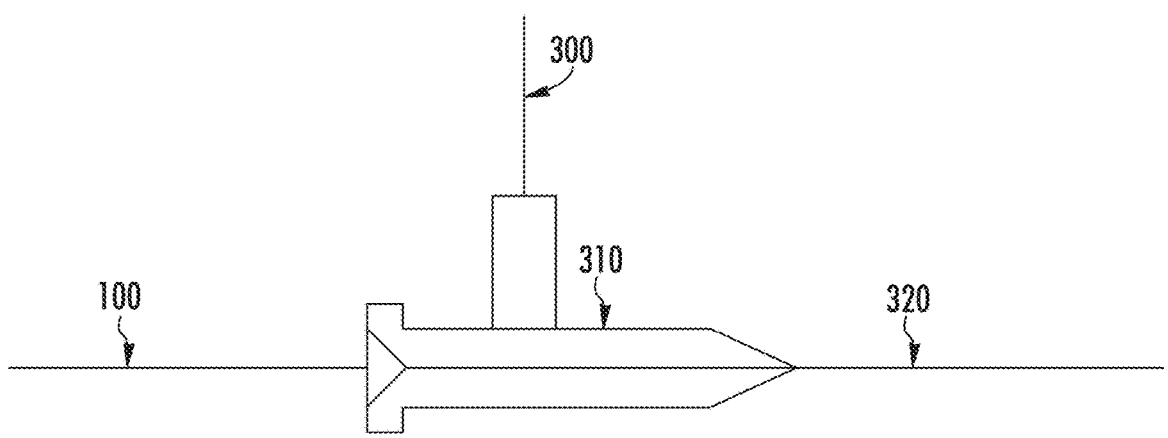
FIG. 1C is a schematic of a prior art abrasive injection waterjet (AIWJ).
Figure 1D:
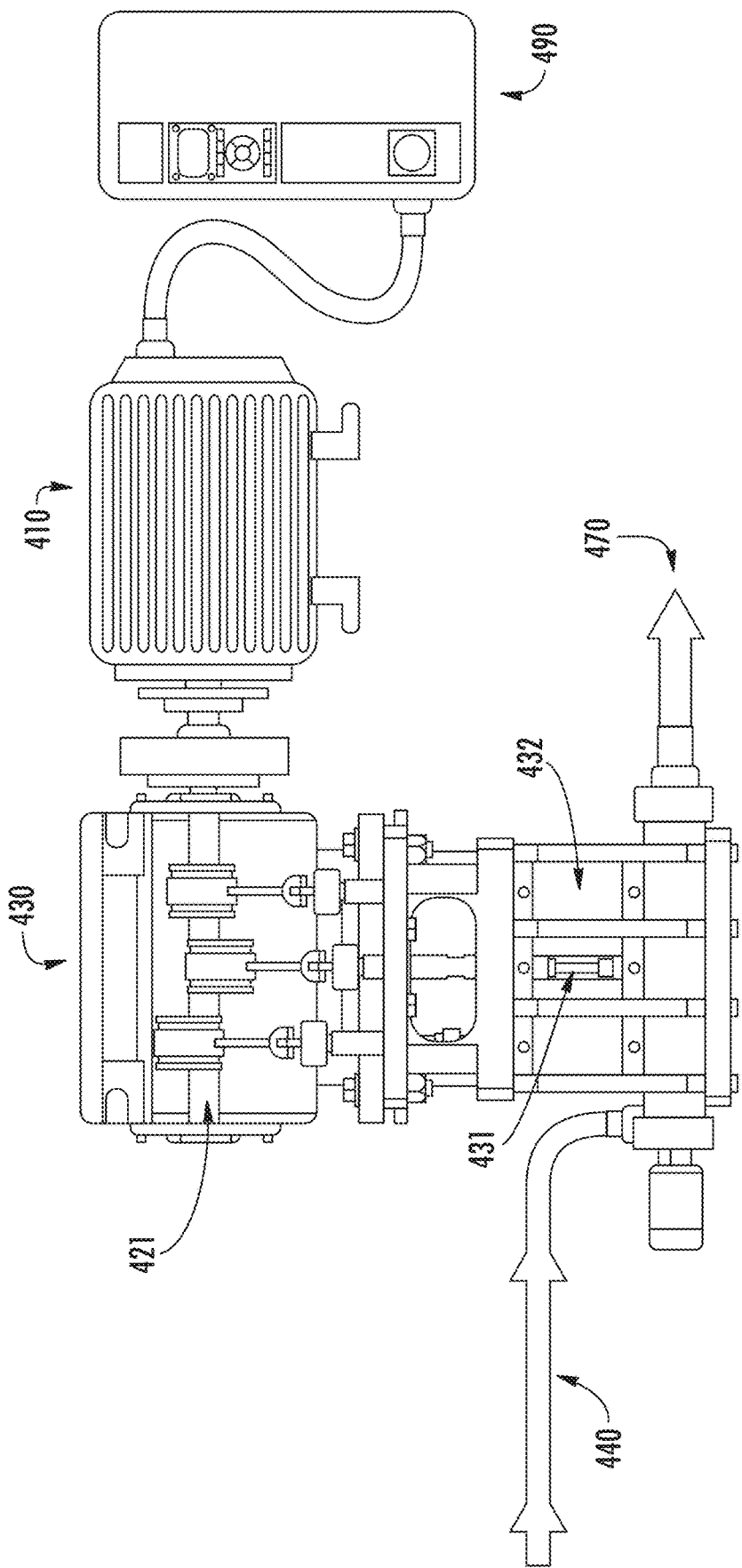
FIG. 1D is a schematic of a prior art direct drive crank pump.
Figure 1E:
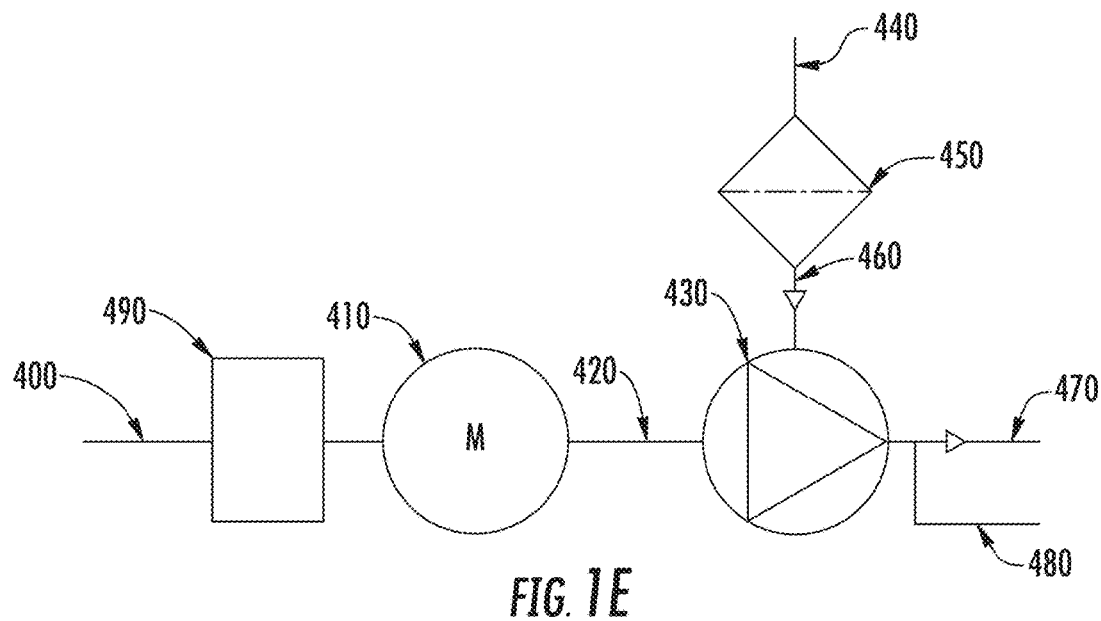
FIG. 1E is another schematic of a prior art direct drive crank pump.
Figure 1F:
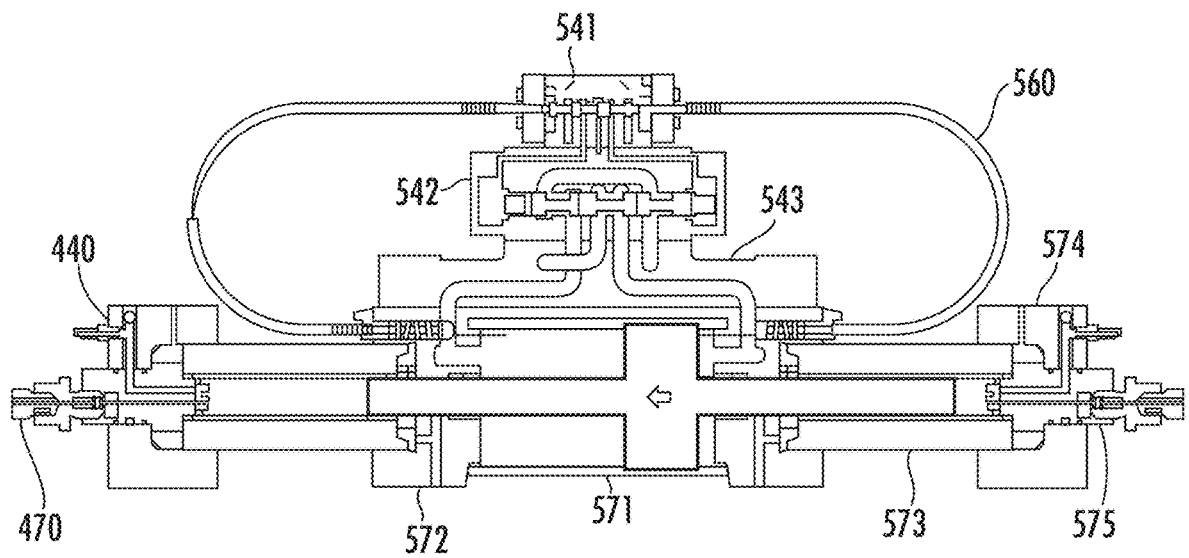
FIG. 1F is a schematic of a prior art hydraulic intensifier pump.
Figure 1G:
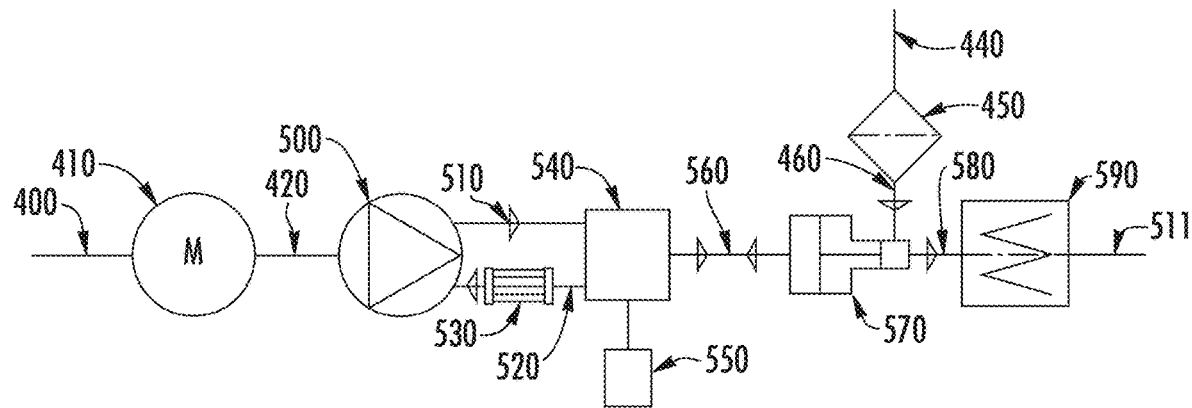
FIG. 1G is another schematic of a prior art hydraulic intensifier pump.
Figure 1H:
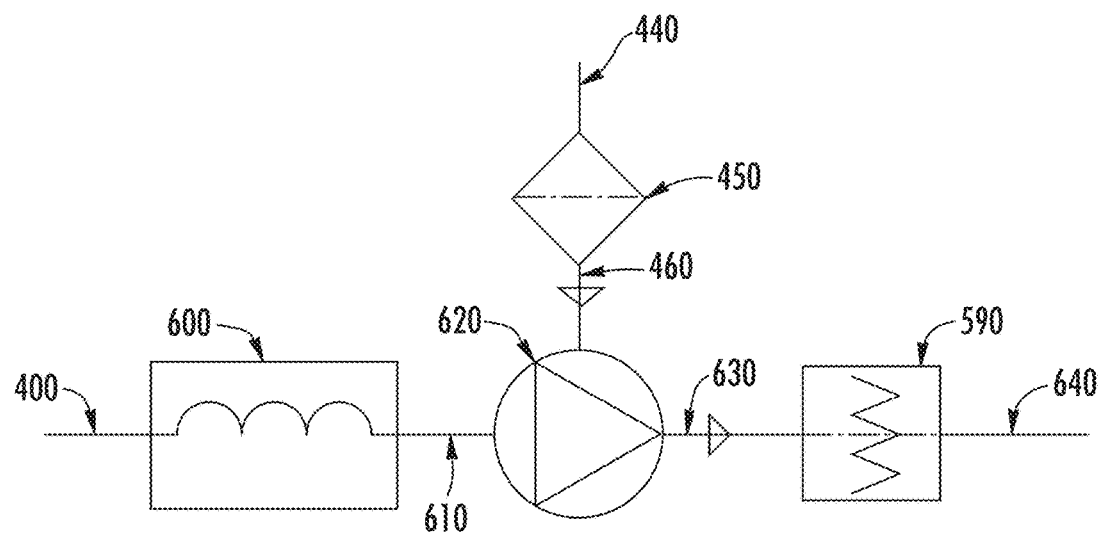
FIG. 1H is a schematic of prior art electric servo pump.
Figure 2:
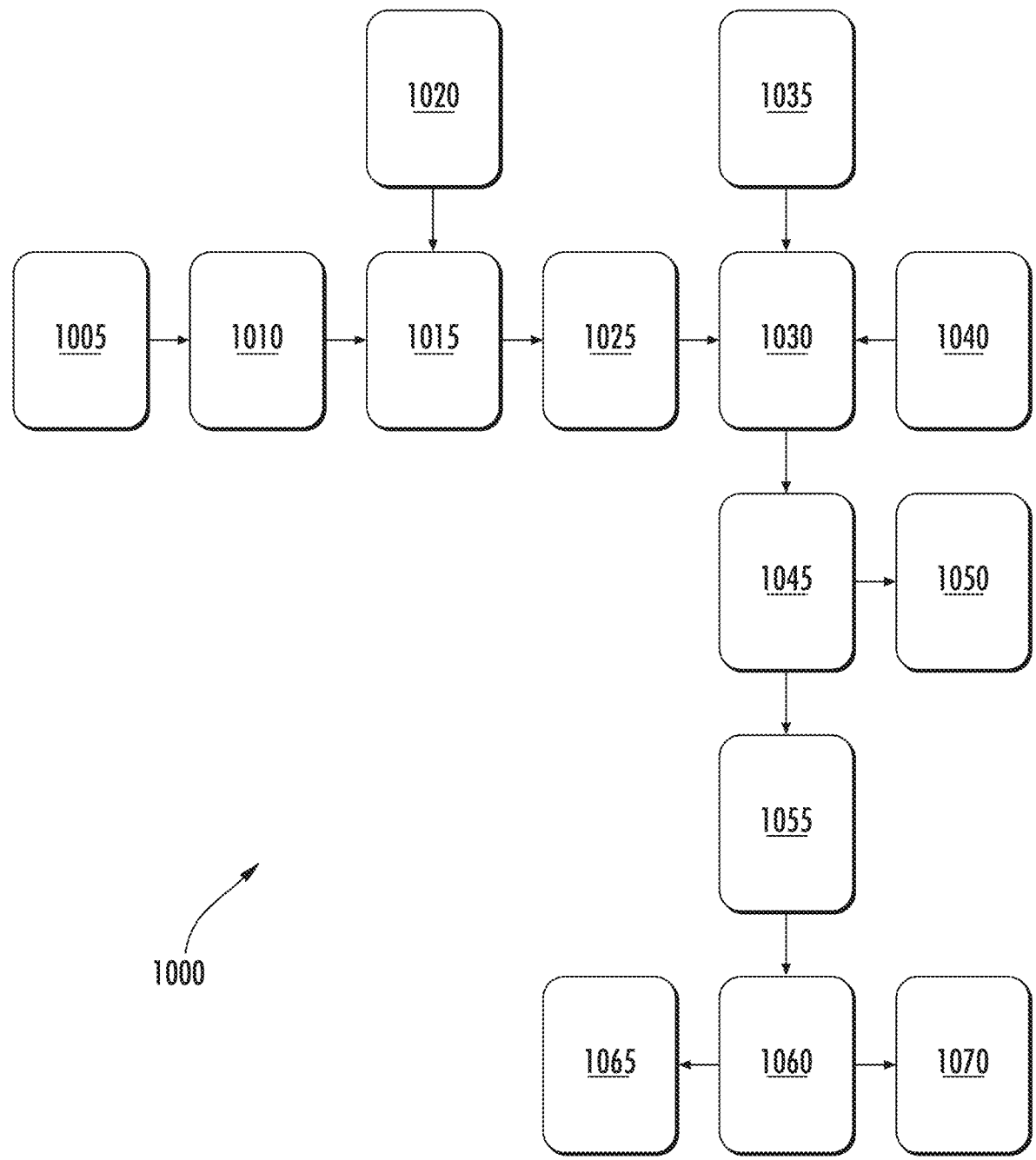
FIG. 2 is a block diagram illustrating an exemplary system according to the present disclosure.

FIG. 2 depicts a flowchart of a cutting method 1000 using an abrasive injection waterjet (AIWJ) according to an embodiment of the present disclosure. The method 1000 can include a connection to a standard voltage power source 1005. The power source 1005 may be 120 VAC or 240 VAC depending on the geographic region if it is directly plugged into the wall, but it can also be a DC voltage. The power source 1005 can power an electric motor 1010, as well as onboard electronics that control the operation of the machine. The electric motor 1010 can power the pump 1015, and be any suitable motor, such as an induction motor or brushless motor. The electric motor 1010 may be coupled to the pump 1015 directly or through an appropriate speed manipulation mechanism, such as a gearbox or pulley system so that the pump 1015 can be run at a fixed but appropriate speed.

The method 1000 can include the use of standard household tap water 1020 at normal ambient pressure or higher as an input to the pump 1015. In certain embodiments, the water 1020 may be of relatively low pressure, ranging about 0-100 psi gauge. The pump 1015 can be configured to pressurize the input water 1020 to high pressure water 1025. In one example, the high pressure water 1025 may be approximately 2,000 psi to 5,000 psi or 2,000 psi to 8,000 psi. Any suitable pump that can generate pressure in this range can be used. Unlike prior art systems, it may not be necessary to filter the input water 1020 on the order of 0.4-1.0 μm due to the pump constructions described herein, which operate at relatively lower power and pressures.

The high pressure water 1025 may be fed into the cutting head 1030. Abrasive 1035 may be further fed into the cutting head 1030. The abrasive 1035 may be stored in a hopper. The cutting head 1030 mixes the high pressure water 1025 and abrasive 1035 to produce a high-velocity mixture 1045.

The cutting head 1030 can be mounted to a motion system 1040. In one embodiment, the motion system 1040 is a computer numerical control (CNC) motion system, controlled by one or more controllers. In another embodiment, the motion system 1040 is a linear motion system with two axes controlled by one or more controllers. The motion system 1040 may allow the user to manually adjust and lock the height of the cutting head 1030. The motion system 1040 may include additional axes or degrees of freedom for further varying motion. For example, the motion system 1040 can trace out a user-defined two-dimensional path, with positional accuracy of roughly +/−0.0005 in.

The high-velocity mixture 1045 can be directed at the work-piece 1050 for cutting. Once the high-velocity mixture 1045 cuts through the work-piece 1050, the used mixture 1055 can collect in a tank 1060. The used mixture 1055 contains used abrasive 1065 and water 1070. The used water 1070 may be sent to a drain, or recirculated to the pump 1015. The used abrasive 1065 can be separated from the water 1070 and disposed of or recycled by the user, as in other embodiments described herein.

The present system may be powered via a power source 1005 with line voltages of 120V to 240V or even DC power sources on the order of 12-120V. This is in contrast to prior art AIWJ systems that require a minimum of 230V, 45 A power source (or more often, a specialty voltage supply, such as a high current three phase, 380V or 460V) in order to operate. Consequently, systems described in the present disclosure can operate from a standard household power source 1005, such as a common 15A power source. This is due, at least in part, because systems described in the present disclosure may have an electric motor 1010 of less than roughly 2.4 hp or less than 5 hp to be used in the system. In contrast, prior art AIWJ systems require a motor between 15 hp to 200 hp, and more often between 50 hp and 100 hp, depending on the type of pump being used. Thus, the present disclosure may have a smaller electric motor 1010, which can provide lower component and operational costs.

Figure 3:
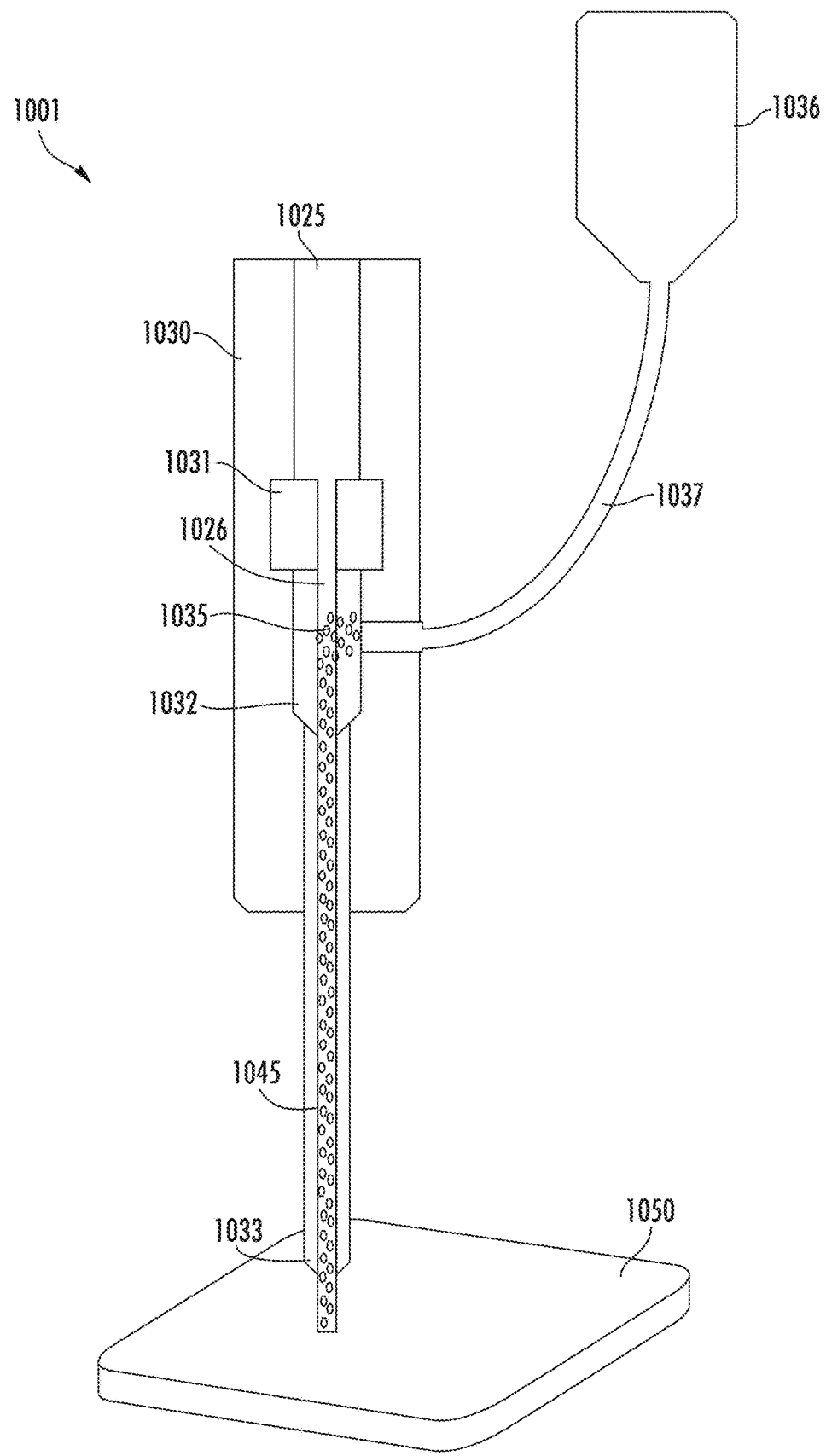
FIG. 3 is a schematic of a subsystem according to an embodiment of the present disclosure.

FIG. 3 is a schematic of a portion of a machine 1001 according to the present disclosure, including a cutting head 1030, workpiece 1050, and hopper 1036. High pressure fluid 1025 (e.g. water) in the cutting head 1030 is urged through an orifice 1031 in order to accelerate the water into a high-velocity fluid stream 1026. The orifice 1031 may have an inside diameter between 0.005 in and 0.030 in. The high-velocity fluid 1026 is then fed into the mixing chamber 1032 to meet the abrasive 1035 that is stored in the hopper 1036.

The hopper 1036 is used to store abrasive particles 1035. In one example, the abrasive particles 1035 may be garnet with a mesh size of 80. Other materials and sizes may be used for the abrasive 1035, depending on the material of the work-piece 1050 desired to be cut. The abrasive 1035 can flow through a hose 1037 into the mixing chamber 1032.

The high-velocity fluid 1026 can create negative pressure inside the mixing chamber 1032, due to the "venturi effect," in order to aid the flow of abrasive 1035 from the hopper 1036. Inside the mixing chamber 1032, the high-velocity fluid 1026 (e.g. water) and abrasive 1035 mix together as they flow through the outlet nozzle 1033 to create a high-velocity mixture 1045 that is used to cut the workpiece 1050. In some embodiments, the outlet nozzle 1033 may have an inside diameter between approximately 0.010 in and 0.065 in.

Figure 4:
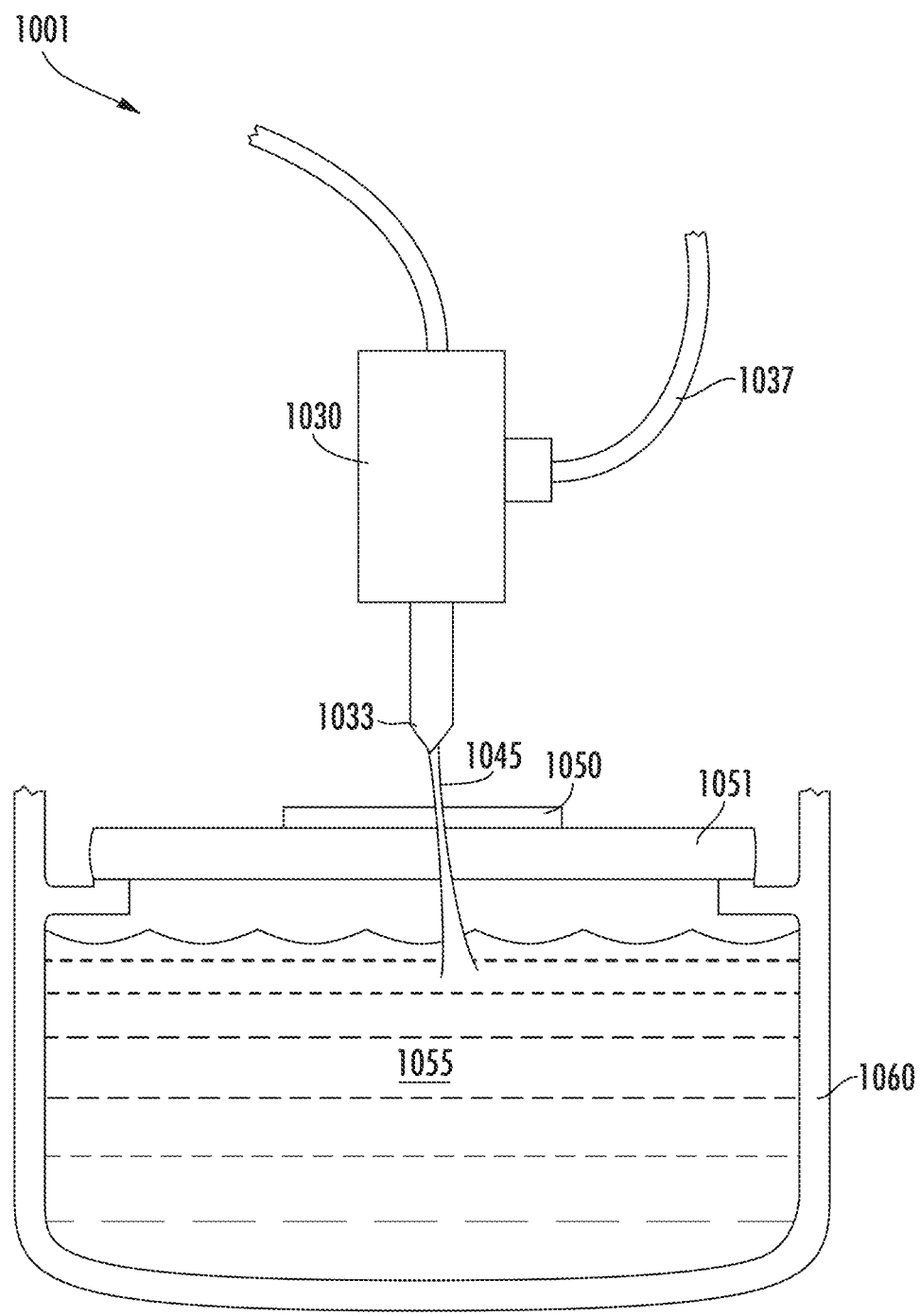
FIG. 4 is a schematic of a subsystem according to another embodiment of the present disclosure.

FIG. 4 is another schematic of a portion of a machine 1001 according to the present disclosure, which further shows the work-piece 1050 resting on a cutting bed 1051. The cutting bed may be made of thin metal or plastic slats. Once the high-velocity mixture 1045 cuts through the work-piece 1050, and passes through the cutting bed 1051, the used mixture 1055 can collect in tank 1060.

FIGS. 5A and 5B depict pump arrangements according to embodiments of the present disclosure. Specifically, FIG. 5A depicts an exemplary piston pump 2015, and FIG. 5B depicts an exemplary diaphragm pump 3015. The piston pump 2015 of FIG. 5A comprises a movable piston 2016 within a cylinder 2017. When the piston 2016 moves in a first direction (upwards in FIG. 5A), the lower ball valve 2018 and upper ball valve 2019 raise and fluid enters the cylinder 2017 via the inlet 2020. The piston 2016 then moves in a second direction (downwards in FIG. 5A), the fluid within the cylinder 2017 between the ball valves 2018, 2019 is pressurized. Upon movement of the piston 2016 again in the first direction, the raising of the upper ball valve 2019 allows the pressurized fluid to exit the cylinder 2017 via the outlet 2021. Lower packings 2022, upper packings 2023, and adjustable packings 2024 are provided to seal the piston 2016 within the cylinder 2017.

The diaphragm pump 3015 of FIG. 5B comprises a movable diaphragm 3016 within a housing 3017. The diaphragm 3016 is moved by an operating rod 3018, which rests in a rod guide 3019 of a spring seat 3020. A compression spring 3021 is provided which engages the spring seat 3020 and the housing 3017 to bias the operating rod 3018. Adjustment nuts 3022 are provided to adjust the preload of the compression spring 3021. A stroke indicator 3023 is provided to show movement of the diaphragm 3016. When the operating rod 3018 moves in a first direction (upwards in FIG. 5B), fluid enters the housing 3017 via an orifice 3024. The operating rod 3018 is then forced by the bias of the compression spring 3021 to move in a second direction (downwards in FIG. 5B), and the fluid is pressurized and exits the orifice 3024.

Although current AIWJ systems utilize pumps that pressurize water to somewhere between 10,000 psi and 90,000 psi, the present disclosure may use pumps, such as pumps 2015 and 3015, to pressurize fluid (e.g. water) at a considerably low pressure, such as fluid pressures between approximately 2,000 psi and 5,000 psi or 2,000 psi and 8,000 psi. A hydraulic attenuator may be used in conjunction with these pump arrangements in order to smooth out any pressure fluctuations that are present in the output stream of the pump. Thus, pumps used according to the present disclosure may be smaller than prior art systems, which allows for a reduction in component, operational, and maintenance costs.

Figure 6:
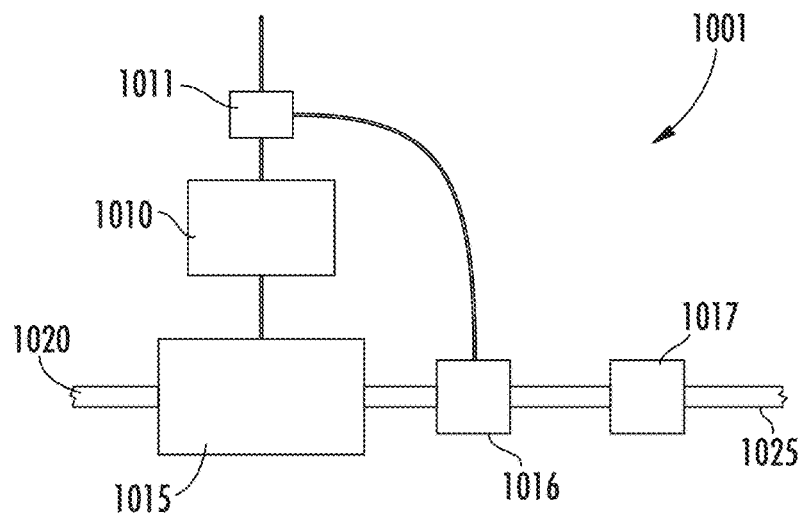
FIG. 6 is a schematic of a subsystem according to an embodiment of the present disclosure.

FIG. 6 depicts an arrangement according to the present disclosure where the pump 1015 does not include a recirculating system. Instead, the system 1001 uses a pressure sensor 1016 to sense when the pump's high-pressure output is closed via high-pressure valve 1017, which results in a pressure spike. The pressure sensor 1016 is connected to the motor switch 1011, which may shut off the electric motor 1010 to stop the pump 1015. This method for managing cycling can be less expensive and more efficient than managing cycling with a recirculation system, which are necessary in prior art designs.

Figure 7:
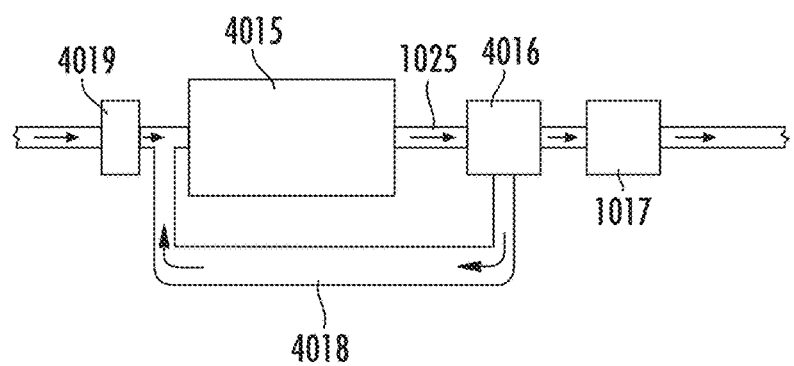
FIG. 7 is a schematic of a subsystem according to another embodiment of the present disclosure.

FIG. 7 depicts another embodiment of the present disclosure, which includes a crank pump, such as a triplex plunger pump 4015 for example, and a recirculating system 4018. In this arrangement, the recirculating system 4018 can allow the electric motor 1010 to remain on, even when the output of high-pressure valve 1017 is closed (e.g. the pump's output fluid can be diverted back to the pump's inlet). A variable frequency drive mechanism for the electric motor 1010 can be omitted in this arrangement, by having the electric motor 1010 rotating at a fixed rate, regardless of the restriction on the output from pump 4015. If the output of the pump 4015 is restricted or fully closed via high-pressure valve 1017, part or all of the high-pressure fluid 1025 can be sent through the recirculating system 4018 back to the inlet of pump 4015, by a pressure triggered relief valve 4016. A one-way check valve 4019 may be included to prevent the output fluid 1025 that has flowed through the recirculating system 4018 from any back flow. Current AIWJ systems that use direct drive crank pumps use a variable frequency drive mechanism to vary the motor rpm in order to vary the pump's flow rate. Variable frequency drive mechanisms are expensive, and thus eliminating them from this embodiment of the present disclosure can be advantageous.

Figure 8:
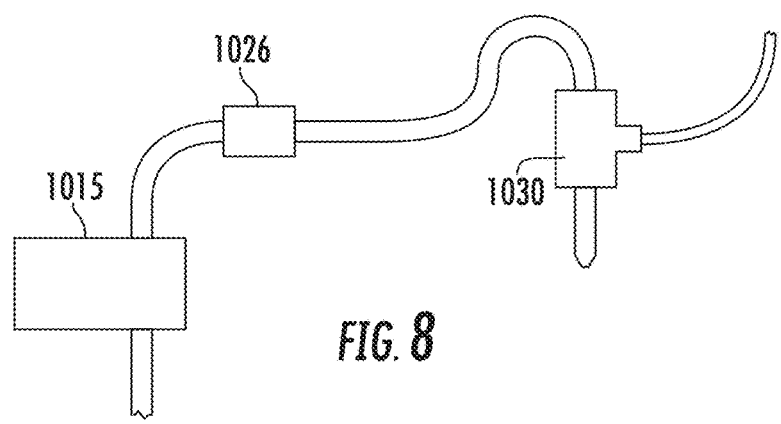
FIG. 8 is an illustration of a subsystem according to an embodiment of the present disclosure.

FIG. 8 depicts another embodiment of the present disclosure that does not include a "traditional" high-pressure valve 1017 (e.g. an on/off valve like a solenoid valve). Instead, a pressure-actuated valve 1026 can be located in the flow path between the pump 1015 and the cutting head 1030. The pressure-actuated 1026 can remain closed at or below a certain pressure, for example at or below 150 psi. As upstream fluid (e.g. water) pressure can be ambient tap pressure (e.g. 0-100 psi), the pressure-actuated 1026 will remain closed when the electric motor 1010 and pump 1015 are off. Once the electric motor 1010 and pump 1015 are turned on, the pressure of the system can rise above the threshold pressure of the pressure-actuated 1026 (e.g. a pressure at or above 150 psi) to open the pressure-actuated 1026. In this manner, the fluid output can be controlled by turning the electric motor 1010 on and off. A valve on the pump's output (either a pressure-actuated valve 1026 or a high-pressure valve 1017) can be further included as turning the electric motor 1010 off may not prevent continuous fluid flowing through the system 1000. For example, low-pressure fluid 1020 may still bleed through the pump 1015 and its output.

In current AIWJ systems, the high-pressure valve is located downstream of the high-pressure hose, and is fixedly connected to the cutting head. This is to minimize the volume of pressurized fluid downstream of the high-pressure valve, which will decompress as it depressurizes and will leak into the cutting head once the high-pressure valve is closed. Since fluid (e.g. water) is significantly compressible at normal abrasive-injection operating pressures (e.g. 60,000-90,000 psi), the amount of leakage into the cutting head can be significant. This leakage can moisten the cutting head's abrasive inlet, which can cause the abrasive to clog.

Figure 9:
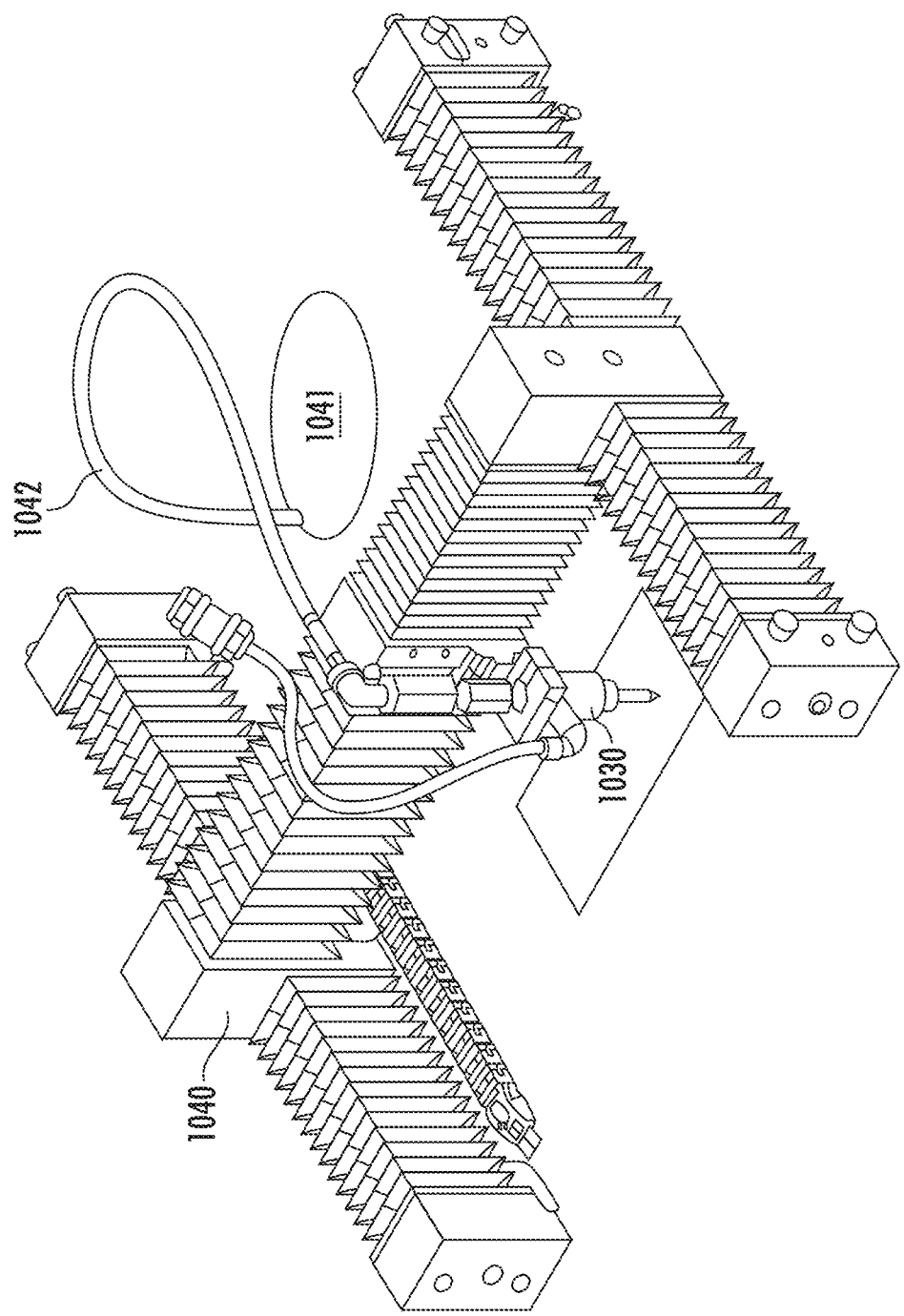
FIG. 9 is an illustration of a subsystem according to another embodiment of the present disclosure.

FIG. 9 depicts another embodiment of the present disclosure, where a high pressure valve 1041 (e.g. pressure-actuated valve, on/off, or other suitable valve) is located in the flow path of the fluid, between the pump (not shown) and the cutting head 1030, upstream of the high-pressure hose 1042. By not mounting the high-pressure valve 1041 to the motion system 1040, such that the high-pressure valve 1041 moves with the cutting head 1030, the motion system 1040 does not need to accelerate the high-pressure valve's mass (which can weigh for example, 0.5-10 lb). This arrangement may be beneficial in reducing torque requirements for the motion system 1040 and compactness of the system, for example, by reducing the machine's height. Such an arrangement can also allow for a high-pressure valve 1041 controlled by one or more controllers. The high-pressure valve 1041 may be located away from the movable cutting head 1030 and/or the mixing chamber. For example, the high-pressure valve 1041 can be mounted in a fixed location on the machine 1001. In this manner, valve wiring can be located far away from the cutting head 1030. Prior art arrangements have wires near the cutting head that are costly and prone to failure due to the exposure to abrasive and fluid. Although a high-pressure AIWJ system may require the high-pressure valve to be located on a cutting head, due to leakage issues, a low-pressure AIWJ system, for example running at pressures between 2,000 psi and 5,000 psi, or 2,000 psi and 8,000 psi, may have minimal leakage.

Figure 10:
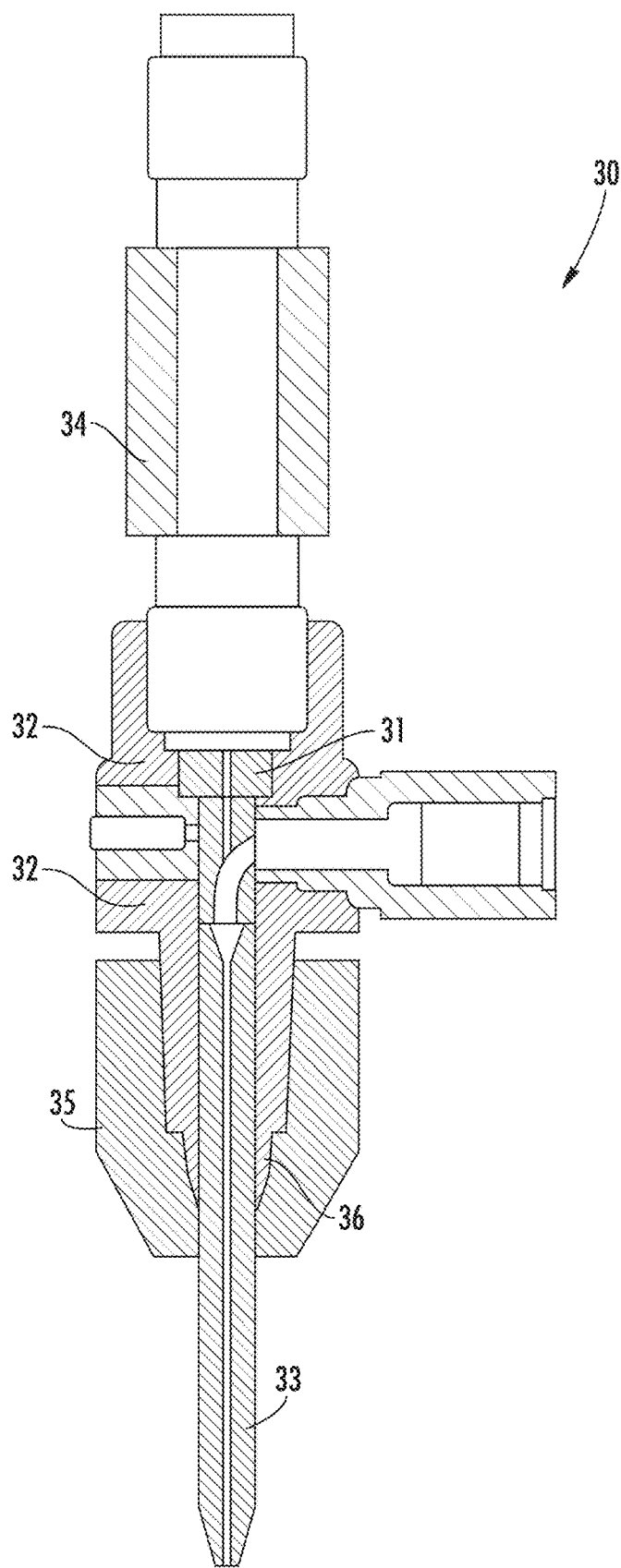
FIG. 10 is an illustration of a cutting head according to prior art.

FIG. 10 shows an AIWJ cutting head 30, which includes an orifice 31, mixing chamber 32, outlet nozzle 33, adapter 34, nut 35, and sleeve 36. The rubber sleeve 36 may be arranged around the outlet nozzle 33, and the nut 35 around the sleeve 36. The nut 35 threads into the mixing chamber 32, thereby attaching the outlet nozzle 33 to the mixing chamber 32. The adapter 34 threads into the mixing chamber 32 and holds the orifice 31 in place. The opposite end of the adapter 34 may thread into the high-pressure valve discussed above or may lead directly to the high pressure hose. This configuration allows for exchanging outlet nozzles 33 and orifices 31 due to size difference or wear and allows for different materials to be used for the outlet nozzle 33, typically carbide, orifice 31, typically ruby, sapphire, or diamond, and mixing chamber 32, typically stainless steel.

Figure 11B:
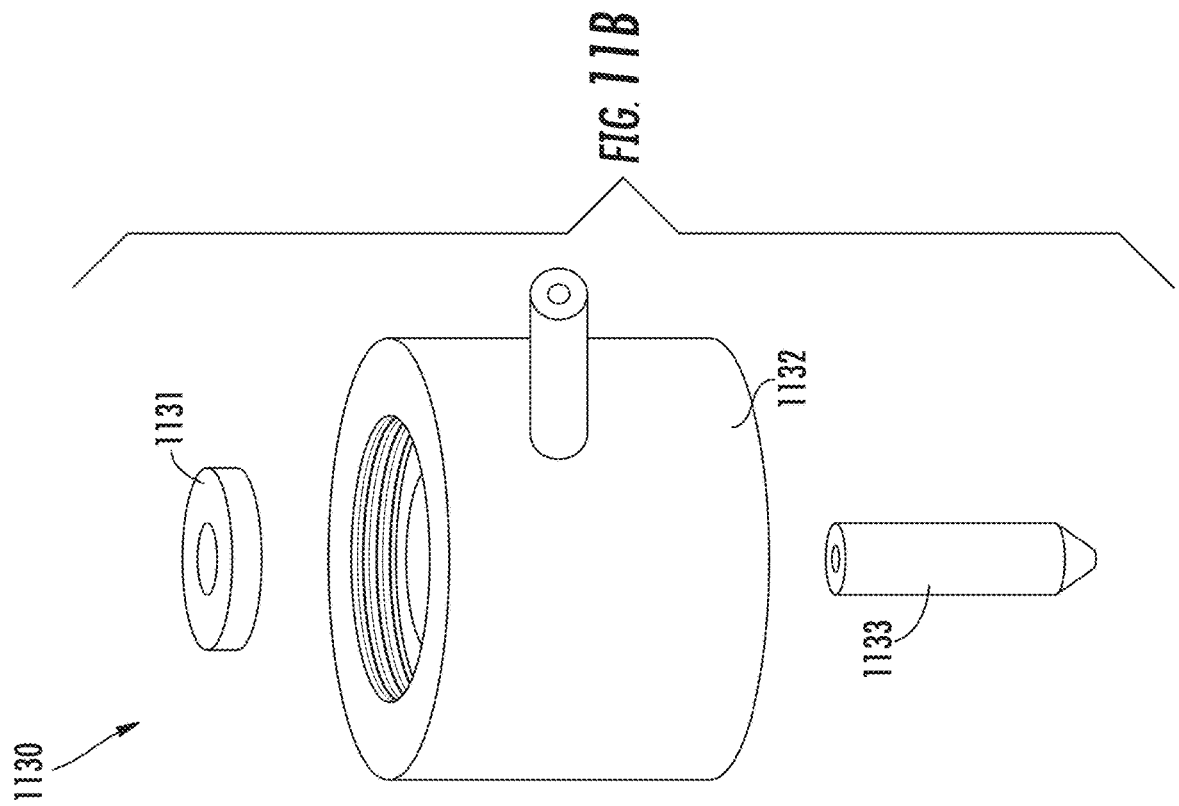
FIG. 11B is an exploded view of a cutting head according to an embodiment of the present disclosure.
Figure 11A:
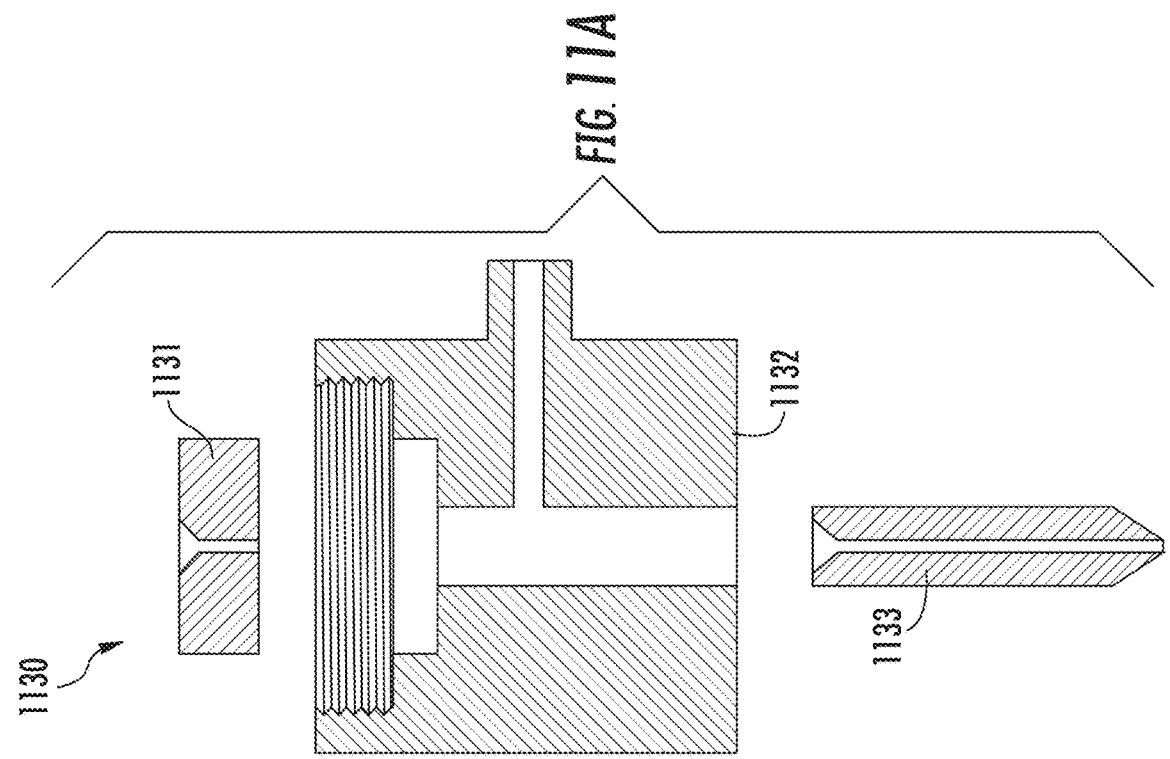
FIG. 11A is a cross-sectional view of a cutting head according to an embodiment of the present disclosure.

FIGS. 11A-B show an arrangement where the cutting head 1130 has an outlet nozzle 1133 that can be permanently press-fit into the mixing chamber 1132, thereby eliminating the need for a nut or sleeve and reduces the weight of the cutting head 1130. The orifice 1131 may also be permanently press-fit into the mixing chamber 1132. The orifice 1131 and/or outlet nozzle 1133 may further be constructed as part of the mixing chamber 1132, for example, out of a unitary piece of material.

FIG. 12A shows another embodiment where the adapter 1234 includes an unthreaded mating connector for detachably coupling with the mixing chamber 1232. For example, the adapter 1234 may be a plug for a quick connect fitting, and the mixing chamber 1232 may be a socket of a quick connect fitting. In this arrangement, the mixing chamber 1232 may be detachably connected to a fluid line connecting to the pump via a quick connect fitting. An exemplary quick connect fitting 1200 is shown in FIG. 12B. The quick connect fitting 1200 comprises a plug 1201 including external threads 1202 on one end and a plug tip 1203 on the opposite end. The plug 1201 further includes a plug boss 1204, which defines a ball groove 1205. The quick connect fitting 1200 further comprises a socket 1206 including internal threads 1207 at one end. The quick connect fitting 1200 further comprises a sleeve 1208 including a ball recess 1209. Latch balls 1210 are provided within the ball recess 1209 and mate with the ball groove 1205 when the plug 1201 is inserted into the sleeve 1208. A tubular valve 1211 is provided within the sleeve 1208 resting within a seal washer 1212. A sleeve spring 1213 is provided which engages the sleeve 1208 and the socket 1206, and a valve spring 1214 is provided which engages the tubular valve 1211 and the socket 1206.

When the adapter 1234 connects to the mixing chamber 1232 in this fashion, it rigidly holds the orifice 1231 in between. There may be a compliant seal 1238 between the adapter 1234 and the orifice 1231. The seal 1238 may be fixedly attached to the adapter 1234, fixedly attached to the orifice 1231, and/or be a distinct part. In the specific embodiment shown in FIG. 12A, the rubber seal 1238 is attached to the orifice 1231. The outlet nozzle 1233 may be fixedly attached, for example press-fit, into the mixing chamber 1232. The opposite end of the adapter (pointing away from the mixing chamber) may be threaded into to a fitting at the end of the high-pressure hose. The adapter 1234 can have inner threads on one side that receives the outer threads of a hose. In another embodiment, one end of the hose serves as an adapter 1234, for example, the hose can be an unthreaded mating connector.

Figure 12C:
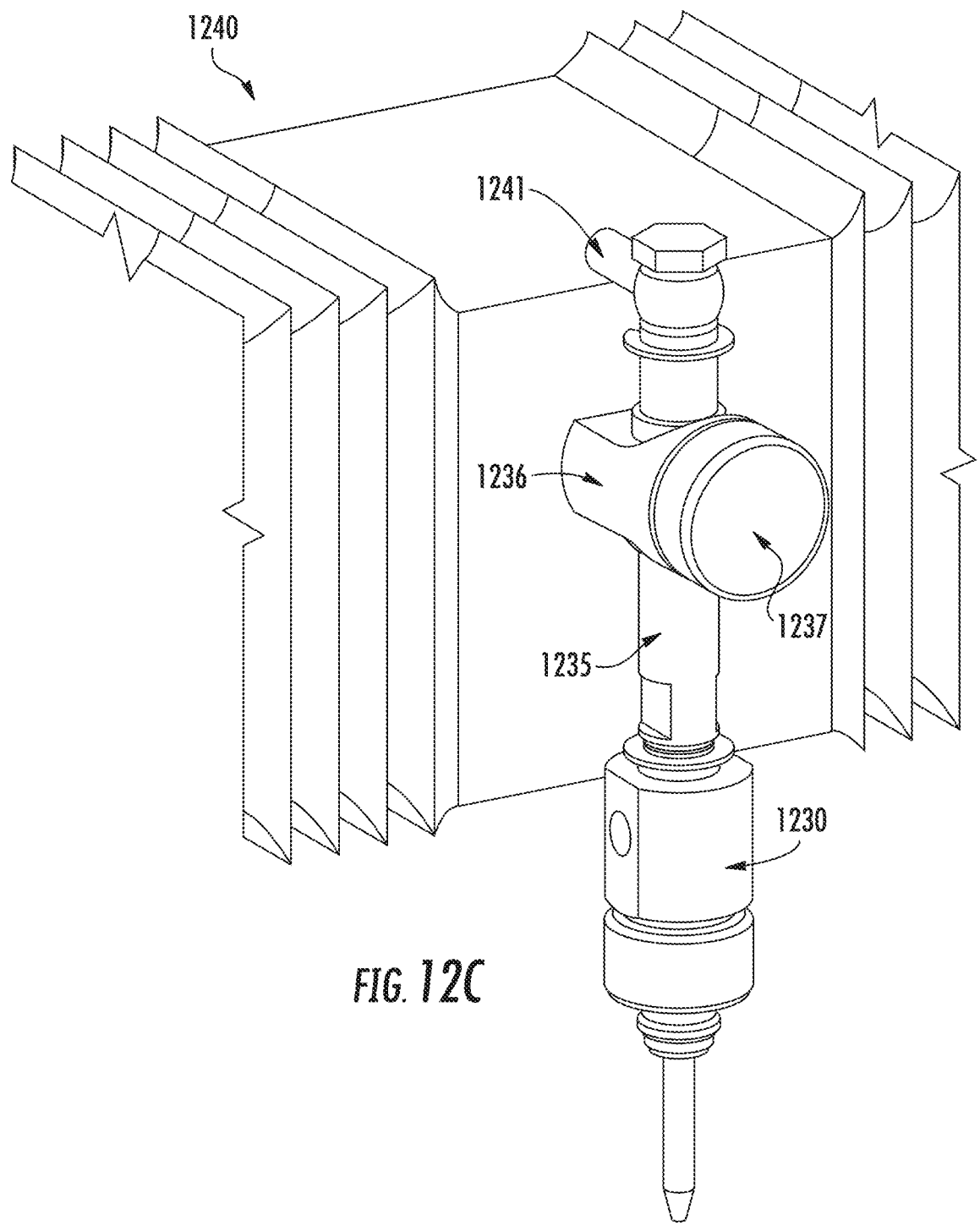
FIG. 12C is an illustration of a cutting head adjustment system according to an embodiment of the present disclosure.

In prior art systems, the adapter of the cutting head and/or the cutting head itself can be rigidly mounted to a block, where the block translates (e.g. an up and down sliding motion) via motor or manual actuation. The adapter and/or cutting head can couple to the block of the motion system to adjust the height of the cutting head. The block's motion may be constrained via one or more guide rods that it slides along, thus having only a single degree of freedom of motion. According to an embodiment of the present disclosure, as shown in FIG. 12C, the adapter 1235 may be connected to the high pressure inlet 1241. The adapter 1235 may allow high pressure fluid to flow from the high pressure inlet 1241 to the cutting head 1230. A block 1236 may be fixedly mounted to the motion system 1240, and the adapter 1235 may be arranged to pass through the block 1236, thus serving as a guiderod simultaneously. In this arrangement, the adapter 1235 may move relative to the block 1236 to adjust the height of the cutting head 1230. A lock nut 1237 may be adjustably connected to the block 1236. The lock nut 1237 may have an unlocked position which may allow movement of the guiderod 1235 relative to the block 1236, and a locked position which may restriction movement of the guiderod 1235 relative to the block 1236. In operation, a user may move the lock nut 1237 to the unlocked position and manually move the guiderod 1235 relative to the block 1236 to achieve a desired height of the cutting head 1230. The user can further move the lock nut 1237 to the locked position to fix the cutting head 1230 at the desired height.

Figure 13A:
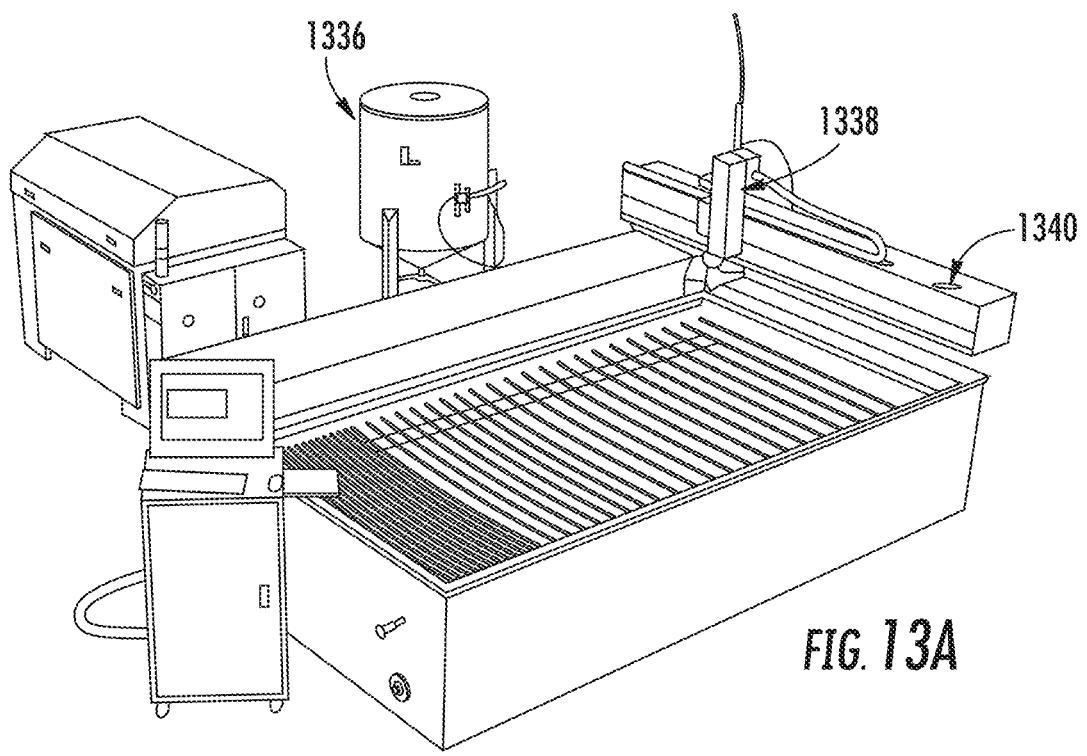
FIG. 13A depicts an exemplary abrasive holding system.
Figure 13B:
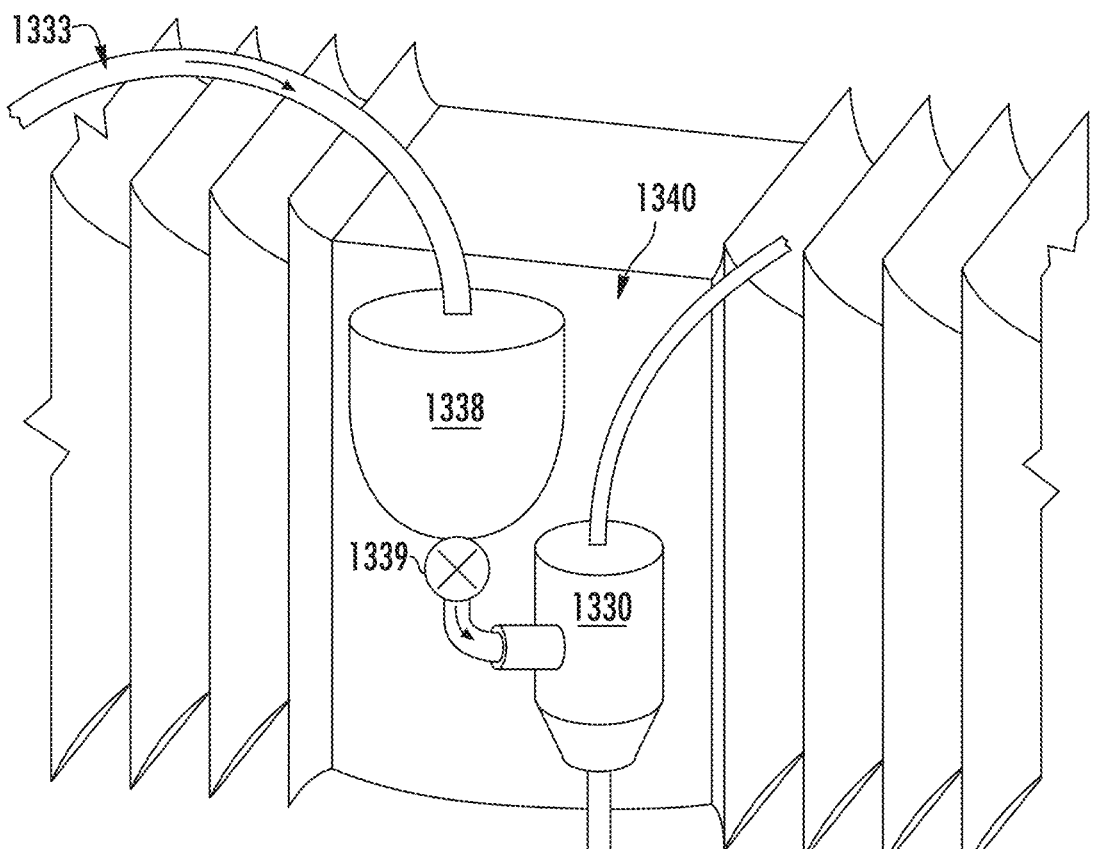
FIG. 13B is an illustration of an exemplary abrasive holding subsystem.

FIG. 13A depicts an AIWJ system from the prior art where a large holding tank 1336 stores abrasive, for instance between 100-10,000 lbs of abrasive. The abrasive can be pumped using compressed air through a hose 1333 to a small hopper 1338 that is mounted to the motion system 1340 and moves with the cutting head 1330, as illustrated in FIG. 13B. The abrasive flows from the hopper 1338 through a valve 1339, which can also be mounted to the motion system 1340. In this manner, the hopper 1338 moves with motion of the cutting head 1330.

AIWJ systems generally have one of two arrangements for abrasive holding systems.

Figure 13D:
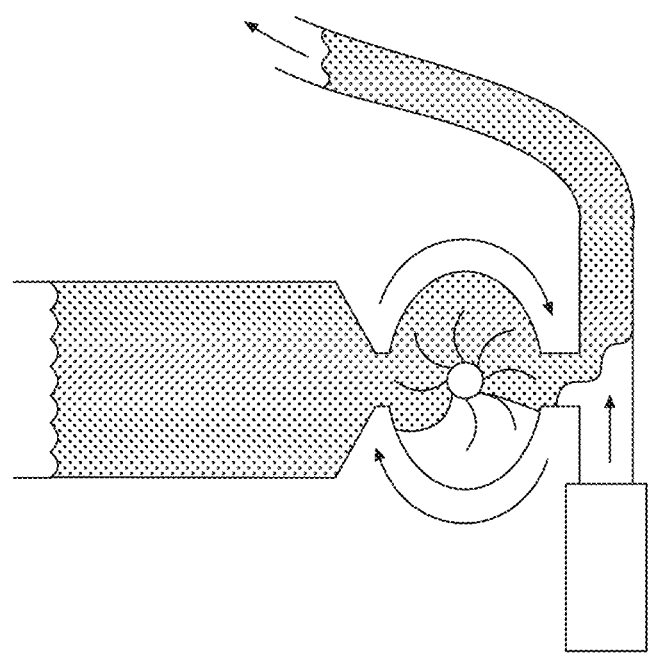
FIG. 13C-13D depict exemplary abrasive holding and feeding systems.
Figure 13C:
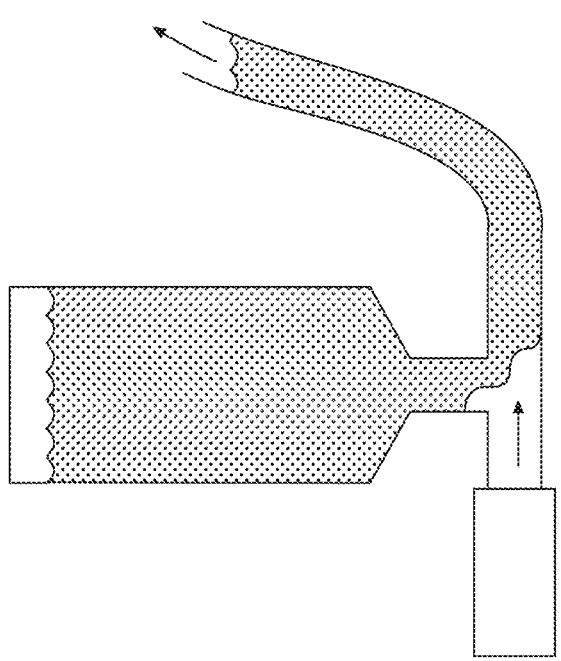

FIG. 13C shows a first arrangement where the abrasive holding system includes a sealed pressure vessel that serves as a holding tank. The pressure sealed vessel forces compressed air through the abrasive tube and into the cutting head. The disadvantage of this architecture is that a user cannot refill the holding tank while the compressor is on (and the device is operating) for risk of a blowout. In a second arrangement, shown in FIG. 13D, a holding tank is open to ambient pressure, and there is a valve that partially seals the compressed air from escaping through the holding tank. In this example, a rotating part forces abrasive from the holding tank into a tube. This process creates enough resistance to maintain pressure in the tube, thereby minimizing air that can escape through the holding thank. The disadvantage of this architecture is that valve(s) wear due to the flowing abrasive. Replacement of these valves can be costly and time consuming.

Under either arrangement, abrasive can be pumped using compressed air through a hose to a "small hopper" that is mounted to the motion system and moves with the cutting head. The small hopper can have an abrasive valve that opens and closes. The cross-sectional area of the valve's opening can dictate the mass flow-rate of the abrasive, which thereby determines cutting speed and performance. Some abrasive valves can vary the cross-sectional area of their openings-allowing for variable abrasive mass flow-rates. However, these types of valves are expensive and prone to wear. The abrasive flows from the hopper into the cutting head due to gravity and the suction created in the mixing chamber.

Figure 14A:
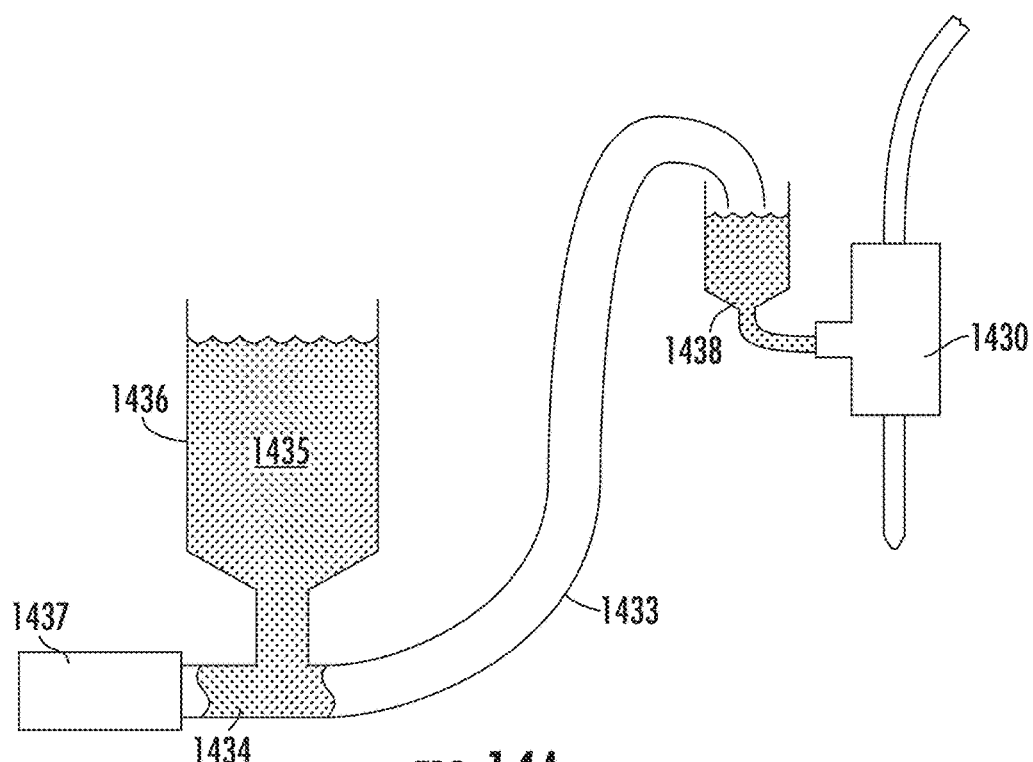
FIGS. 14A-14D illustrate of an exemplary abrasive holding subsystem undergoing an abrasive feeding process according to an embodiment of the present disclosure.
Figures 14B, 14C, 14D:
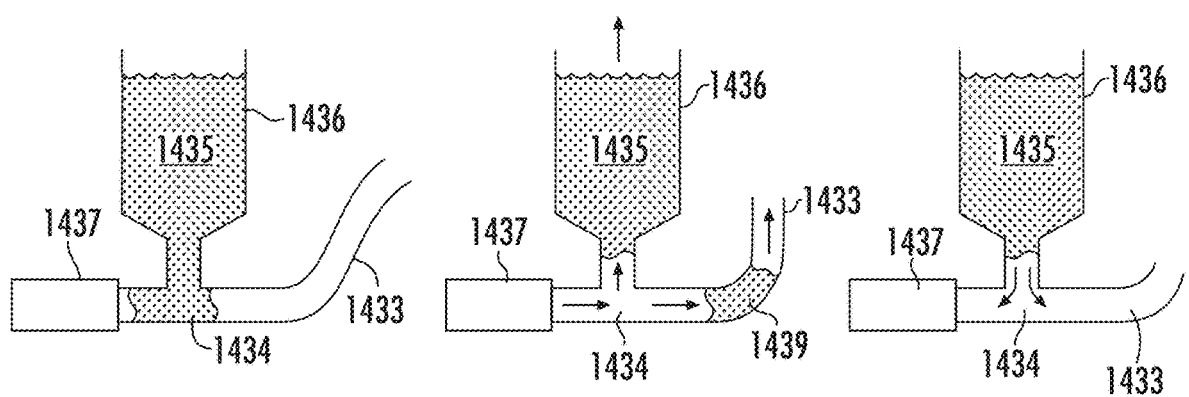

FIG. 14A shows an embodiment of an abrasive holding system where the holding tank 1436 does not include a valve to restrict pressure from escaping the holding tank 1436, and the holding tank is open to ambient pressure. In order to maintain pressure, a blower 1437 forces abrasive 1435 into the small hopper 1438, and toward the cutting head 1430. In one specific example, the blower 1437 may cycle in order urge discrete abrasive packets 1439 into the small hopper 1438. A process of feeding the hopper 1438 with abrasive 1435 according to an embodiment of the present disclosure is illustrated in FIGS. 14B-D. First, FIG. 14B shows that abrasive 1435 can fall under gravity and collect in a T-junction 1434. Second, FIG. 14C shows that the blower 1437 can turn on to force an abrasive packet 1439 through the tube 1433 and into the small hopper 1438 near the cutting head 1430. In addition to forcing the abrasive packet 1439 pressure from the blower 1437 may also serve to prevent any significant amount of abrasive 1435 from falling down into the T-junction 1434. Third, FIG. 14D shows the blower 1437 being turned off, which can allow additional abrasive 1435 to fall and refill into the T-junction 1434. The process can repeat generally in the manner during an abrasive cutting procedure.

Figure 15A:
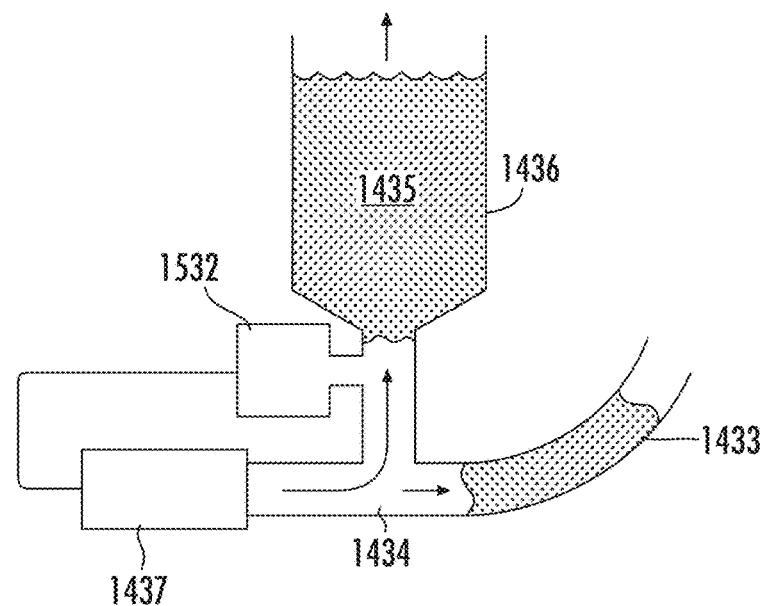
FIGS. 15A-15D illustrate embodiments of an abrasive holding and feeding subsystem according to an embodiment of the present disclosure.

In some embodiments, the blower 1437 may be set to turn on/off with a predefined duty cycle. FIG. 15A shows another embodiment where a sensor 1532 is included to determine whether a "packet" has been forced from the T-junction 1434. The sensor 1532 may be any suitable sensor, including a pressure or light sensor. The sensor 1532 can send a signal to the blower 1437 to turn on/off, thereby creating a closed-loop feedback system that controls the duty cycle of the blower 1437. This embodiment may be more robust and maximize the duty cycle of a blower than a blower 1437 having a predefined duty cycle. For example, the sensor 1532 could control the blower 1437 according to the type of abrasive used (as the flow-rate of the abrasive would vary depending upon the type of abrasive used). Thus, the net flow-rate of the abrasive 1435 in the system could be increased by reducing any "off-time" of the blower 1437 using feedback from the sensor 1532.

Figure 15B:
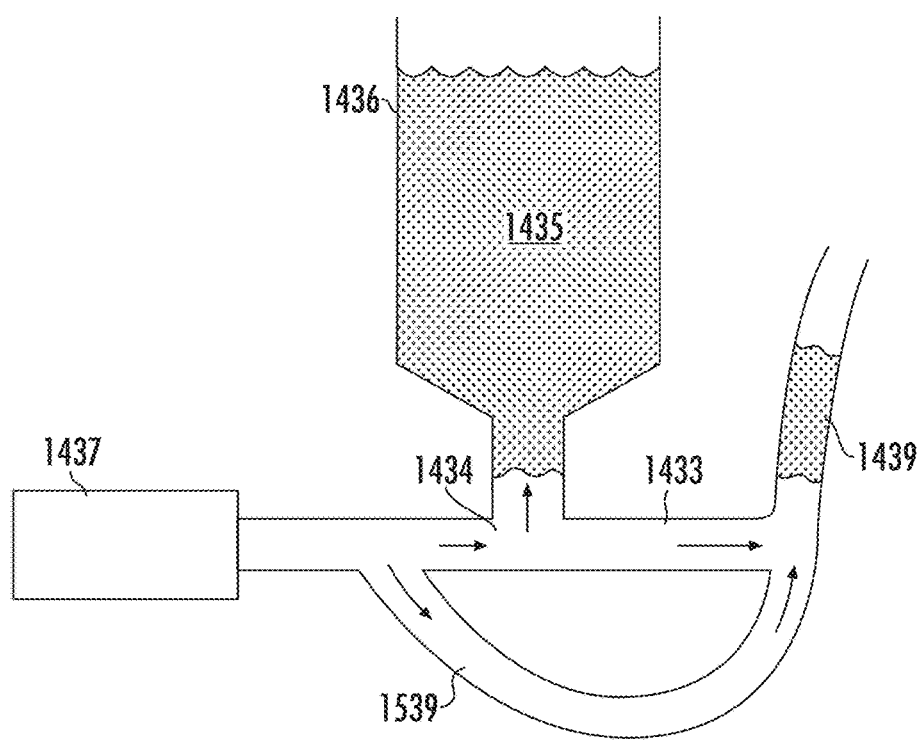
Figure 15C:
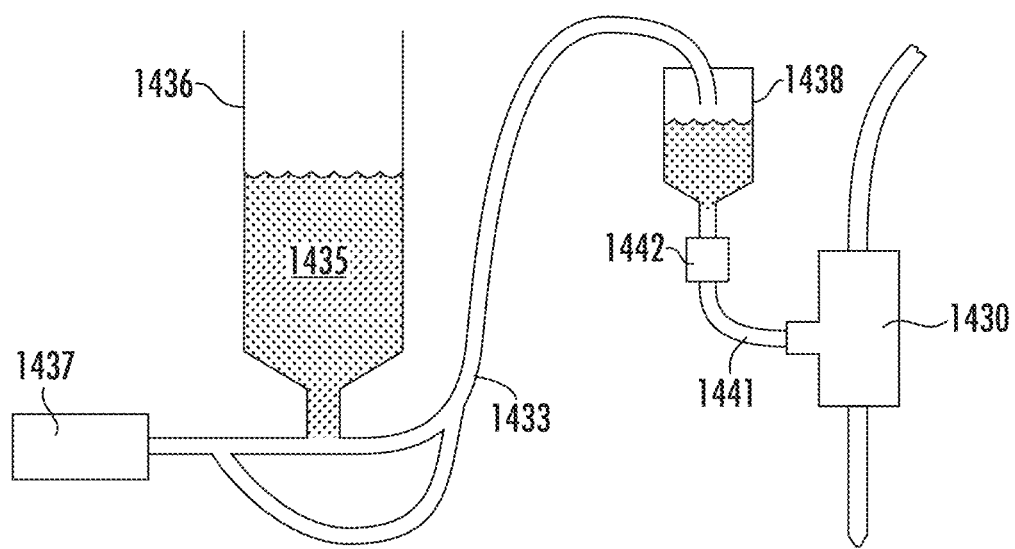

FIG. 15B also depicts an arrangement where a first tube 1433 is split into a second tube 1539 such that only a portion of air from the blower 1437 escapes through the holding tank 1436. This arrangement can reduce back-pressure that prevents additional abrasive 1435 from falling. The first tube 1433 and second tube 1539 reconnect beyond the T-junction 1434 to allow for the combined airflow to push the abrasive packet 1439.

In the embodiments shown in FIGS. 15A-B, the holding tank 1436 is open to ambient pressure and thus can be refilled during system use. Additionally, these embodiments do not include a valve that will wear and require replacement. These embodiments may also have a more compact arrangement. For example, the use of compressed air to urge the abrasive 1435 into a small hopper 1438 can eliminate the need for the primary hopper 1436, which contains a large amount of abrasive, to be stored at a particular height (e.g. at a height above the cutting head 1430).

In the embodiments described above, FIGS. 14A-D and FIGS. 15A-C, compressed air from the blower 1437 forces abrasive 1435 from a large holding tank 1436 through a tube 1433 into a small hopper 1438 that feeds into the cutting head 1430. The abrasive 1435 exits the small hopper 1438 through a tube 1441 at the bottom, and enters the cutting head 1430 after passing through a metering valve 1442 that controls the amount of abrasive 1435 flowing into the cutting head 1430. The metering valve may be an on/off valve or a flow-rate control valve that can control an amount of abrasive flowing therethrough (e.g. not a binary valve). The metering valve 1442 may be any suitable valve, including a pinch valve. In the case of a pinch valve, a rod pinches the tube 1441 to block flow of abrasive, such that the actuating mechanism does not need to touch the abrasive 1435. This can reduce wear on the system.

Figure 15D:
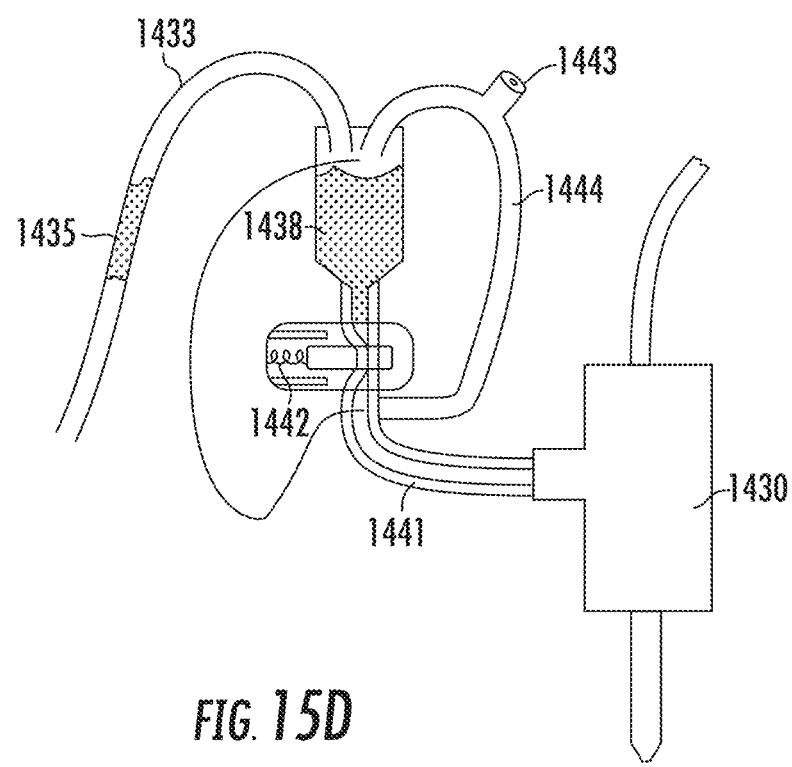

FIG. 15D depicts another embodiment, where the small hopper 1438 includes a pressure relief valve 1443 to maintain pressure in the small hopper 1438 at, or about, ambient-even during use of pressure to feed abrasive 1435 to the cutting head 1430, for example, via compressed air. The pressure relief valve 1443 may be located in a second tube 1444 that connects the ambient air in the small hopper 1438 to the tube 1441 downstream of the metering valve 1442 but upstream of the cutting head 1430. This arrangement may be used to maintain the air immediately below the metering valve 1442 at ambient pressure, even if the cutting head 1430 creates vacuum pressure at its inlet. The pressure relief valve 1443 can allow air in/out, and may be resistant to fluid (e.g. water) entering.

Figure 16:
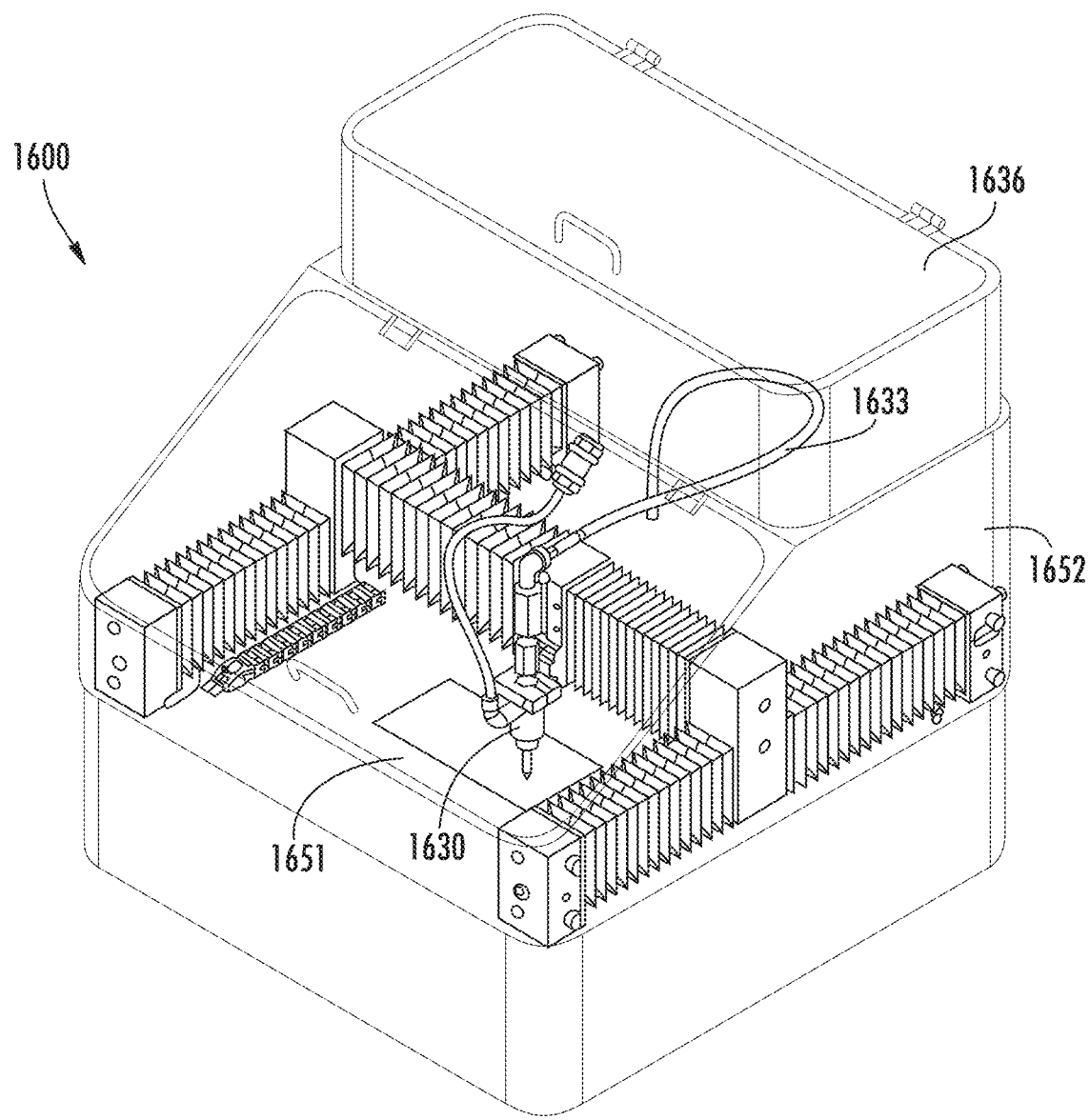
FIG. 16 depicts an abrasive holding subsystem according to yet another embodiment of the present disclosure.

FIG. 16 shows an embodiment where the hopper 1636 is fixed to the frame 1652, above the cutting bed 1651. The hose 1633 connects the hopper 1636 to the cutting head 1630. The abrasive 1635 flows from the hopper 1636 into the cutting head 1630 due to gravity and suction created in the mixing chamber 1632. According to this arrangement, compressed air may not be needed to pump abrasive 1635 and the motion system 1640 does not need to accelerate the mass of a hopper 1636 filled with abrasive 1635.

Figure 17:
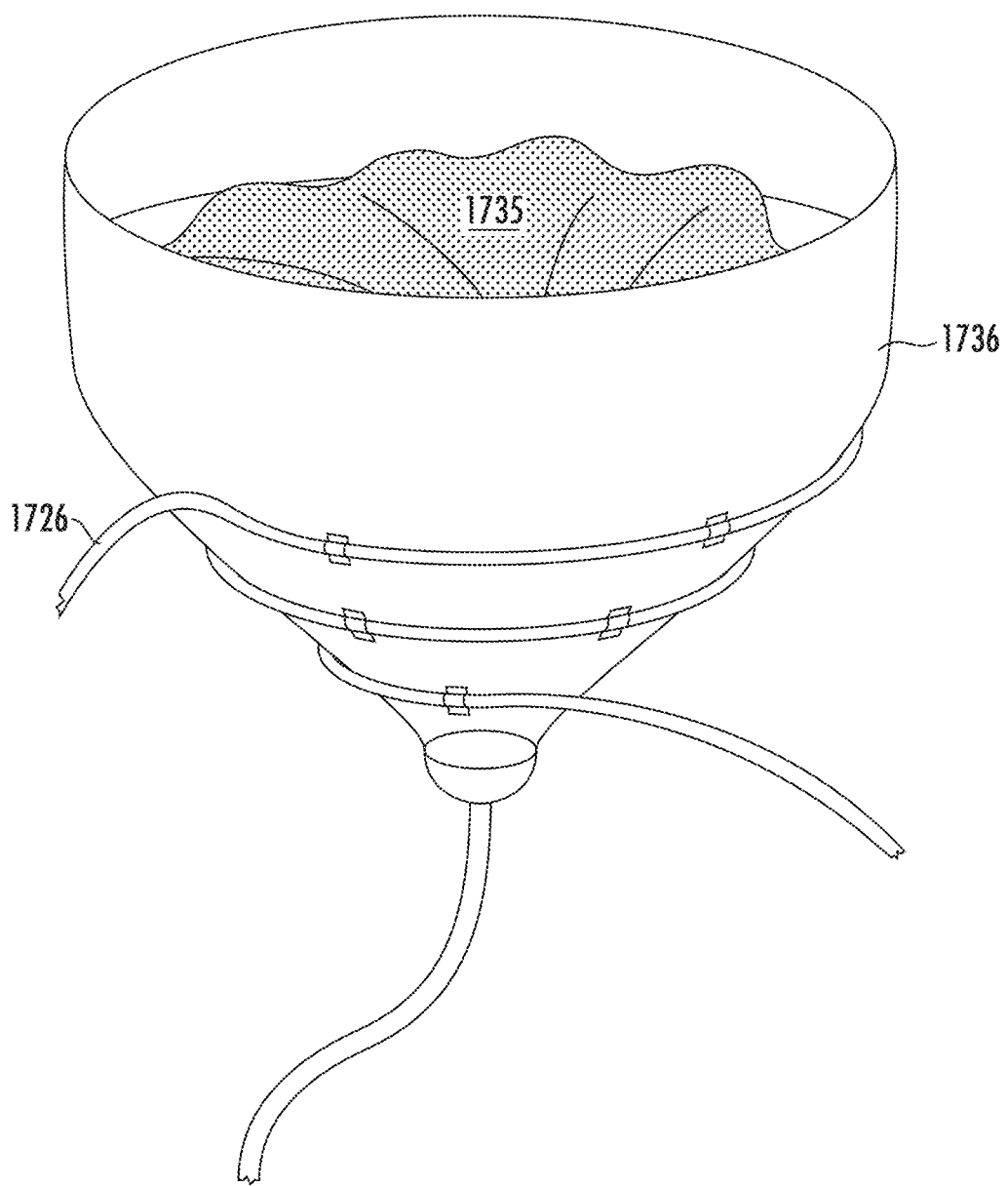
FIG. 17 is a detail view of an abrasive holding subsystem according to an embodiment of the present disclosure.

FIG. 17 shows another embodiment where the high-pressure fluid hose 1726 is mounted to the hopper 1736. Vibrations from the hose 1726 can vibrate the hopper 1736, thereby preventing abrasive 1735 from sticking to the inside walls of the hopper 1736 during use of the system.

Figure 18A:
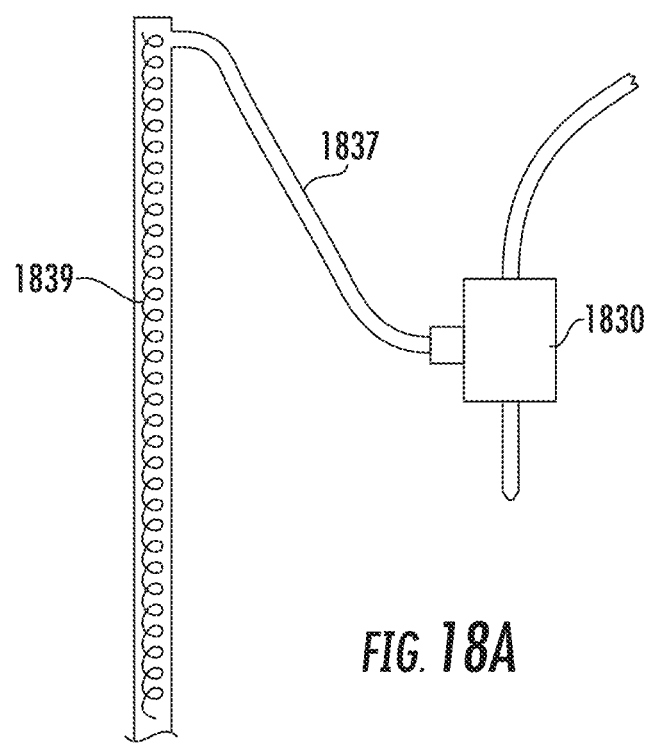
Figure 18B:
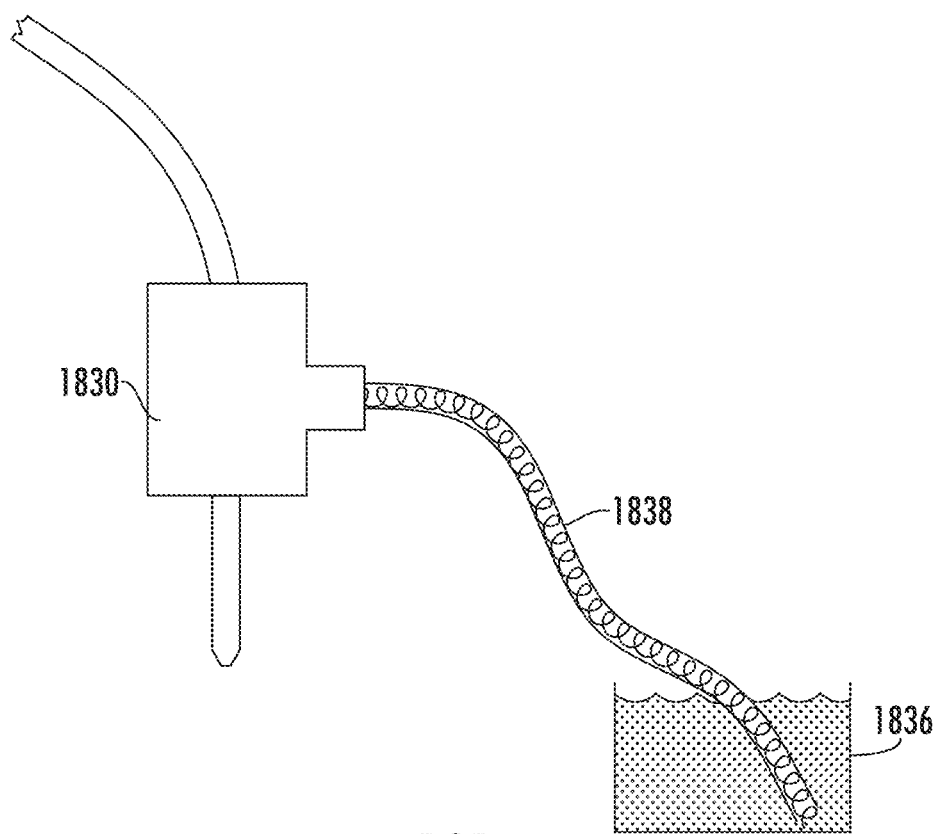

FIG. 18A depicts another embodiment where the hopper is fixedly mounted to the frame. For example, the hopper can be mounted at the same height or below the cutting head. Abrasive can be continuously fed upwards by a feeding device 1839, such as a rigid auger. The abrasive may exit at the top of the feeding device 1839 through an abrasive line 1837, and into the cutting head 1830 due to gravity and/or suction produced at the cutting head 1830. The feeding device 1839 may be rotated using a motor, for example, that is controlled by the machine's controller. The frequency of rotation of the motor may dictate the mass flow-rate of the abrasive. Simply changing the frequency of rotation of the motor allows for variable abrasive mass flow-rate control. Stopping the motor can stop the flow of abrasive, thereby eliminating the need for an expensive abrasive valve. In another exemplary embodiment shown in FIG. 18B, abrasive can be continuously fed upwards from hopper 1836 by means of a feeding device 1838, such as a flexible auger. The feeding device 1836 can feed abrasive directly into the cutting 1830 head.

FIG. 18C depicts another embodiment where the hopper 1836 is fixedly or non-fixedly mounted to the frame or separate from the waterjet system entirely. For example, the hopper 1836 can be mounted such that the bottom of the hopper is at the same height or below the cutting head 1830 and/or the mixing chamber. Abrasive 1835 can be fed from the hopper 1836 through an abrasive line 1837, and into the mixing chamber of the cutting head 1830 due to vacuum pressure created by the cutting head 1830. The abrasive line 1837 may be short, for example 1 meter or less, in order for the suction to be strong enough to overcome the line resistance and to pull the abrasive 1835 through the abrasive line 1837 into the cutting head 1830. The hopper 1836 may not have to be a sealed pressure vessel in order to operate, and thus may allow the hopper 1836 to be reloaded with additional abrasive 1835 while in use. The abrasive 1835 may flow into the feed abrasive line 1837 at the bottom of the hopper 1836 due to gravity. A metering valve 1831, such as a pinch valve, may be located downstream of the hopper in order to control the flow of abrasive 1835. A tee junction 1832 may be located downstream of the metering valve 1831 such that the abrasive line 1837 can be open to ambient air. The flow of abrasive 1835 may be purely gravity driven due to ambient pressure 1808 at the top of the abrasive pile and downstream of the metering valve 1831. The flow will be purely gravity driven because there may be no meaningful pressure differential between the top and bottom of the hopper 1836. This lack of pressure differential makes it much easier to control the flow rate of the abrasive accurately via a metering valve because the flow rate of the abrasive can be proportional to the size of the opening in the metering valve. In contrast, if there is a pressure differential, then the flow rate can depend on the level of pressure differential, which can be difficult to control. In order to reduce the risk of pressure differential, one or more openings 1808 can be provided.

The system may function similarly without the tee junction 1832, such that there may be ambient pressure 1808 upstream and negative pressure downstream of the metering valve 1831. The rate of flow of abrasive 1835 can be adjusted by the size of the opening through the metering valve 1831 between the hopper 1836 and abrasive line 1837. In this embodiment, a hopper 1338 (from FIG. 13B) and/or a metering valve 1339 (from FIG. 13B) may be located away from the movable cutting head 1330. By locating the hopper and/or metering valve away from the cutting head, the mass of the motion system is reduced. Advantageously, the overall height of the system may also be reduced. The hopper 1836 may also be positioned in a location such that the output from the metering valve 1831 is at the same height as, or below, the cutting head 1830. Rather than being gravity-fed, the abrasive flow from the output of the metering valve 1831 and into the cutting head 1830 may be caused by a suction force. Again, this may further reduce the overall height of the system.

Figure 18H:
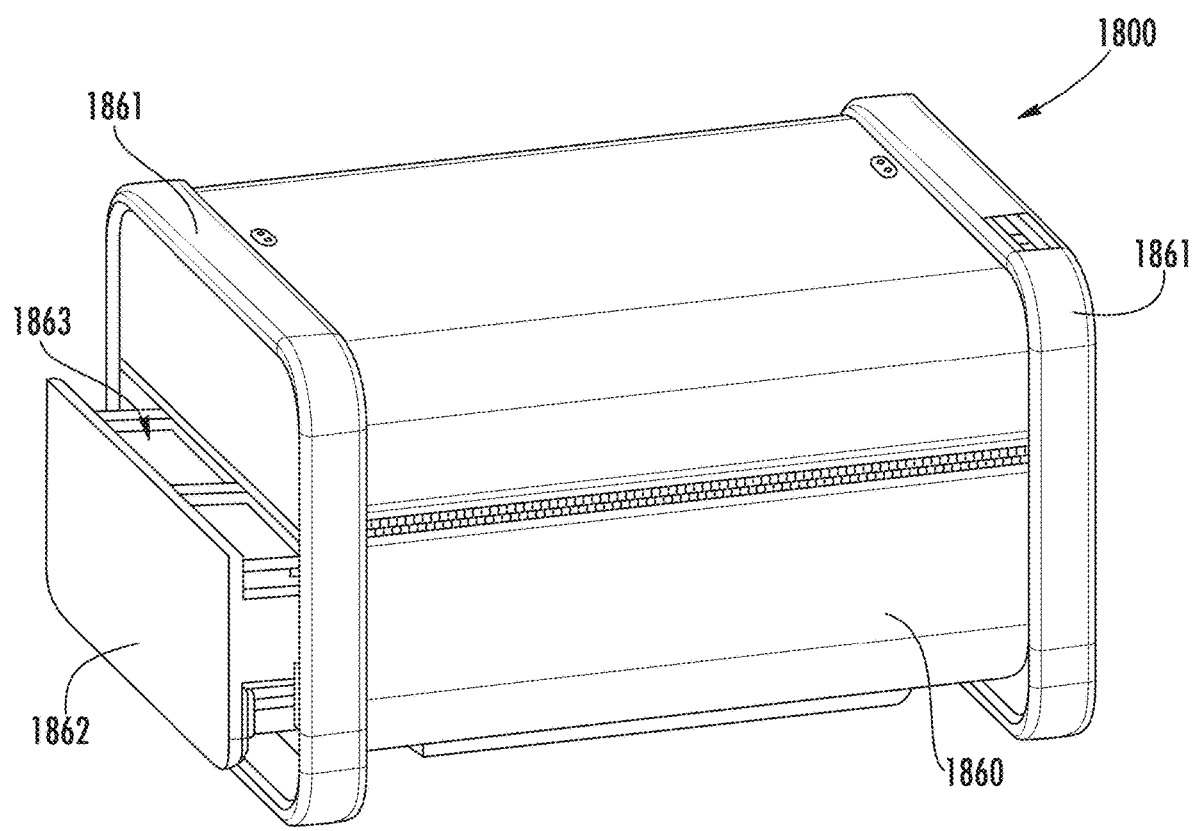
FIG. 18H depicts another embodiment of a hopper design according to an embodiment of the present disclosure.

In another embodiment, shown in FIG. 18H, the machine 1800 includes a tank 1860 supported on either side by a frame 1861. The hopper 1838 is not fixedly mounted to the frame 1861, but rather can move relative to the frame 1861 such that it can be pulled outward for pouring in more abrasive and then retract back within the extents of the machine 1800. For example, the hopper 1862 may be translatable relative to the frame 1861, for example via sliding, rotation in/out, or any other applicable motion. There may be an opening 1862 in the top of the hopper 1862 into which abrasive may be poured.

A common issue in abrasive flow through a hole in the bottom of a hopper is the emergence of a "rat-hole," where the particles build up around the hole at the bottom but do not flow through it, as shown in FIG. 18D. A common solution is for a tall and narrow hopper that increases the useful volume before "rat-holing" occurs, as shown in FIG. 18E. However, a tall and narrow hopper may increase the size and weight of the machine.

FIG. 18F depicts another embodiment where the hopper 1836 may be shorter than it is wide. The height may be less than the distance from the bottom of the tank to the top of the cutting bed, for example 6-24 in. The bottom sections 1840 of the hopper 1836 may also be angled. The angle of the bottom sections 1840 may be 1-30 degrees from horizontal. In one example, the angle of the bottom sections 1840 can be 10 degrees from horizontal. One or more vibration motors 1841 may be mounted to the hopper 1836, for example, at a bottom section 1840, in order to maintain abrasive flow and to prevent a "rat-hole." As illustrated in FIG. 18G, the bottom section 1840 may be coupled to a warning device 1842 that can alert a user of a low amount of abrasive in the hopper. For example, the warning device 1842 can be an audible device that is configured to make an audible noise under a vibration range or vibration. The bottom section 1840 of the hopper may also be designed to act as a warning device 1842 by producing an audible alert when subjected to a specific vibration range or vibration. For example, when the hopper 1836 is filled with abrasive, the system can produce a different or little sound because the vibration may be dampened by the presence of the abrasive (e.g. thereby dampening a desired audible warning sound). However, when the hopper 1836 reaches a desired threshold, such as a low level, the sound produced may not be dampened. This arrangement may provide a user a warning indicator that more abrasive needs to be added to the hopper 1836.

Figure 19A:
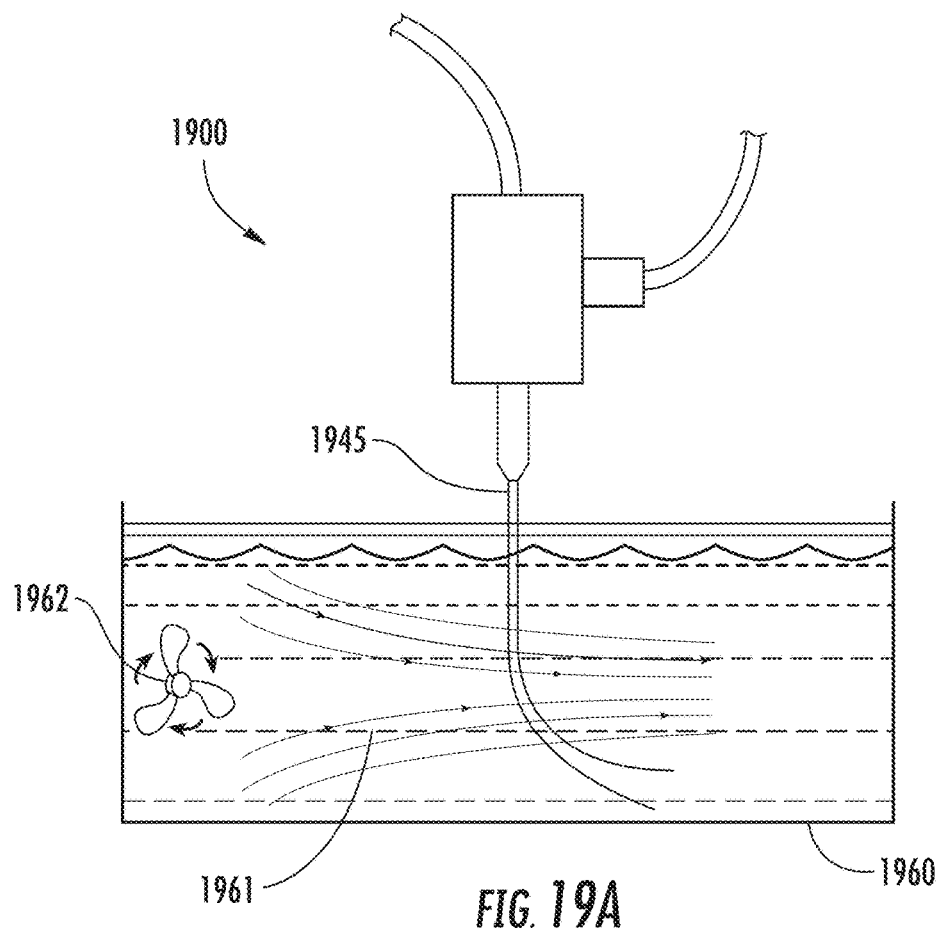
FIG. 19A-19C illustrate jet dissipation systems according to embodiments of the present disclosure.

FIG. 19A depicts an embodiment of the system 1900, wherein a current 1961 can be generated within the tank 1960, for example with a propeller 1962. The current 196 may disrupt the jet 1945 such that the travel distance of the jet 1945 is increased before striking the bottom of the tank 1960. In a second embodiment, one or more high velocity jets of fluid, such as water, can be injected from one or more sides of the tank. This turbulence may also disrupt the abrasive jet and scatter the abrasive particles to reduce the force of the jet on the bottom of the tank. In a third embodiment, a jet may be mounted to an axis of the motion system such that the jet can intersect the abrasive jet to facilitate scattering of the abrasive particles. In these examples, the jet can comprise any suitable fluid, including water or the like.

Figure 19B:
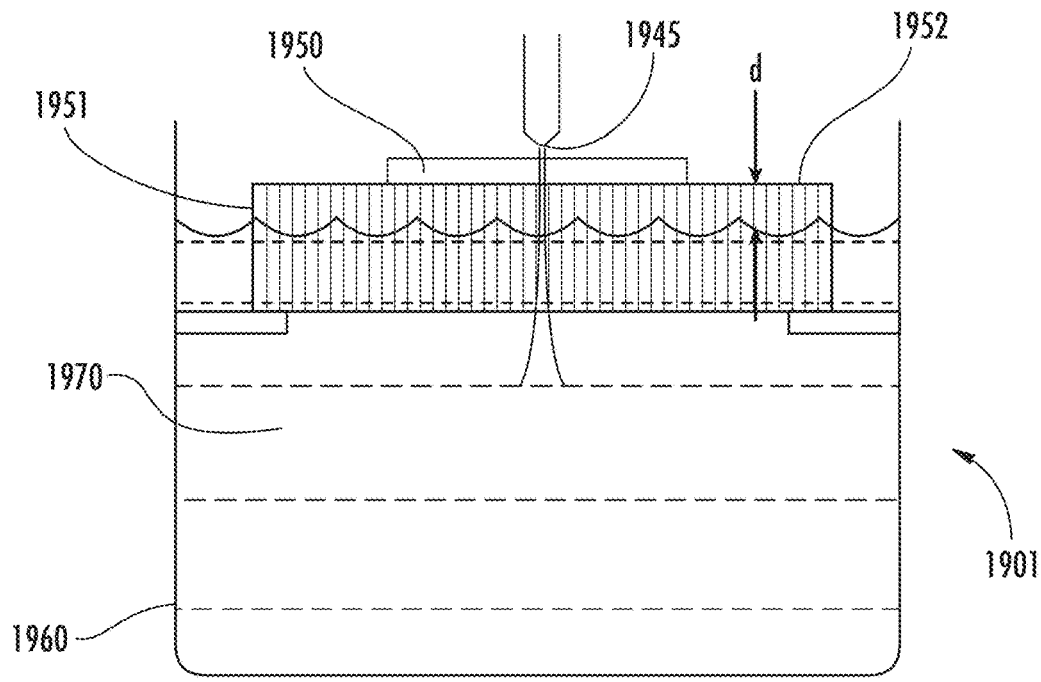

FIG. 19B depicts another embodiment of the system 1901, wherein the cutting bed 1951 includes a plurality of apertures 1952 arranged in a grid. The cutting bed 1951 can be made of any suitable material, including metal or plastic. For example, the cutting bed 1951 can be made of a honeycomb metal, extruded plastic, or corrugated plastic. Each aperture 1952 in the cutting bed 1951 can have a size between 4 mm$^2$ and 100 mm$^2$. In one particular example, the cutting bed 1951 can be made of a corrugated plastic with each aperture 1952 sized to be approximately 25 mm$^2$ in area. The level of fluid 1970 in the tank 1960 can be maintained at a particular distance d from the top of the cutting bed 1951, for example, between 0 mm and 50 mm. In one particular example, the distance d may be maintained at approximately 30 mm between the level of the fluid 1970 and the top of the cutting bed 1951. As a result, when the jet 1945 cuts through the workpiece 1950 and enters the tank 1960, the jet fluid 1945 (e.g. water and abrasive) can be exposed to very little air. For example, the jet fluid 1945 may enter an aperture 1952 after cutting through the workpiece 1950. This arrangement can prevent air from entering into the jet and therefore into the tank 1960, and therefore cause the jet to dissipate and lose kinetic energy faster as it travels through the fluid in the tank. This can result in dissipating the same amount of a jet's energy with a smaller tank as compared to prior art designs.

Figure 19C:
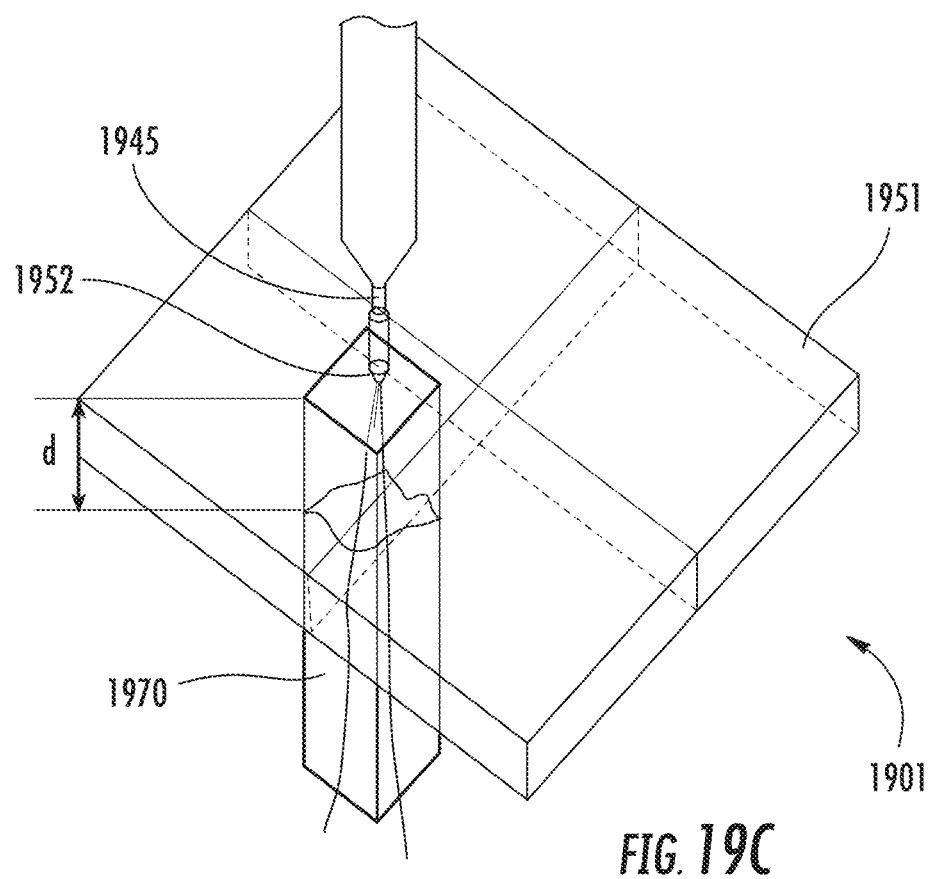

The size of the aperture 1952 and level of the fluid 1970 can influence jet dissipation. Although it may be advantageous to have fluid level 1970 in the tank 1960 close to the top of the cutting bed 1951, a fluid level 1970 that is too close to the cutting bed 1951 can cause turbulence that dislodges the working material 1950 or otherwise interferes with a cutting operation. FIG. 19C depicts a perspective of the embodiment of the system 1901. A portion of the tank 1960 is visible to show the level of the fluid 1970 and the distance d between the level of the fluid 1970 and the top of the cutting bed 1951.

The embodiments of FIGS. 19A-C can reduce the height requirement for the tank 1960, and therefore the height of the top of the cutting bed 1951 relative to the bottom of the tank 1960. In particular, it may be possible to reduce the height of the top of the cutting bed 1951 to, 12 in or less, such that it is an ergonomically comfortable height even under benchtop conditions.

Figure 20:
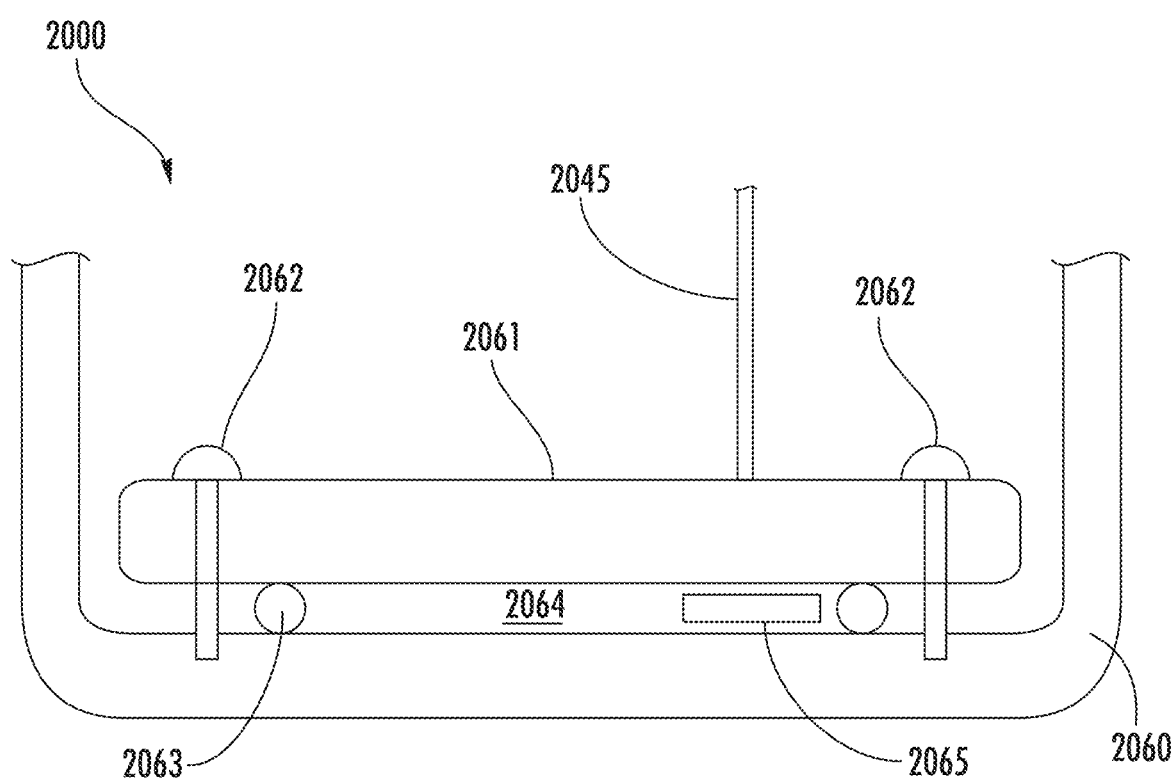
FIGS. 20-22 are illustrations of jet sensing systems according to further embodiments of the present disclosure.

FIG. 20 depicts an embodiment of the present disclosure, where a machine 2000 is configured to detect if the abrasive jet 2045 has caused damage to the bottom of the tank 2060. For example, the machine 2000 can be configured to detect if the tank 2060 is punctured. In one example, a replaceable bottom plate 2061 can be positioned to the bottom of the tank 2060. The plate 2061 can be attached to the tank 2060, for example by fasteners 2062. An interior space 2064 can be sealed between the plate 2061 and the tank 2060, for example with a gasket 2063. The interior space 2064 may contain a sensor 2065, such as a moisture sensor. The sensor 2065 can be configured to detect if liquid is in the interior space 2064. If liquid is detected, for example, due to piercing of the plate 2061, the machine 2000 can be configured to take an appropriate action, such as alerting the machine operator and/or turning off the machine. In another example, the replaceable plate could be made of an electrically insulative material, and the interior space could be electrically conductive. Thus, when the abrasive jet pierces through the replaceable plate, liquid contacts the conductive material and completes an electrical circuit. Yet other sensors may be used in a similar manner, including pressure sensors, force sensors, strain gauges, and others.

In an alternative embodiment, multiple layers of replaceable plates could be used, to allow for multiple warning levels and a higher fidelity of wear measurement. For example, the replaceable plate may include alternating layers of electrically insulating and conductive materials, such as laminate material. In a further alternative embodiment, replaceable plate can be checkered, whereby the plate is made up of an array of squares. Each square may have multiple alternating layers of electrically insulating and conductive materials, and each square may be electrically insulated from each other square. Each conductive layer of each square can be wired in such a way such that a liquid could complete a circuit between conductive portions. This could indicate a location and depth of the abrasive jet's penetration into the replaceable plate, for example, by relying on which circuit is located. Although the example of a squared array is given, other sensor array arrangements can be used.

Figure 21:
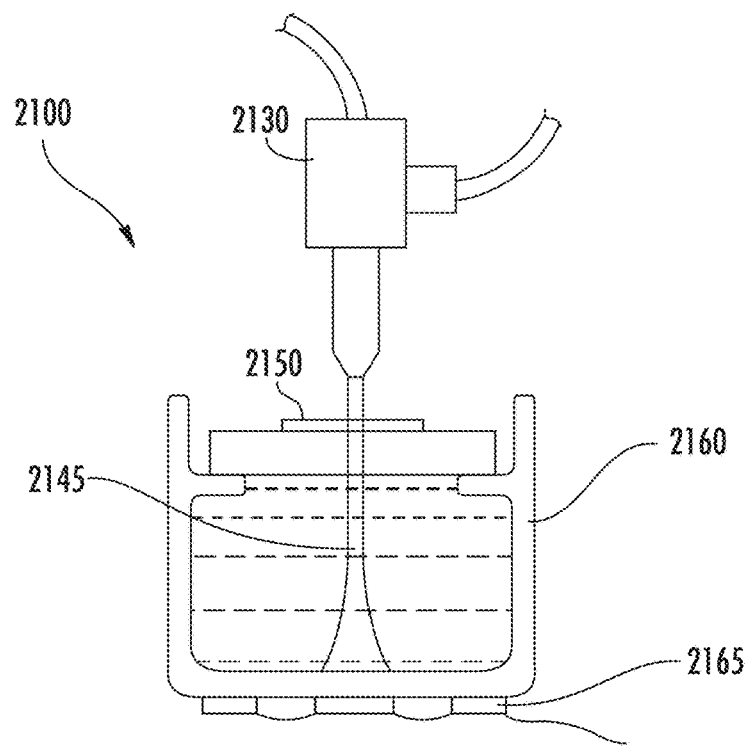

FIG. 21 shows another embodiment where the machine 2100 is configured to sense that the abrasive jet 2145 is wearing the bottom of the tank 2160. For example, a sensor or array of sensors 2165 can be mounted to the underside of the tank 2160. The sensor 2165 may be an accelerometer that detects vibrations. Such a sensor 2165 could estimate the location and magnitude of an impact caused by the abrasive jet 2145 at the bottom of the tank 2160. If the impact is above a certain threshold, the sensor 2165 may alert the machine 2100, or have an action performed, such as turn the machine off, reduce pressure, reduce the abrasive flow rate, increase the feed rate of the motion system (e.g. so that more of the jet's energy is dissipated through cutting material) or perform any other method of reducing erosion of the bottom of the tank. Other sensors can be used instead of an accelerometer, including acoustic sensors, pressure sensors, force sensors, and/or strain gauges.

In current AIWJ systems, a waterjet operator must input the intended material and material thickness to be cut into the machine's software so that it can adjust various cutting parameters, such as feed rate, dwell time, accelerations and others. The waterjet's software or firmware has a database of parameter values based on material and material thickness, or an operator must manually choose these parameters and input them into the software. If the machine is not performing optimally, due to wear of certain components such as the outlet nozzle or orifice, or if the operator chooses the incorrect setup parameters, the machine may not cut all the way through the desired material since it cannot adjust the parameters accordingly.

Figure 22:
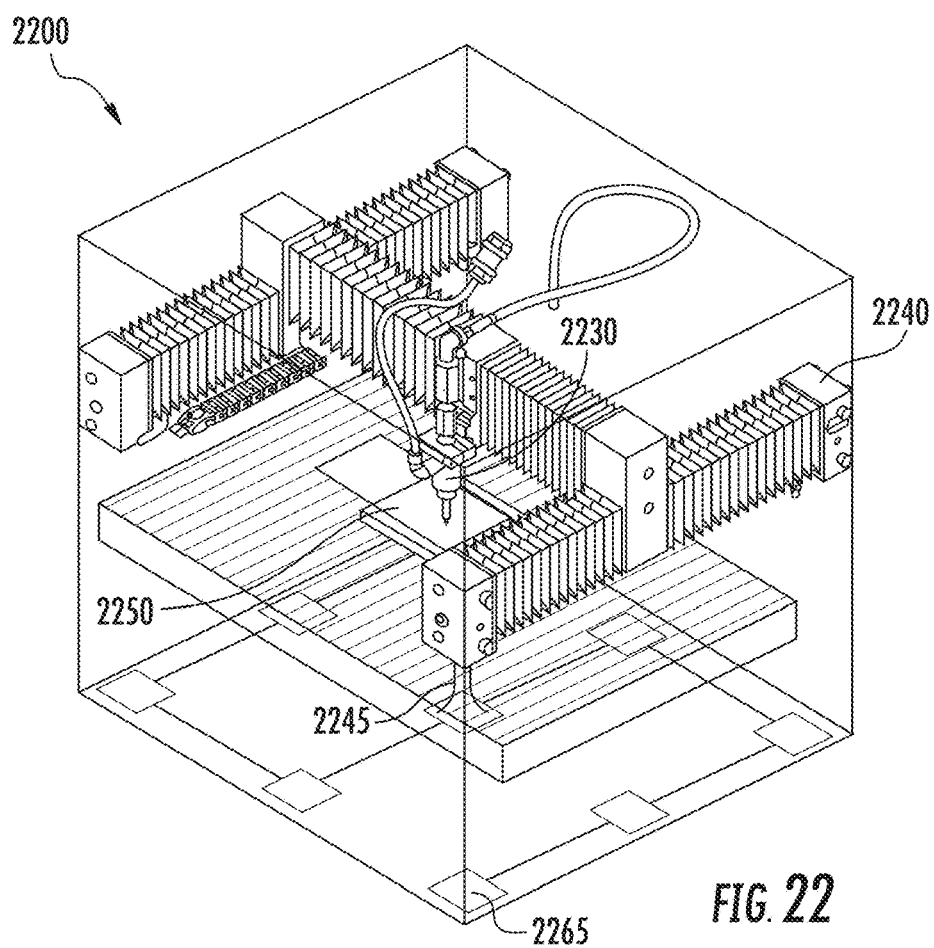

FIG. 22 is another embodiment of the present disclosure, where movement of the cutting head 2230 can be adjusted based upon a detected parameter under normal operation. The parameter can be a location or property of a jet, including position, velocity, and angle. The parameter can be detected, for example, with a sensor or sensor array 2265. In this manner, a closed-loop control system can be created between the motion system 2240 and the sensor array 2265. For example, prior to beginning a cutting-path, the cutting head 2230 may dwell in one location as it pierces an initial hole in the work-piece 2250. Dwell time can be a function of many waterjet parameters, including fluid pressure, fluid flow rate, abrasive flow rate, and others, and work-piece parameters such as material and material thickness. Instead of dwelling for a predefined amount of time, the present disclosure can allow the motion system 2240 to dwell until the sensor array 2265 senses that the abrasive jet 2245 has impacted the bottom of the tank, and therefore, pierced through the work-piece 2250 prior to beginning movement along its cut-path.

Figure 23:
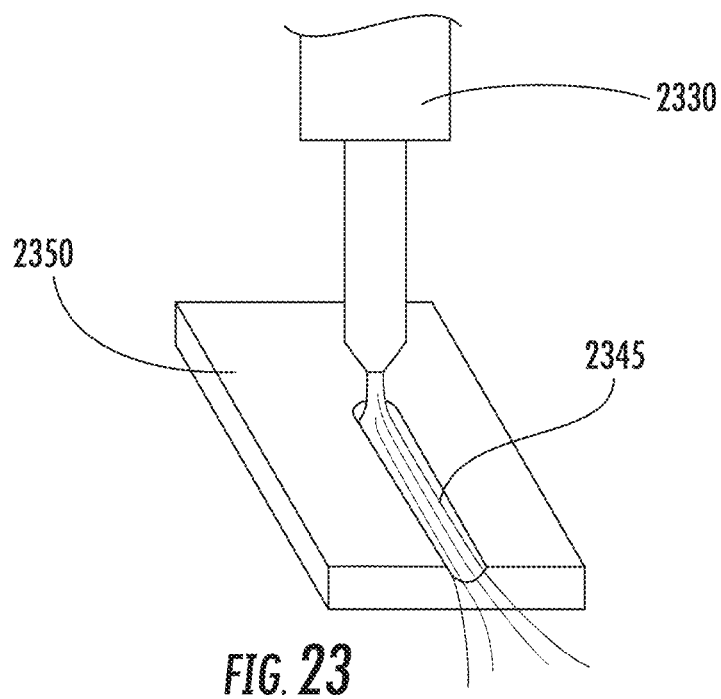
FIG. 23 is an exemplary illustration of an abrasive jet that has failed to cut through the work-piece.

Additionally, if the cutting head 2330 moves too quickly along its cut-path (e.g. if the feed-rate is too high), then the abrasive jet 2345 may not cut through the entire thickness of the work-piece 2350, as shown in FIG. 23. Reducing the feed-rate can solve this problem and allow the abrasive jet 2345 to fully cut through the work-piece 2350. In the embodiment shown in FIG. 22, if the cutting head 2230 is moving along its cut-path and the sensor array 2165 does not sense enough impact on the bottom of the tank (e.g. the abrasive jet 2145 is not cutting through the work-piece 2150), the sensor array 2165 can send a signal that can reduce the feed-rate of the cutting head 2130.

Figure 24:
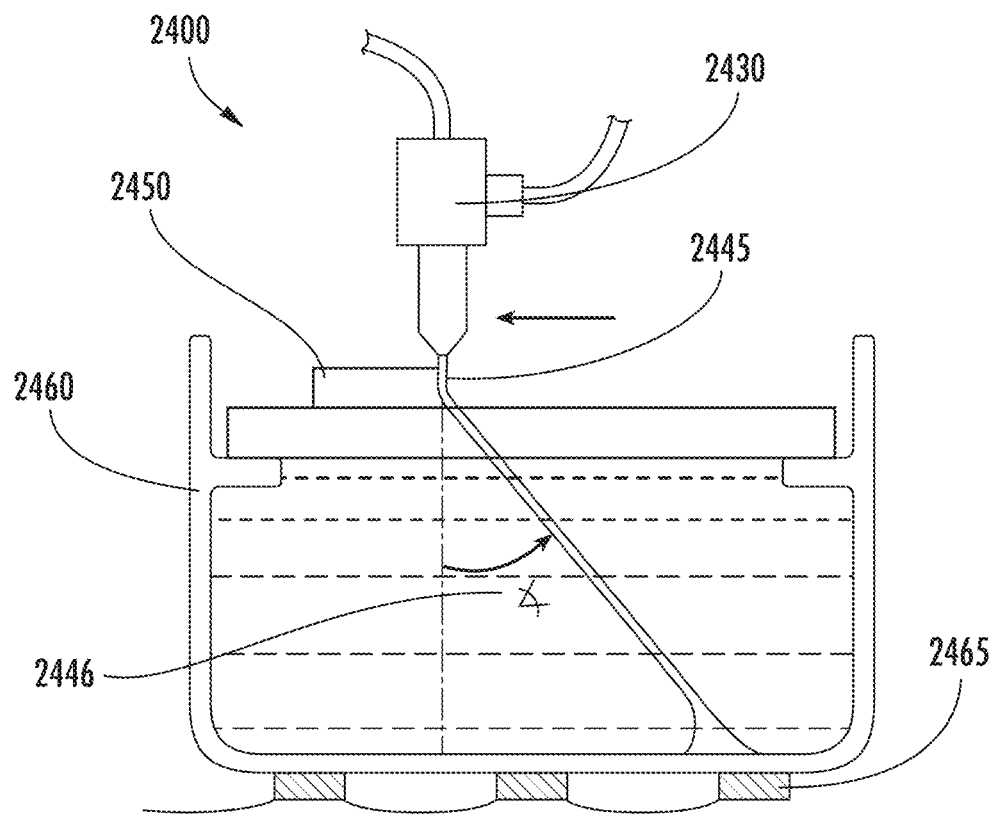
FIG. 24 is an illustration of a jet sensing system according to an embodiment of the present disclosure.

The feed-rate of the cutting head may affect the surface finish of the work-piece. Slower cutting can yield a smoother, more dimensionally stable finish. Faster cutting can yield a rougher, less dimensionally stable finish. The deflection of the jet may also be a function of feed-rate. Therefore, the jet deflection angle can be correlated with surface finish. As shown in FIG. 24, the jet 2445 can deflect in the opposite direction of the cutting head's motion, at a deflection angle 2446. The machine 2400 may estimate the deflection angle 2446 by the location of the impact of the abrasive jet 2445 on the bottom of the tank 2460 relative to the location of the cutting head 2430. The machine can use the sensor array 2465 for closed-loop control of the feed-rate of the cutting head 2430 to maintain a consistent surface finish by real-time estimation of the deflection angle 2446.

In this embodiment, the user may not need to specify to the machine 2400 the material and material thickness of the work-piece 2450. Instead, the machine 2400 can use the constant feedback from the sensor array 2465 in order to set its feed-rate, dwell time, accelerations, and other motion-related parameters, as well as other waterjet parameters such as pressure, water flow rate, abrasive flow rate and others.

In current AIWJ systems, the fluid and abrasive expelled through the outlet nozzle can collect in a large tank underneath the cutting bed. The fluid may be filtered and either drained or recycled into the pump's inlet. The abrasive accumulates at the bottom of the tank. The bottom of the tank can be flat, causing the abrasive to settle wherever it falls, which can cover the bottom of the tank. In order to remove the abrasive, a user may drain the tank of fluid (e.g. water) and remove the abrasive with a shovel.

Figure 25A:
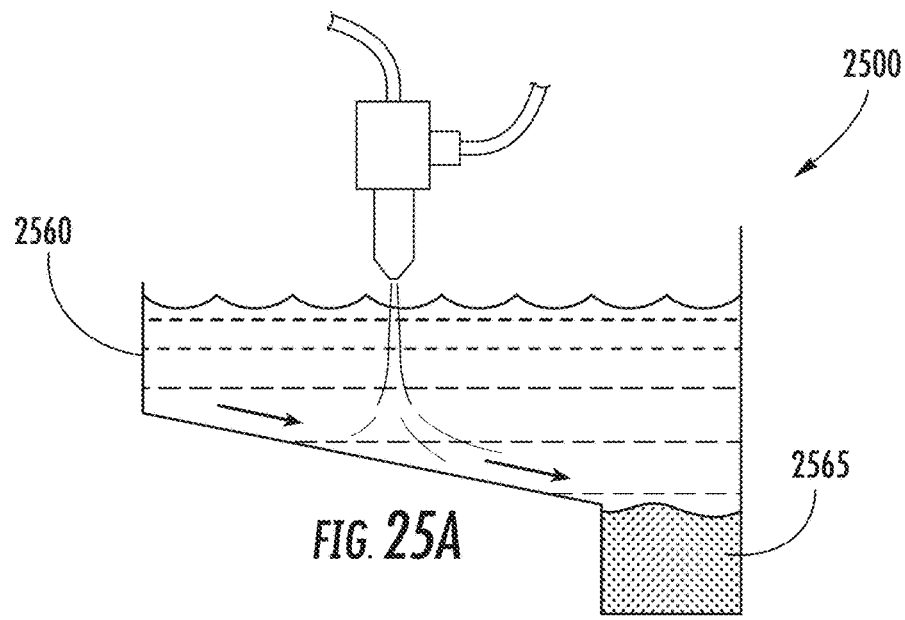
FIG. 25A is an illustration of an abrasive collection subsystem according to an embodiment of the present disclosure.
Figure 25B:
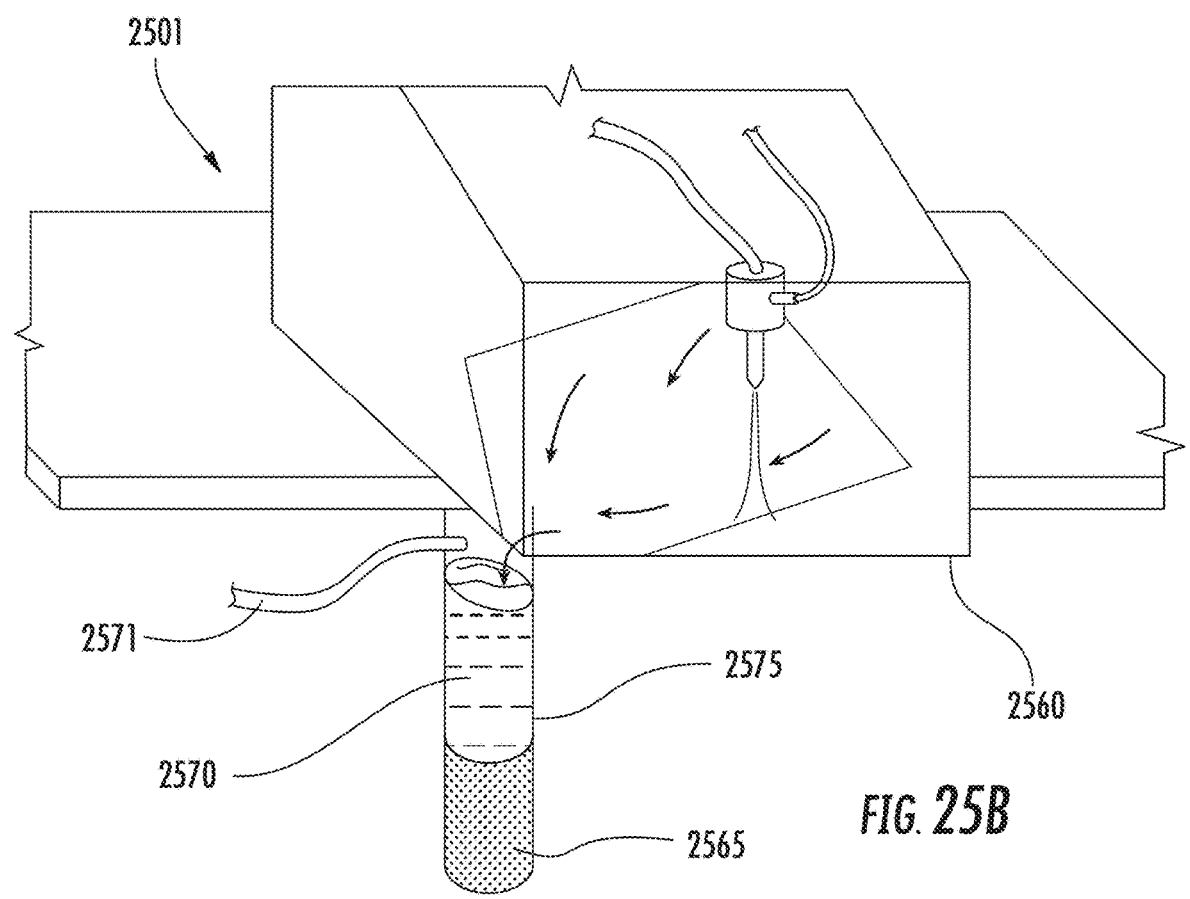
FIG. 25B is an illustration of an abrasive collection subsystem according to another embodiment of the present disclosure.
Figure 26:
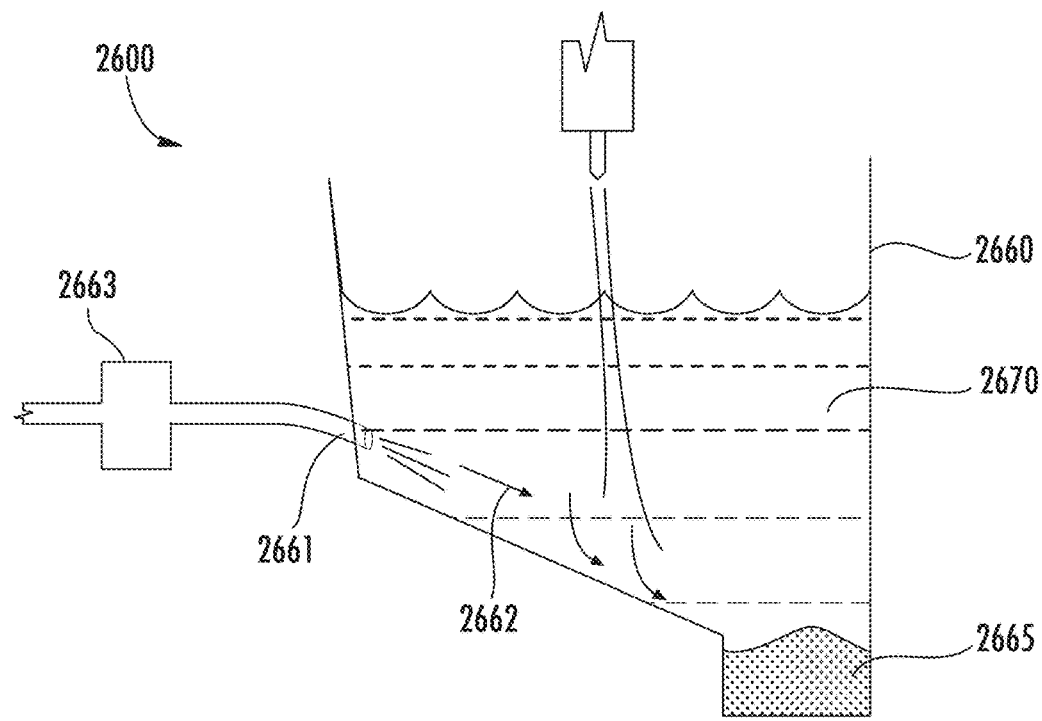
FIG. 26 is an illustration of an abrasive collection subsystem according to yet another embodiment of the present disclosure.

FIG. 25A depicts an embodiment of the present disclosure where at least a portion of a tank 2560 is angled, to facilitate collection of the abrasive 2565. For example, the bottom of the tank 2560 can be angled such that the abrasive 2565 collects on one side of the tank. In FIG. 25B, the bottom of the tank 2560 of the machine 2501 is angled such that the abrasive 2565 collects in one corner. Various angles are possible to direct the abrasive 2565 into one particular area within the scope of the present disclosure. In a further embodiment, shown in FIG. 26, a fluid jet 2661 (e.g. water) blows pressurized fluid into the bottom of the tank 2660 of machine 2600. The fluid may be low-pressure at 30 psi to 100 psi, or high pressure fluid diverted from the pump's outlet at 2,000 psi to 5,000 psi or 2,000 psi to 8,000 psi. This can create a current 2662 at the bottom of the tank 2660 that helps move the abrasive 2665 into one particular area. One or more jets 2661 can be arranged to facilitate movement of the abrasive 2665 in a desired manner. A valve 2663, upstream of the jet, may be used to prevent used fluid 2670 from flowing back into the jet 2661 when the jet is off.

In the embodiment shown in FIG. 25B, the abrasive 2565 is configured to settle in a detachable holding container 2575. Fluid 2570 in the tank 2560 can be drained out of the holding container 2575 through hose 2571, and then the holding container 2575 may be detached for discarding the used abrasive 2565. By separating the fluid from the used abrasive 2565, the abrasive 2565 can be removed more easily.

Figure 27:
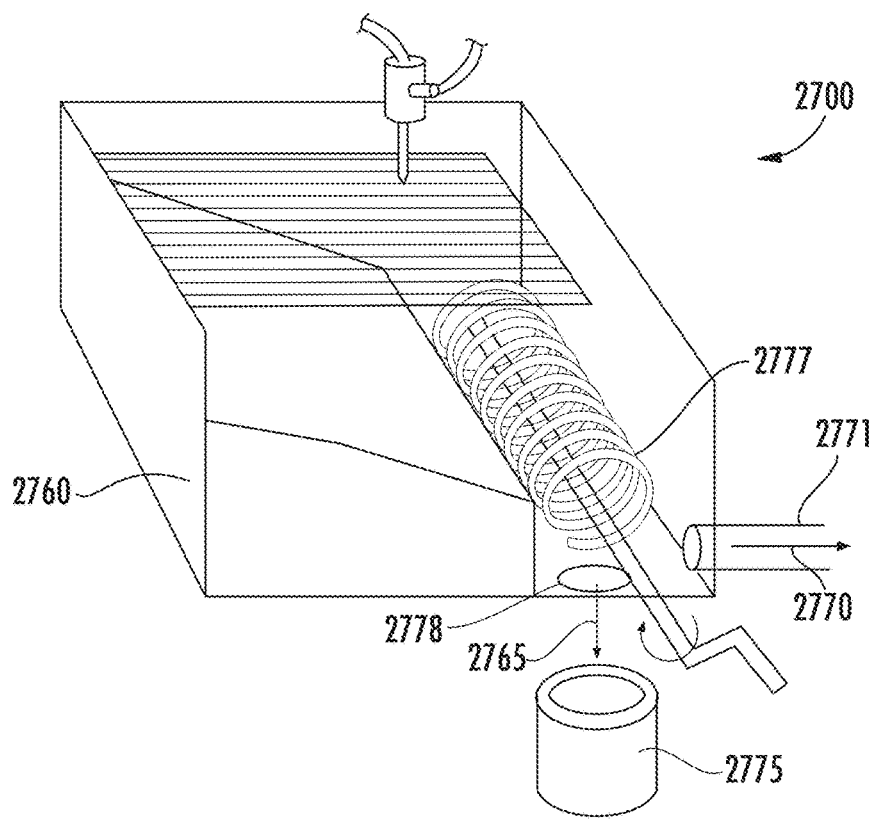
FIG. 27 is an illustration of an abrasive collection subsystem according to a further embodiment of the present disclosure.

In another embodiment shown in FIG. 27, the settled abrasive 2765 can be removed via an auger 2777 through a seal-able hole 2778 in the machine 2700 into a holding container 2775. The auger 2777 may be hand-driven or electrically-driven. In this embodiment the fluid 2770 in the tank 2760 can be drained a fluid discharge outlet 2771 before the abrasive 2765 is removed to prevent leakage through the hole 2778.

Figure 28A:
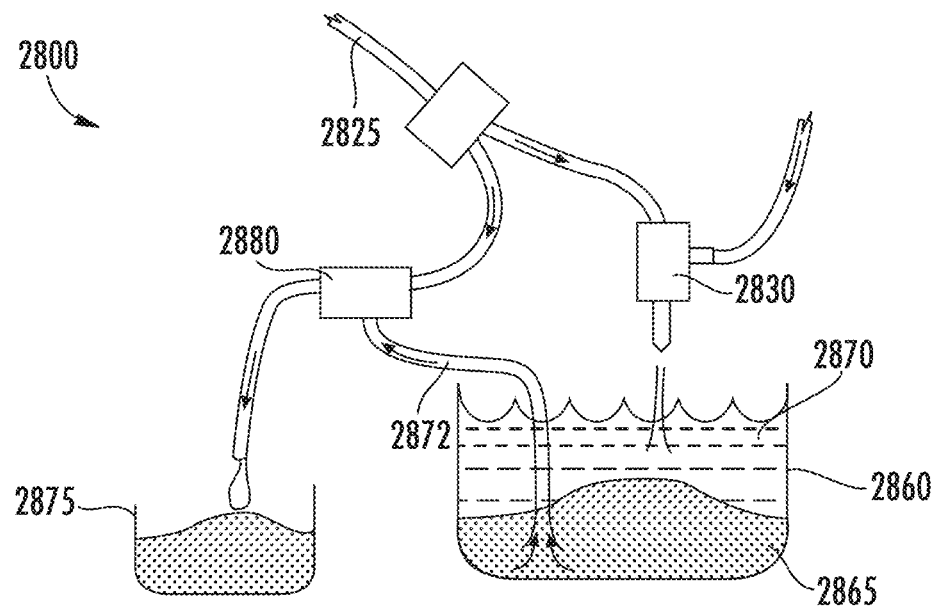
FIG. 28A is an illustration of an abrasive collection subsystem according to an embodiment of the present disclosure.

In another embodiment of the machine 2800, shown in FIG. 28A, the settled abrasive 2865 is suctioned through a hose 2872 into holding container 2875. The suction may be created, for example, via high pressure fluid 2825 (e.g. water) forced through a small orifice inside a chamber 2880. This results in low-pressure within the chamber 2880, due to the venturi principle, to remove the abrasive 2865 from the tank 2860. The cutting head 2830 and the chamber 2880 may share the same supply of high-pressure fluid 2825. The high-pressure fluid 2825 can be diverted, with part of the flow going to the cutting head 2830 and the remainder of the flow going to chamber 2880.

Figure 28B:
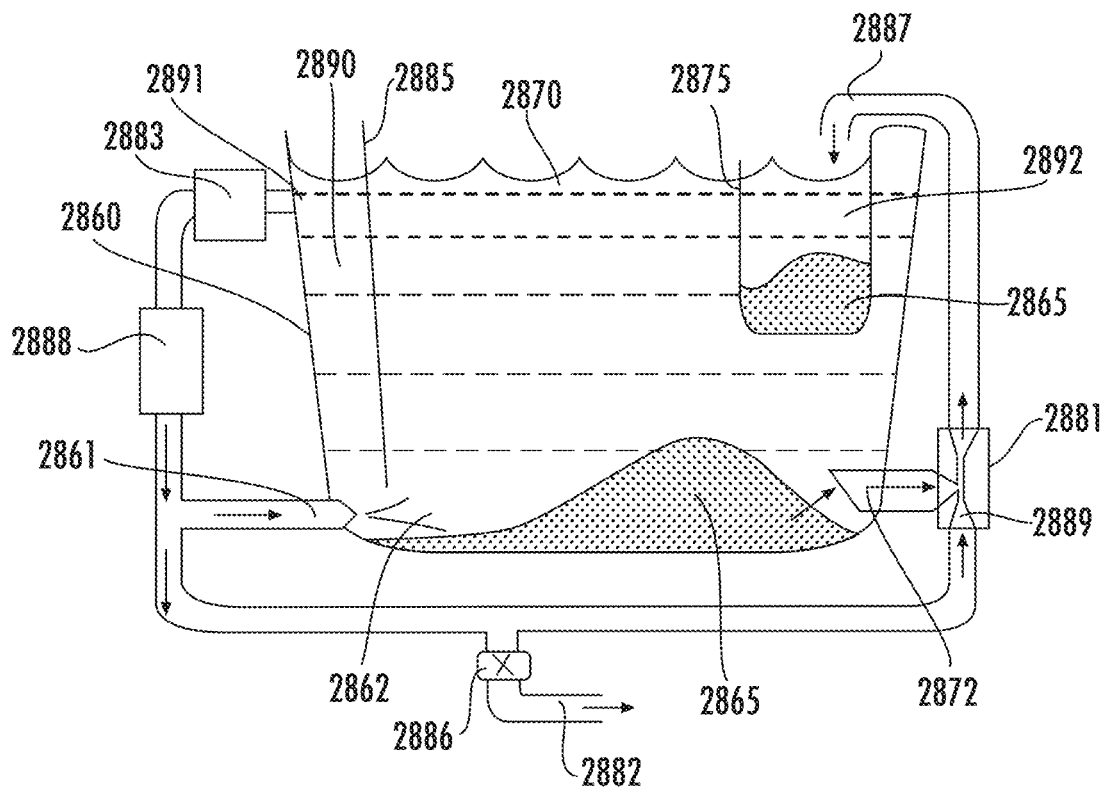
FIG. 28B is an illustration of an abrasive collection subsystem according to another embodiment of the present disclosure.

In another embodiment of the machine 2801, shown in FIG. 28B, a suction port 2872 can be used to suction the abrasive 2865 from the bottom of the tank 2860. One or more fluid jets 2862 expelled through the outlet nozzle 2861 can assist in the collection of abrasive 2865 near the suction port 2872. The jets 2862 can be created from any suitable pressure source, including pressurized fluid (e.g. water) at around 100 psi. One example of a suitable suction can be created using a venturi 2881, whereby pressurized fluid enters a restriction 2889. The resultant jet within the venturi 2881 can create a vacuum pressure at the port 2872, in an effort to collect spent abrasive from the bottom of the tank. The pressurized fluid for outlet nozzle 2861 and venturi fitting 2881 can come from any suitable source, for example, by a pump 2888 fed by fluid from the tank 2860. In order to minimize the amount of spent abrasive that flows through pump 2888, one or more baffles 2885 can be included within the fluid tank. A baffle 2885 can separate the fluid in the tank 2860 into two sections, a main area 2870 and a baffled area 2890. The two areas may only be connected through a small gap below the baffle 2885. It may be advantageous to position the baffled area 2890 beyond the travel of the cutting jet to avoid the cutting jet from directly entering the baffled area 2890. Since abrasive is denser than cutting fluid (e.g. water), the abrasive settles at the bottom of the tank. Consequently, abrasive from the main area 2870 that enters the baffled area 2890 below the baffle 2885 will likely not reach the top of the baffled area 2890. In other embodiments of the abrasive collection and removal system described above, the outlet nozzle 2861 can be eliminated and/or there can be multiple suction ports 2872 located at various points along the tank 2860, each with its own venturi 2881. For example, there can be four suction ports 2872, one in each corner of the bottom of the tank. The fluid flow through each venturi 2881 can come from the output of the same pump 2888, or from separate pumps.

Figure 28C:
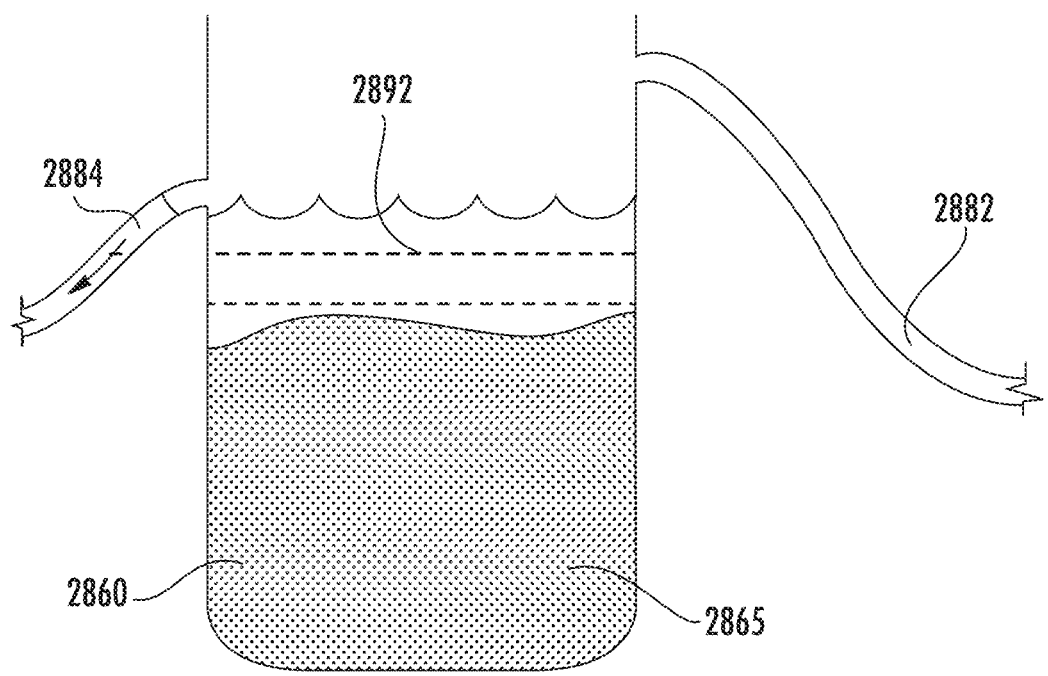
FIG. 28C is an illustration of an abrasive collection holding container according to an embodiment of the present disclosure.

The pump 2888 can have a fluid input come from a port 2891 at the top of the baffled area 2890. The input fluid (e.g. water) may pass through a filter 2883 and then into the pump 2888. The pump 2888 can have a third output, controlled by a valve 2886, to drain excess fluid through a hose 2882. The fluid and abrasive mixture (slurry) that exits the fitting 2881 can travel through a hose 2887 and enter holding container 2875. In one embodiment, holding container 2875 can be housed within the tank 2860. As the holding container 2875 fills with a slurry, abrasive 2865 and fluid 2892 may separate. As more slurry enters the holding container 2875, the abrasive 2865 may displace fluid 2892 to cause fluid 2892 to overflow from the holding container 2875 back into the tank 2860. In one example, the holding container 2875 can rest inside the tank 2860, but be easily removable. In this manner, spent abrasive 2865 can be disposed of by removing the holding container 2875 from the tank 2860 for emptying the abrasive 2865. In other embodiments, there can be multiple holding containers 2875 located within or outside of tank 2860. If the holding container 2875 is not located within the tank 2860, then a return line 2884 (for example, as shown in FIG. 28C) can be used to return displaced fluid 2892 to the tank 2860. The holding container 2875 may be lifted out of the tank 2860, allowing the fluid 2870 to drain out through apertures therein due to gravity, to discard the used abrasive 2865. Furthermore, additional holding containers 2875 may be included in the tank 2860, which distributes the collection of used abrasive 2865 for easier lifting. In a specific embodiment, two holding containers 2875 are provided, where each holding container 2875 filled with used abrasive 2865 may weigh about 14 lbs. Housing the holding container 2875 within the tank can have the advantage of slurry exiting from the hose exit 2887 spilling back into the tank 2860 in the event of a user forgetting to return the holding container 2875 inside the tank 2860 before use of the system. In the embodiments of the machine 2800, 2801, the tank 2860 does not need to be emptied of fluid 2870 (e.g. water) in order to remove the abrasive 2865.

In current AIWJ systems, the abrasive particles expelled from the cutting head impact the work piece at extremely high velocities and may shatter upon impact. This can prevent the abrasive from being reused. According to embodiments of the present disclosure, a waterjet system of significantly lower pressure that expels abrasive at significantly lower velocity can be provided. This can reduce shattering of the abrasive upon impact with the work piece. In this manner, abrasive may be reused, for example, through collection and recirculation into the hopper.

In an embodiment of the present invention, the used abrasive may be separated from the fluid and dried such that all of the moisture is removed. The dried abrasive may be filtered, for example using a sieve, to remove larger solid particles. These larger solid particles may be from the cut work piece, and may clog the system if they were recirculated with the abrasive. The dry abrasive particles may be moved back into the hopper and reused.

Figure 29:
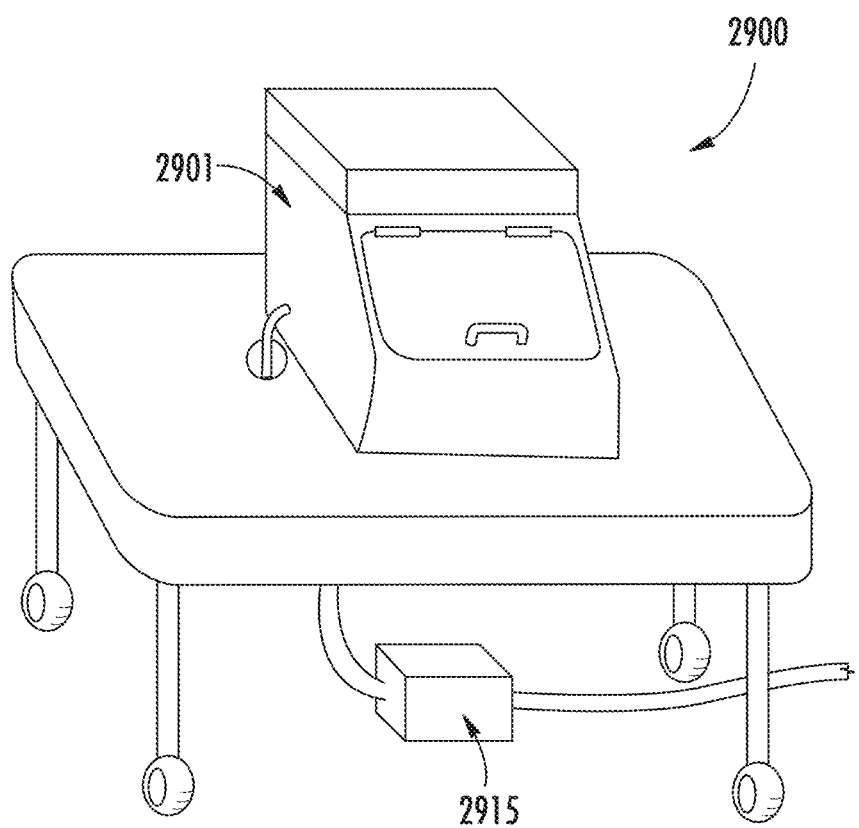
FIG. 29 is an illustration of an AIWJ according to an embodiment of the present disclosure.
Figure 30A:
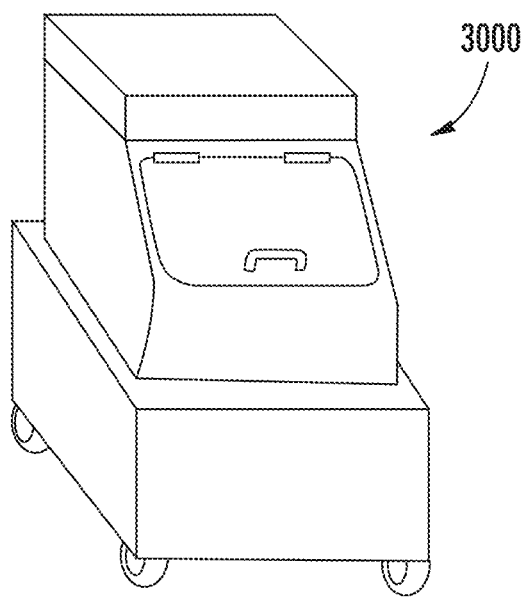
FIGS. 30A-30B are illustrations of AIWJ machines according to further embodiments of the present disclosure.
Figure 30B:
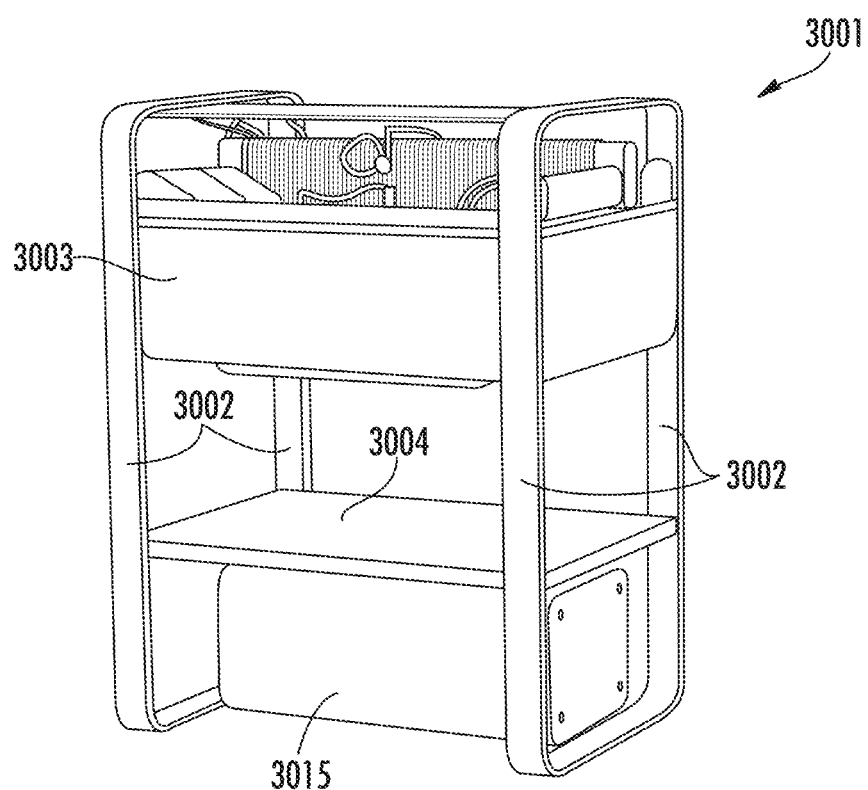

FIG. 29 depicts an embodiment according to the present disclosure where the machine 2900 is small, and light enough in weight to rest on a table or bench. The pump box 2915 may be separate from the main enclosure 2901, for example placed underneath the table or bench. FIG. 30A depicts another embodiment where the machine 3000 can rest on a mobile cart. Alternatively, as shown in FIG. 30B, the machine 3001 may include legs 3002 which are detachable from the main enclosure 3003. With the legs 3002 attached, the machine 3001 may be provided at a suitable height without the need for a table or bench. A shelf 3004 may further be provided, detachable from the legs 3002. The pump box 3015 may be placed on or below the shelf 3004.

In another embodiment, the machine 3100 can disassemble into several different pieces, making it easy to transport, as shown in FIG. 31A. The different pieces may include a first piece 3101, including a fluid tank and pump area, a second piece 3102, including a motion system and enclosure, and a third piece 3103, including an abrasive hopper.

In another embodiment, shown in FIG. 31B, the machine 3101 includes a tank 3160 supported on either side by a frame 3161, which can include two side members. The tank 3160 can be suspended above the surface on which the machine 3101 rests a height H. The height H may be between 0.5 inches and 6 inches, which allows the user to store items such as stock sheet material or various tools on the surface below the tank 3160.

In the embodiments shown in FIGS. 29-31B, the machine can be portable, which can allow for easy storage and transportation. For example, pieces of the machine may be at most 110 lbs, and the assembled machine may be about 300 lbs.

Figure 32:
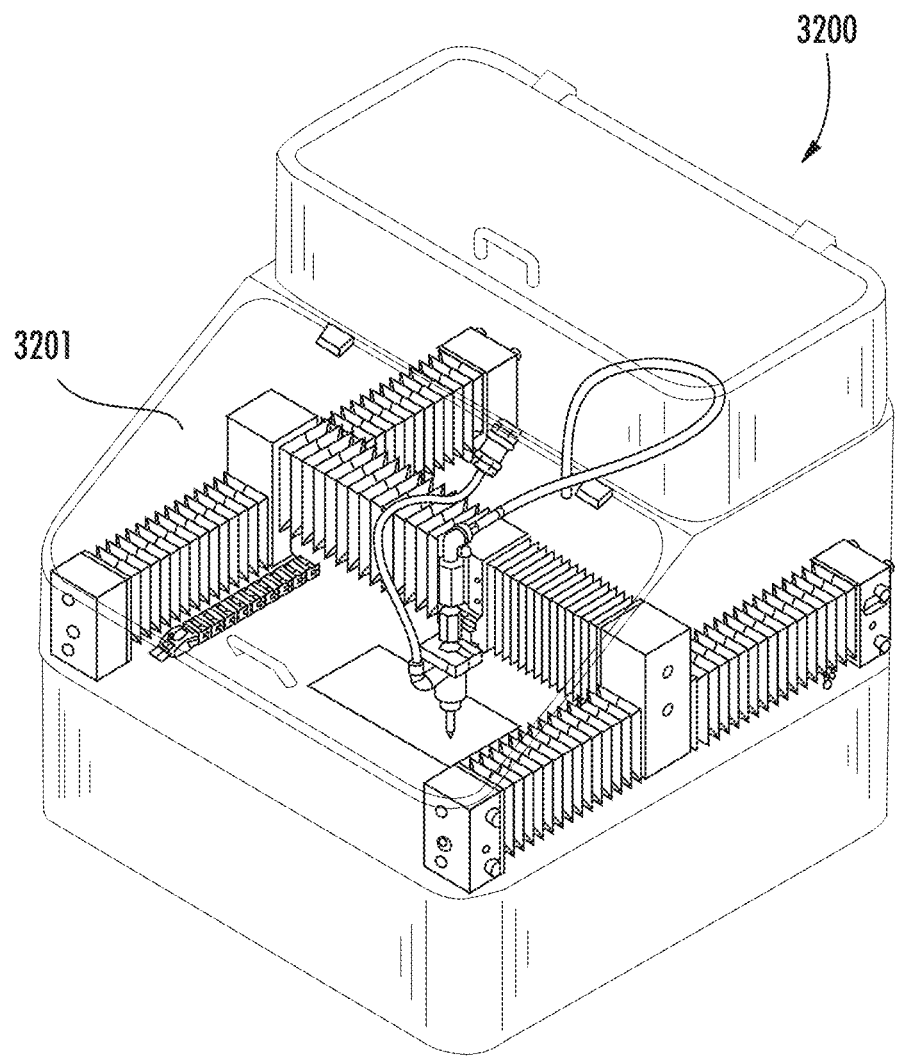
FIG. 32 is a depiction of the enclosure according to an embodiment of the present disclosure.

In an embodiment of the present disclosure, the cutting area can be fully enclosed with a hermetically-sealed door 3201 (e.g. waterproof), as seen in FIG. 32. The door 3201 can keep fluid and abrasive sealed inside the machine 3200. The door 3201 may be composed at least partially of a transparent material, so a user may view the operation of the machine 3200. The machine 3200 may be configured such that operation is stopped when the door 3201 is open, for safety of the user.

Figure 33:
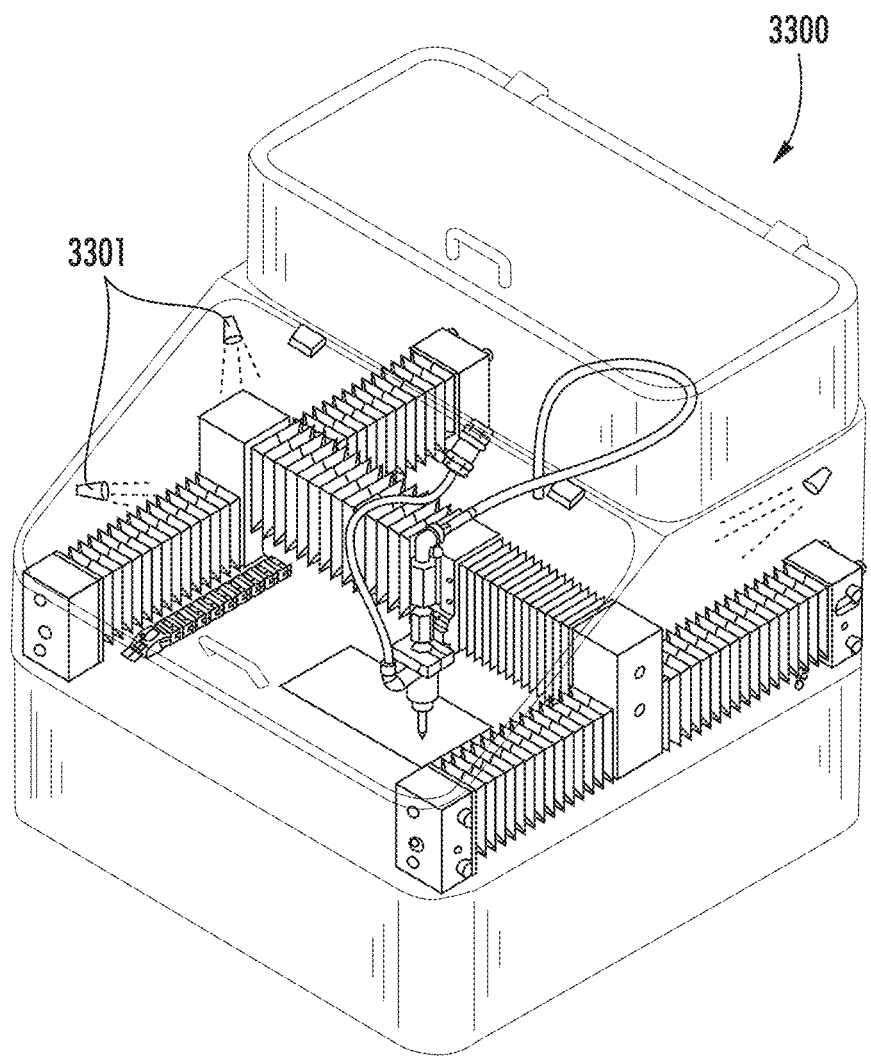
FIG. 33 is a depiction of an enclosure cleaning system according to an embodiment of the present disclosure.

In another embodiment of the present disclosure, the machine 3300 can have sprinklers 3301 that spray fluid on the inside surfaces of the cutting area, as shown in FIG. 33. This can allow the machine 3300 to wash the abrasive that sticks to exposed interior surfaces into the tank.

Figure 34A:

When a high-velocity mixture 1045 is expelled through the cutting head 1030, it can cut through a work-piece 1050. The work-piece 1050 rests on the cutting bed 1051 and can be mounted to the cutting bed 1051 so that it is fixed during a cutting operation. The work-piece is mounted in alignment with respect to the coordinates of the motion system 1040 such that the cutting operation is accurate. FIG. 34A shows a first prior art AIWJ system that includes a series of metal slats that span the width of the tank and are supported on either end. FIG. 34B shows a second AIWJ prior art system that includes corrugated sheets of plastic that are stacked side by side. The corrugated plastic sheets can all be a single color and aligned in a single direction. Rulers along the edges of the cutting bed may help align the work-piece, but this alignment method is imprecise, especially with a large cutting bed and a small work-piece. Although the plastic sheets can all be aligned in a single direction, these sheets only provide a visual indication to a ruler that is perpendicular to their direction, but not one that is parallel to them. Since each sheet is thin (for example around 5 mm), stacked one beside the next, and are all the same color, it may be difficult to effectively use the sheets as a visual measurement indicator. Thus, imprecise mounting and alignment of the work-piece on the cutting bed can be commonplace.

FIGS. 35A and 35B depict an alignment system according to embodiments of the present disclosure that can improve visual alignment of a work-piece. In the embodiment shown in FIG. 35A, the cutting bed 3451 include interlocked sheets 3452. The sheets 3452 may be made of any suitable material, including corrugated plastic. Certain sheets 3453 can be a different color, for example, to form a visual grid on the surface of the cutting bed 3451. Sheets 3453 can be uniformly spaced throughout the cutting bed 3451, and may interlock to one another. As shown in FIG. 34B, a first sheet 3452 may include removed portions 3454, which receive perpendicular portions of the second sheet 3453. Both the top and bottom of the cutting bed 3451 may comprise this combination of sheets 3452 and 3453, such that when the top wears, the cutting bed 3451 can be turned over to expose an unworn side. It is similarly contemplated that the cutting bed 3451 can have different visual coordinates (or no coordinates) on each side. For example, the spacing between sheets 3452 and 3453 may differ on each side of the cutting bed 3451.

According to embodiments of the present disclosure an improved AIWJ system is provided that eliminates deficiencies of prior art systems, while maintaining inherent advantages of waterjet technology. For example, an AIWJ system according to the present disclosure may operate at relatively low pressure and power levels than current systems. A low working pressure allows for one or more of the following advantages: less expensive pumps to be used, lower maintenance schedules, usage of cheaper materials for the constructions of the entire hydraulic subsystem, such as aluminum and brass, and use of small-dimension and flexible components allowing for the creation of a more compact design. The low-power arrangements described herein can allow for one or more the following advantages: eliminates the need for specialized electrical supply infrastructure, decreased costs of use, and a relatively shallow fluid tank for hydraulic power dissipation.

According to aspects of the present disclosure a diaphragm, piston, or crank pumps can be used in an AIWJ system. These pump constructions may have one or more of the following advantages to the hydraulic subsystem: eliminate the need for specialty power such as 240-460V from the motor input side, eliminate the need for fine 0.4-1.0 µm filtration on inlet of the pump for ordinary tap water, no required additional cooling subsystems for continuous operation, quieter operation, cheaper rebuilding costs, and no required additional recirculation or relief valve circuits. Thus, a cheaper and smaller machine that is easier to assemble and manufacture can be provided.

An additional aspect of the present disclosure is an AIWJ system having a significantly lower abrasive flow rate than prior art systems. Due to the low pressure and fluid flow rates, the optimal abrasive flow rate may be, for example, 0.1 to 0.5 lb./min.

According to further aspects of the present disclosure, it is possible to reduce the cutting speed of a material. For example, current AIWJ systems operating at 60,000 psi cut ⅟₁₆" aluminum at a rate of roughly 50 inches per minute (IPM). Conversely, an AIWJ system according to the present disclosure can operate at between 2,000 psi and 5000 psi to cut ⅟₁₆" aluminum at 4 IPM. Current AIWJ systems are primarily used in industrial shops that cut large amounts of material. Consequently, slow cutting speeds would be much less cost effective, even if the machine cost is much less. However, an AIWJ system according to the present disclosure may be used by individual hobbyists, artisan, small businesses or educational institutions, who may have significantly lower volume of cutting needs and are less concerned about cutting speeds. Exemplary cutting speeds for different materials according to the present disclosure include: ¼" glass cut at 6 IPM, 0.047"-thick Stainless steel cut at 2 IPM, ¼"-thick ceramic tile cut at 6 IPM, ¾"-thick wood cut at 3 IPM, and ¼"-thick ABS plastic cut at 3 IPM. Further exemplary cutting speeds for different materials are outlined in Table I below.

TABLE I

Materials and Cutting Speeds

| Material | Thickness (inches) | Cut speed (inches per minute) |
|---|---|---|
| Metal | | |
| Aluminum | 1/16" | 2.8 ipm |
| Aluminum | 1/8" | 1.8 ipm |
| Aluminum | ¼" (max) | 1.0 ipm |
| Mild Steel | 0.051" | 1.2 ipm |
| Mild Steel | 3/16" (max) | 0.4 ipm |
| Stainless Steel | 0.058" | 1.0 ipm |
| Stainless Steel | 1/8" (max) | 0.7 ipm |
| Titanium | 1/16" | 1.4 ipm |
| Titanium | 3/16" (max) | 0.7 ipm |
| Nickel Silver | 0.037" | 1.8 ipm |
| Copper | 1/16" | 1.2 ipm |
| Copper | 3/16" (max) | 0.6 ipm |
| Ceramic & Stone | | |
| Ceramic Tile | 3/8" | 2.0 ipm |
| Marble | 3/8" | 0.8 ipm |
| Granite | 3/8" | 1.6 ipm |
| Glass (plate) | 3/8" | 1.6 ipm |
| Glass (soda-lime) | 1/8" | 11.8 ipm |
| Other | | |
| Carbon Fiber | 1/8" | 8.9 ipm |
| Polycarbonate | ¼" | 1.8 ipm |
| Polycarbonate | ½" (max) | 0.6 ipm |
| Garolite (g10) | 1/16" | 15.7 ipm |

As compared to prior art AIWJ systems, the present disclosure provides for an AIWJ systems that can have significantly different hydraulic operating conditions, including: fluid pressure, fluid flow rate and hydraulic power. For example, current AIWJ systems operate at 10,000-90,000 psi, 0.5-6 gpm (gallons per minute) and 15-200 hp. The present disclosure provides for an AIWJ system that can operate at roughly 2,000-5,000 psi or 2,000-8,000 psi, 0.1-1 gpm and 1-2.4 hp or 1-5 hp. As a result, the present disclosure provides an AIWJ system that is considerably cheaper to purchase and operate, and may be accessible to a wider range of users. Furthermore, an AIWJ system according to the present disclosure can have a more simplified construction of hydraulic subsystems than prior art systems. These advantages can allow for an AIWJ system that can be used to a much wider array of users and applications than prior art systems.

Although the present disclosure has been described with respect to one or more particular embodiments, it will be understood that other embodiments of the present disclosure may be made without departing from the spirit and scope of the present disclosure. It is understood that embodiments described herein can be used with AIWJ systems operating at any operating pressure.

What is claimed is:

1. A waterjet system, comprising:
a pump configured to pump fluid at a pressure between 2000 psi and 8000 psi;
an electric motor configured to drive the pump;
a hopper configured to store abrasive;
a mixing chamber configured to mix abrasive from the hopper and the fluid from the pump to produce a slurry;
a cutting bed configured to receive a workpiece to be cut;
a cutting head, including an outlet nozzle, in downstream fluid communication from the mixing chamber, the cutting head configured to expel the slurry through the outlet nozzle as a high-velocity jet into the cutting bed;
a metering valve configured to meter the abrasive in the hopper;
a motion system configured to move the cutting head relative to the cutting bed, and configured to move the cutting head relative to one or more of the following: the metering valve and the hopper; and
a high-pressure valve located along a flow path of the fluid, between the pump and the cutting head to start and stop fluid flow to the cutting head;
wherein the motion system is a linear motion system controlled by one or more controllers;
wherein the high-pressure valve is controlled by the one or more controllers;
wherein the motion system is configured to move the cutting head relative to the high-pressure valve.

2. The waterjet system of claim 1, wherein the hopper and the mixing chamber are connected with an abrasive line, the abrasive line being in direct connection with the mixing chamber;
wherein the hopper is open to ambient;
wherein the abrasive line is open to ambient such that there is no pressure differential between the abrasive at an upper portion of the hopper and an output of the metering valve.

3. The waterjet system of claim 2, wherein a negative pressure from the mixing chamber draws abrasive toward the mixing chamber.

4. The waterjet system of claim 1, wherein the hopper includes a housing and a translatable drawer configured to receive the abrasive, the translatable drawer being surrounded by the housing and configured to translate relative to the housing for accessing the drawer.

5. The waterjet system of claim 1, wherein the hopper is positioned at or below the mixing chamber.

6. The waterjet system of claim 1, wherein the pump, the electric motor, the hopper, the mixing chamber, the cutting bed, and the cutting head are fully enclosed by a single housing.

7. The waterjet system of claim 1, wherein the cutting bed includes a visual grid formed by interlocking sheets.

8. The waterjet system of claim 7, wherein the cutting bed is made of one or more of the following: a honeycomb metal, an extruded plastic, and a corrugated plastic.

9. The waterjet system of claim 1, further comprising:
an abrasive collection system including a tank located downstream of the cutting bed, the tank having one or more suction ports configured to suction the slurry from the tank; and
one or more venturi fittings to generate the suction force for suctioning the slurry through the one or more suction ports in the tank.

10. The waterjet system of claim 9, further comprising a collection pump configured to pump tank fluid from an inlet in the tank through the one or more venturi fittings for creating the suction force to suction the slurry from the tank.

11. The waterjet system of claim 10, further comprising one or more baffles positioned adjacent the inlet, the one or more baffles configured to reduce debris from entering the collection pump.

12. The waterjet system of claim 9, wherein the slurry is suctioned through the one or more suction ports into a holding container disposed within the tank.

13. The waterjet system of claim 1, further comprising a motion system configured to move the cutting head relative to the cutting bed and a jet sensor configured to detect a parameter of the high-velocity jet.

14. The waterjet system of claim 13, wherein the waterjet system is configured to adjust an operating condition based upon the detected parameter of the jet sensor.

15. The waterjet system of claim 14, wherein the operating condition is one or more of the following: a feed-rate, a dwell time, a pressure, a fluid flowrate, and an abrasive flowrate.

16. The waterjet system of claim 1, wherein no additional valve is located along the flow path of the fluid between the high-pressure valve and the cutting head.

17. The waterjet system of claim 1, wherein the pump operates only at a single speed.

18. The waterjet system of claim 1, wherein the electric motor has a power source, the power source being single-phase alternating current.

19. The waterjet system of claim 1, wherein the motion system is configured to move the cutting head relative to the metering valve.

20. The waterjet system of claim 1, wherein the pump is configured to pump fluid at a pressure between 2000 psi and 5000 psi.

21. A waterjet system, comprising:
- a pump configured to pump fluid at a pressure between 2000 psi and 8000 psi;
- an electric motor configured to drive the pump;
- a hopper configured to store abrasive;
- a mixing chamber configured to mix abrasive from the hopper and the fluid from the pump to produce a slurry;
- a cutting bed configured to receive a workpiece to be cut;
- a cutting head, including an outlet nozzle, in downstream fluid communication from the mixing chamber, the cutting head configured to expel the slurry through the outlet nozzle as a high-velocity jet into the cutting bed;
- a metering valve configured to meter the abrasive in the hopper; and
- a motion system configured to move the cutting head relative to one or more of the following: the metering valve and the hopper;
wherein the cutting bed includes a visual grid formed by interlocking sheets.

22. A waterjet system, comprising:
- a pump configured to pump fluid at a pressure between 2000 psi and 8000 psi;
- an electric motor configured to drive the pump;
- a hopper configured to store abrasive;
- a mixing chamber configured to mix abrasive from the hopper and the fluid from the pump to produce a slurry;
- a cutting bed configured to receive a workpiece to be cut;
- a cutting head, including an outlet nozzle, in downstream fluid communication from the mixing chamber, the cutting head configured to expel the slurry through the outlet nozzle as a high-velocity jet into the cutting bed;
- a metering valve configured to meter the abrasive in the hopper; and
- a motion system configured to move the cutting head relative to one or more of the following: the metering valve and the hopper;
- an abrasive collection system including a tank located downstream of the cutting bed, the tank having one or more suction ports configured to suction the slurry from the tank; and
- one or more venturi fittings to generate the suction force for suctioning the slurry through the one or more suction ports in the tank.

* * * * *